(12) United States Patent
Bae et al.

(10) Patent No.: US 12,313,293 B2
(45) Date of Patent: May 27, 2025

(54) INDOOR UNIT FOR AN AIR CONDITIONER

(71) Applicant: LG ELECTRONICS INC., Seoul (KR)

(72) Inventors: Junseok Bae, Seoul (KR); Younggu Lee, Seoul (KR); Hwanhak Jang, Seoul (KR); Kangyoung Kim, Seoul (KR); Moonshin Kim, Seoul (KR); Seongkuk Mun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 16/980,760

(22) PCT Filed: Mar. 15, 2019

(86) PCT No.: PCT/KR2019/003028
§ 371 (c)(1),
(2) Date: Sep. 14, 2020

(87) PCT Pub. No.: WO2019/177417
PCT Pub. Date: Sep. 19, 2019

(65) Prior Publication Data
US 2021/0222895 A1     Jul. 22, 2021

(30) Foreign Application Priority Data

Mar. 16, 2018 (KR) .......................... 10-2018-0030777
Mar. 4, 2019 (KR) .......................... 10-2019-0024949

(51) Int. Cl.
*F24F 6/18* (2006.01)
*F24F 6/00* (2006.01)
(Continued)

(52) U.S. Cl.
CPC .................. *F24F 6/18* (2013.01); *F24F 6/00* (2013.01); *F24F 6/02* (2013.01); *F24F 11/00* (2013.01); *F24F 13/20* (2013.01)

(58) Field of Classification Search
CPC ........ F24F 6/18; F24F 6/00; F24F 6/02; F24F 11/0008; F24F 13/20; F24F 2140/00;
(Continued)

(56) References Cited

U.S. PATENT DOCUMENTS 2,353,871 A     9/1942   Bowen
3,989,042 A *  11/1976   Mitsui .................. A61M 11/005
                                                        310/317

(Continued)

FOREIGN PATENT DOCUMENTS

CA     2637962 C  * 10/2015   ................ F24F 6/18
CA     2967262 A1 * 12/2017   ............ F04B 19/006
(Continued)

OTHER PUBLICATIONS

EPO translation of KR20100013525 (Year: 2010).*
epo translation of JPH10141715 (Year: 1998).*
epo translation of JP2004173797 (Year: 2004).*

*Primary Examiner* — Stephen Hobson
(74) *Attorney, Agent, or Firm* — Bryan Cave Leighton Paisner LLP

(57) ABSTRACT

An indoor unit for an air conditioner in which the water level of a steam generator is linked with the water level of a supply chamber for supplying water to the steam generator, and a supply floater, which is lowered or raised according to the water level of the supply chamber, opens and closes a supply flow channel for supplying water to the supply chamber. The indoor unit for an air conditioner can control the water supply through the level of water stored in the steam generator.

8 Claims, 22 Drawing Sheets

(51) Int. Cl.
*F24F 6/02* (2006.01)
*F24F 11/00* (2018.01)
*F24F 13/20* (2006.01)

(58) Field of Classification Search
CPC .... F24F 1/0007; F24F 2006/008; F24F 6/025; F24F 6/12; F24F 11/00; F24F 1/005; F24F 1/0087; F24F 13/22; B01D 46/0027; B01D 2279/50
See application file for complete search history.

(56) References Cited

U.S. PATENT DOCUMENTS

| | | | |
|---|---|---|---|
| 4,054,122 A | 10/1977 | Reed | |
| 4,238,425 A * | 12/1980 | Matsuoka | B05B 17/0615 |
| | | | 261/DIG. 50 |
| 5,407,604 A * | 4/1995 | Luffman | F24F 6/12 |
| | | | 261/81 |
| 5,815,637 A | 9/1998 | Allen et al. | |
| 5,859,952 A * | 1/1999 | Levine | F24F 6/18 |
| | | | 239/102.1 |
| 6,792,963 B2 | 9/2004 | Kopel | |
| 7,552,914 B1 * | 6/2009 | Feldstein | F24F 6/14 |
| | | | 261/115 |
| 7,826,725 B2 * | 11/2010 | Wolff | G01F 23/242 |
| | | | 392/338 |
| 8,128,069 B2 * | 3/2012 | Reens | F24F 6/12 |
| | | | 261/78.2 |
| 9,815,557 B2 * | 11/2017 | Nelson | B64D 13/06 |
| 10,639,666 B2 * | 5/2020 | Kim | B05B 1/02 |
| 2004/0000335 A1 * | 1/2004 | Kopel | F24F 6/00 |
| | | | 137/123 |
| 2008/0163758 A1 * | 7/2008 | Jeong | G01F 23/265 |
| | | | 122/494 |
| 2008/0185742 A1 | 8/2008 | Novotny et al. | |
| 2014/0103130 A1 * | 4/2014 | Brown | F16M 13/02 |
| | | | 237/66 |
| 2014/0264963 A1 * | 9/2014 | Barker | F24F 13/00 |
| | | | 261/37 |
| 2015/0090121 A1 * | 4/2015 | Markham | F24F 6/18 |
| | | | 95/149 |
| 2015/0316252 A1 * | 11/2015 | Park | F22B 1/284 |
| | | | 392/401 |
| 2016/0138818 A1 * | 5/2016 | Fitsch | C02F 1/325 |
| | | | 261/36.1 |
| 2018/0172297 A1 * | 6/2018 | Conrad | F24F 6/12 |
| 2018/0172298 A1 | 6/2018 | Conrad | |
| 2018/0172303 A1 * | 6/2018 | Conrad | F24F 1/0087 |
| 2019/0242613 A1 * | 8/2019 | Sasaki | F24F 6/025 |

FOREIGN PATENT DOCUMENTS

| | | | | |
|---|---|---|---|---|
| CN | 1710344 A | | 12/2005 | |
| CN | 201159512 Y | | 12/2008 | |
| CN | 101493253 A | | 7/2009 | |
| CN | 101749823 A | | 6/2010 | |
| CN | 202792258 U | | 3/2013 | |
| CN | 203718943 U | | 7/2014 | |
| CN | 205860319 U | | 1/2017 | |
| DE | 29911440 U1 | * | 11/1999 | ............... F24F 6/18 |
| DE | 202020105831 U1 | * | 12/2020 | |
| EP | 3410024 A1 | * | 12/2018 | ........... F24F 1/0007 |
| JP | S59210234 A | | 11/1984 | |
| JP | S59210234 S | | 11/1984 | |
| JP | 62223502 A | | 10/1987 | |
| JP | H07-026726 B2 | | 3/1995 | |
| JP | H10141715 | * | 5/1998 | |
| JP | H10141715 A | | 5/1998 | |
| JP | 10253006 A | | 9/1998 | |
| JP | 2004-173797 B2 | | 6/2004 | |
| JP | 2004173797 | * | 6/2004 | |
| JP | 2006004674 A | | 1/2006 | |
| JP | 2016044909 A | | 4/2016 | |
| JP | 6159865 B1 | | 7/2017 | |
| KR | 102007047102 A | | 5/2007 | |
| KR | 100768168 B1 | | 10/2007 | |
| KR | 10-2008-0065134 A | | 7/2008 | |
| KR | 20090000506 U | | 1/2009 | |
| KR | 10-2009-0045899 A | | 5/2009 | |
| KR | 1020090084474 A | | 8/2009 | |
| KR | 10-2010-0013525 A | | 2/2010 | |
| KR | 20100013525 | * | 2/2010 | |
| KR | 10-2014-0067310 A | | 6/2014 | |
| KR | 1020160006562 A | | 1/2016 | |
| NO | 2018107271 A1 | | 6/2018 | |
| WO | 2010120114 A1 | | 10/2010 | |
| WO | WO-2017063164 A1 | * | 4/2017 | ............. F24F 13/22 |

\* cited by examiner

[FIG. 1]
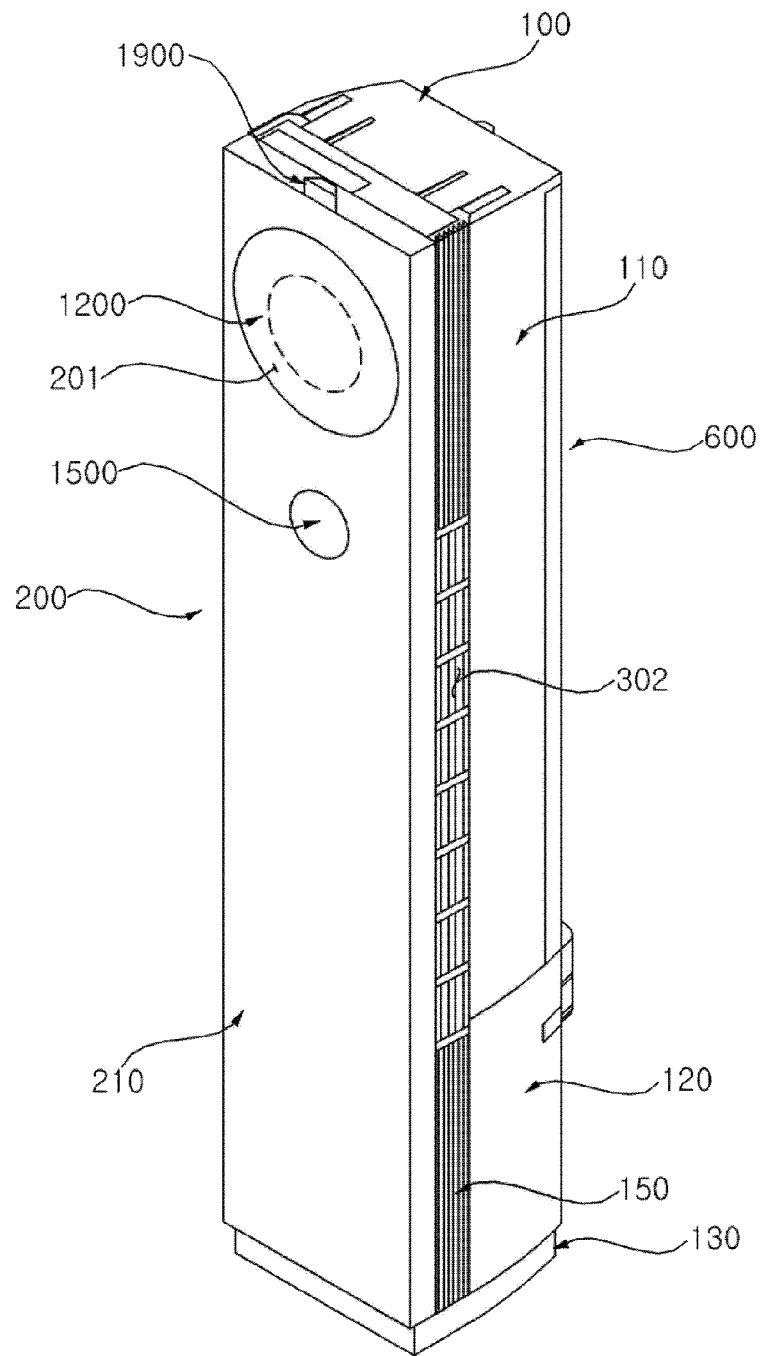

[FIG. 2]
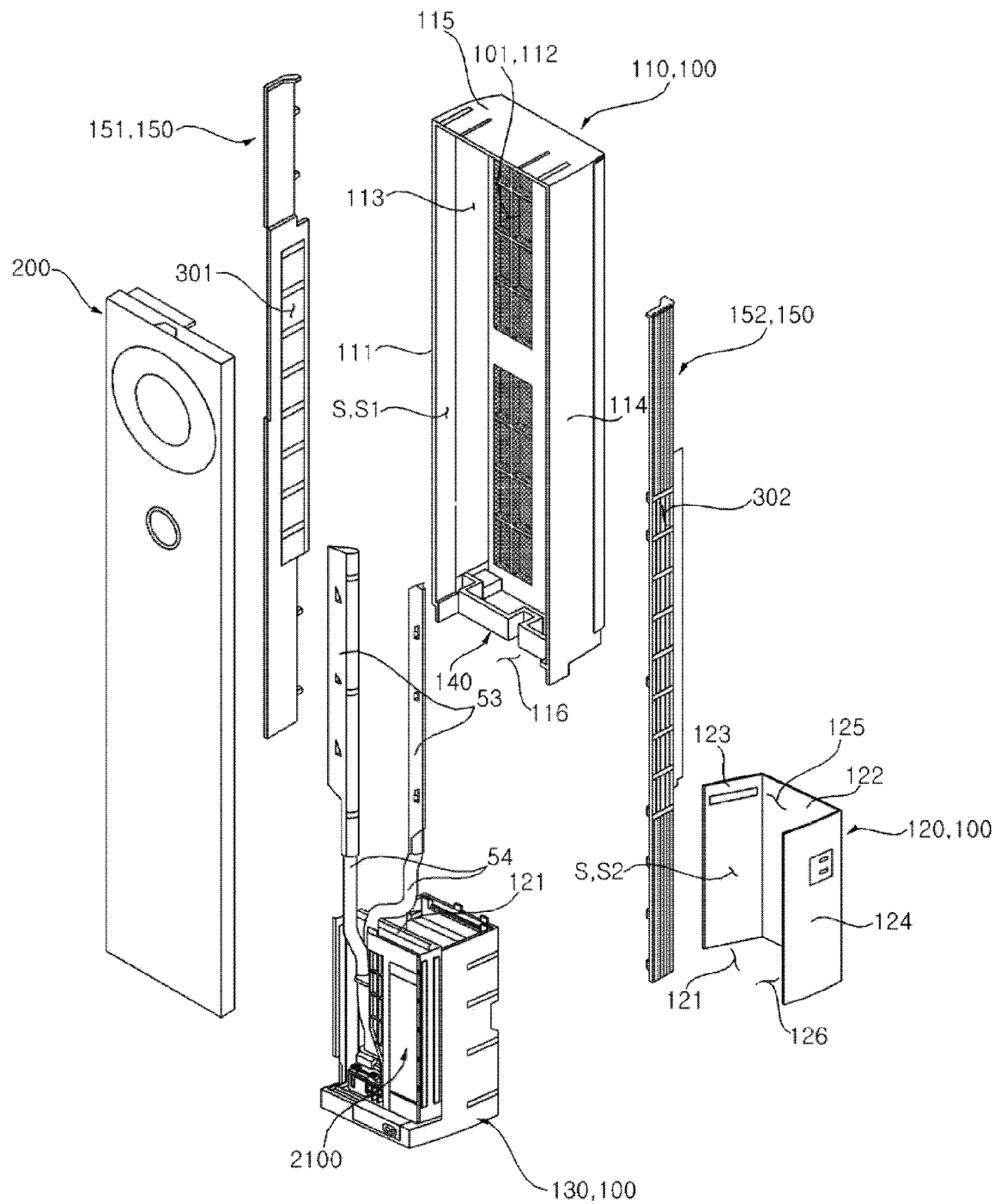

[FIG. 3]
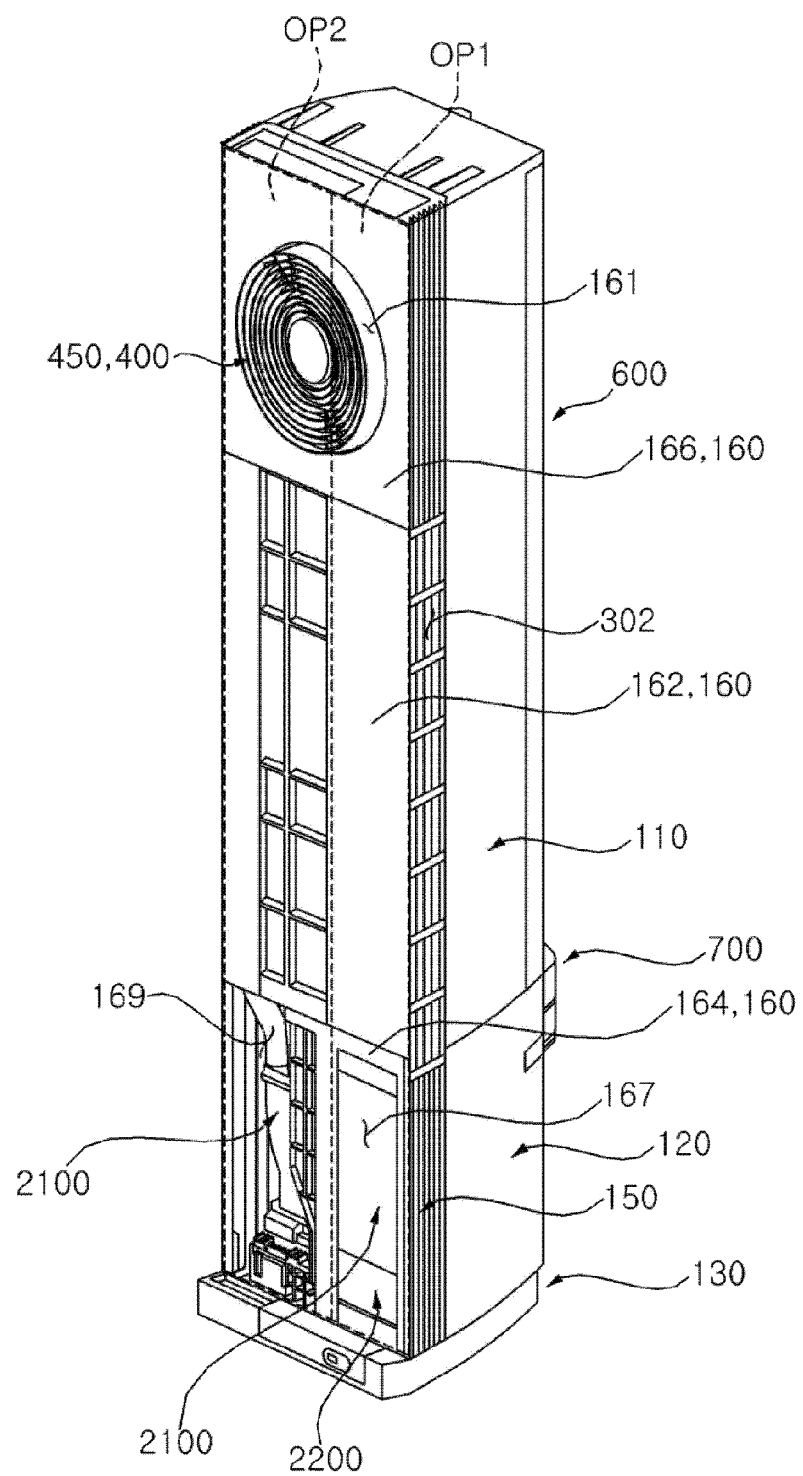

[FIG. 4]
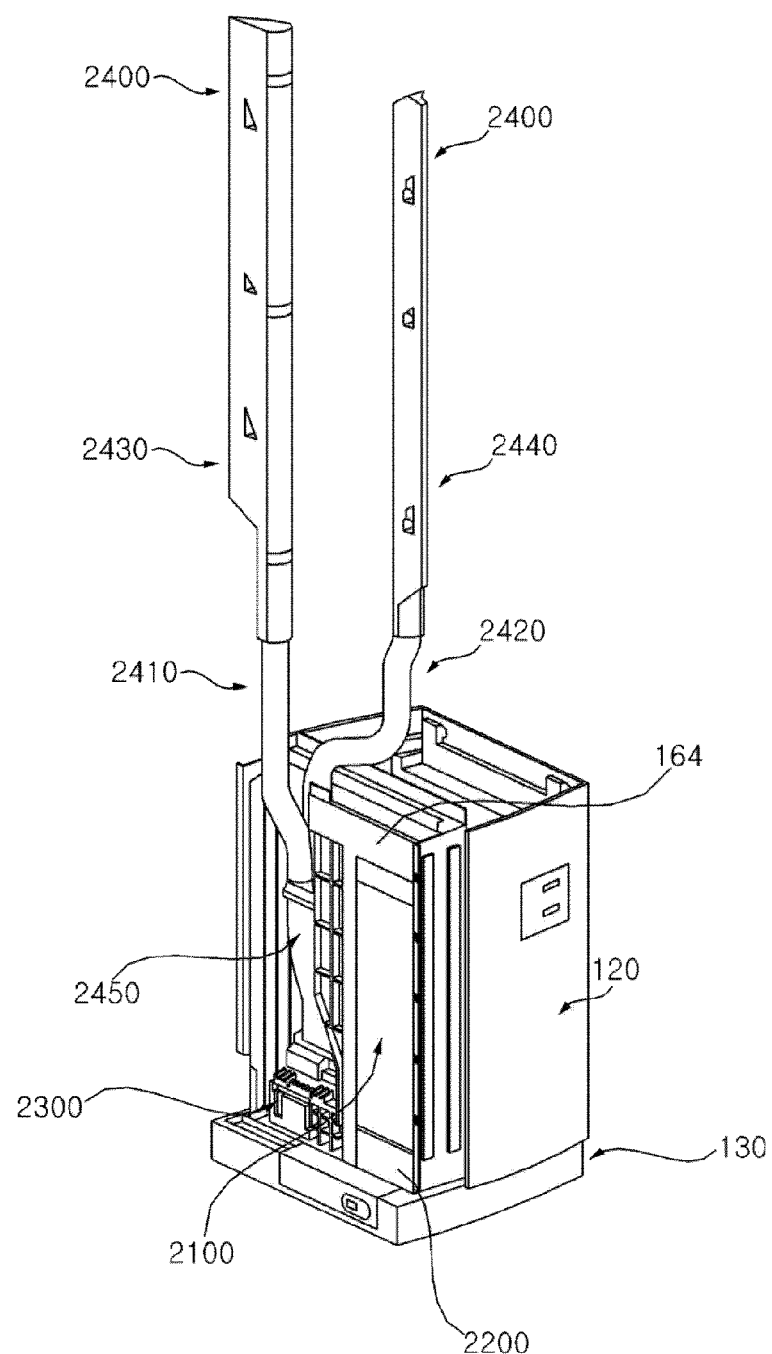

[FIG. 5]
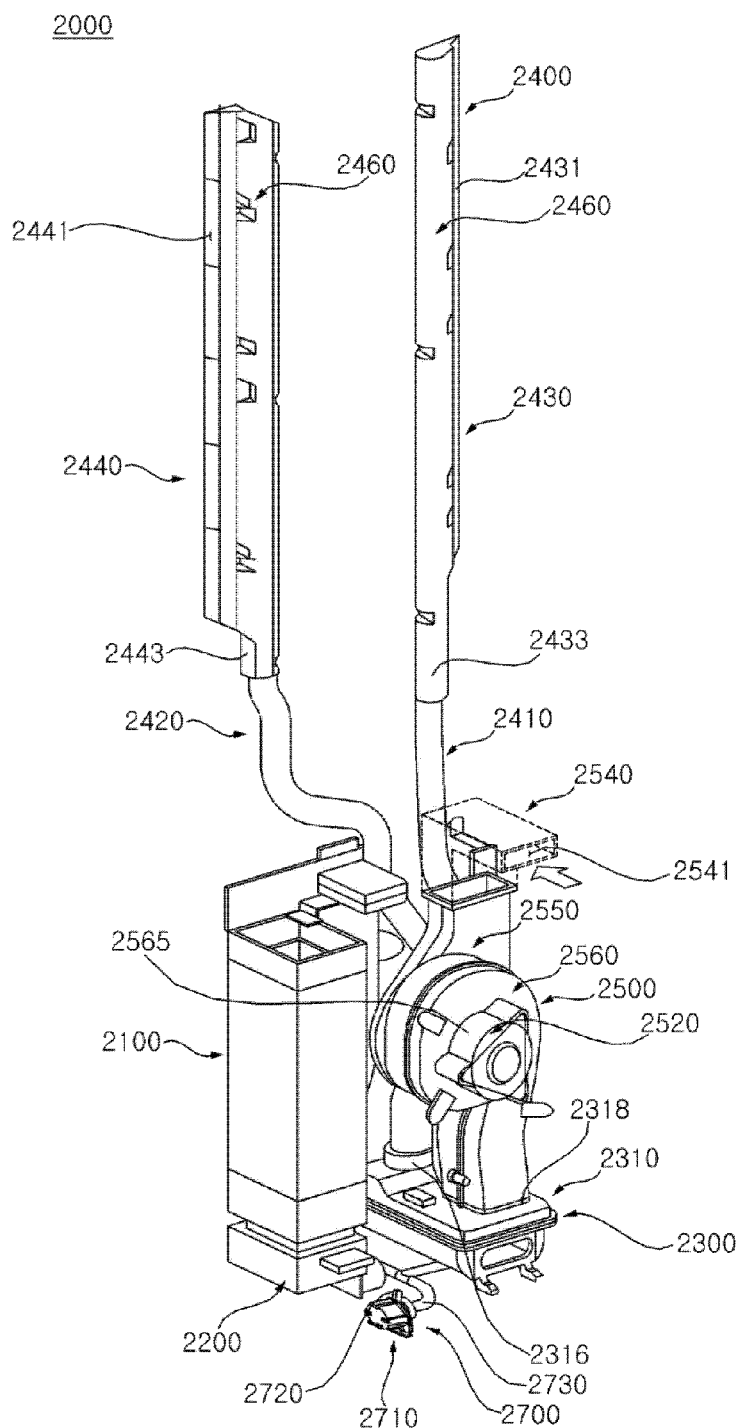

[FIG. 6]
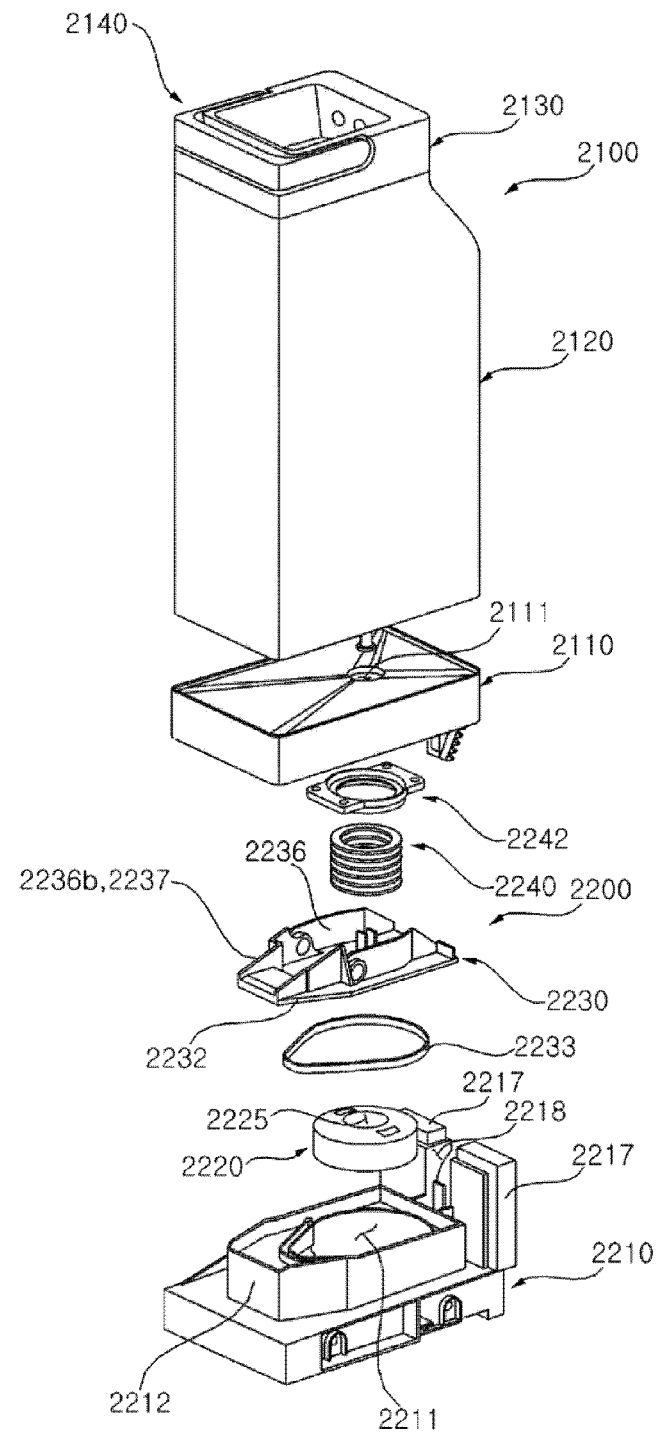

【FIG. 7】
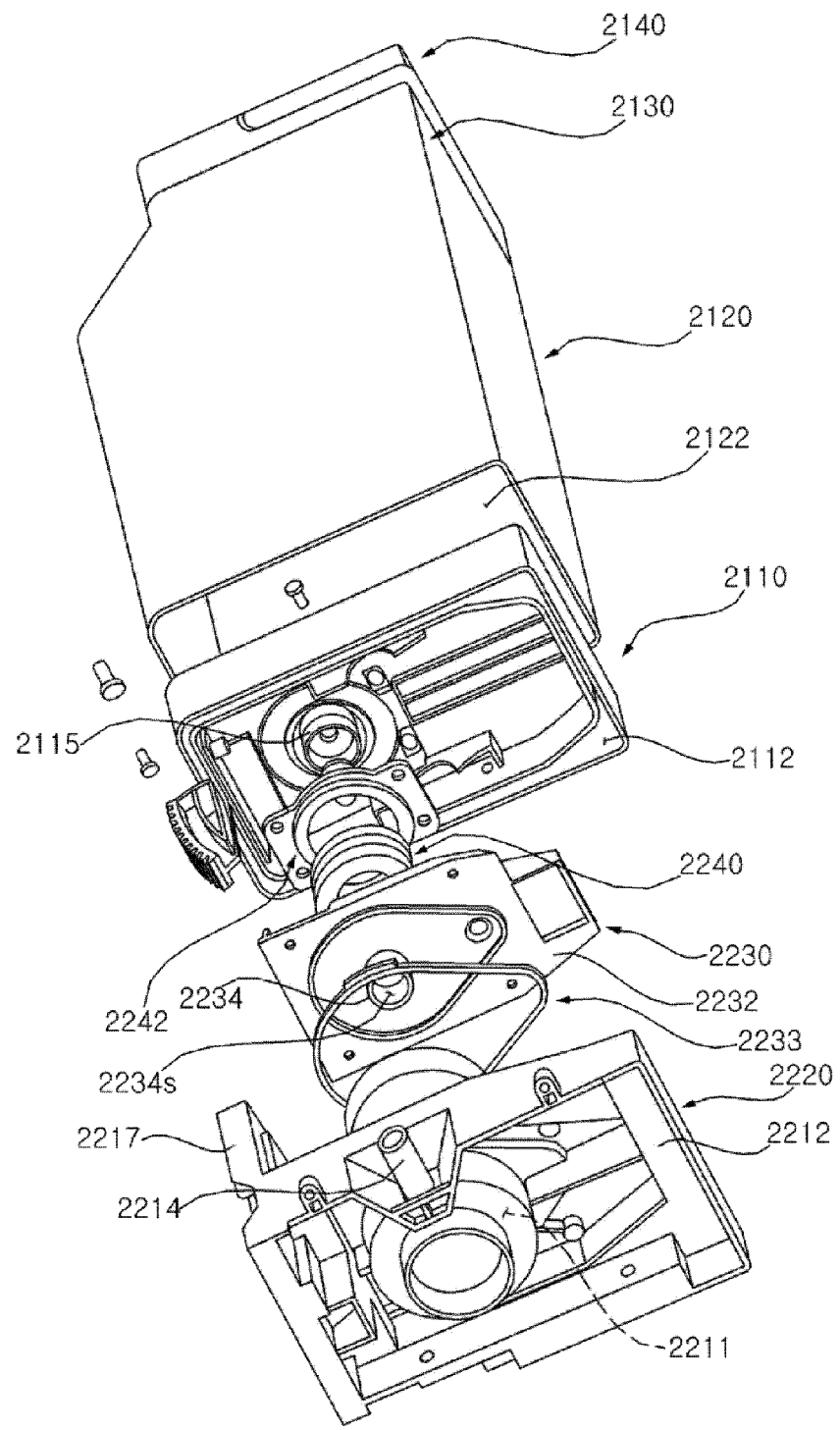

[FIG. 8]
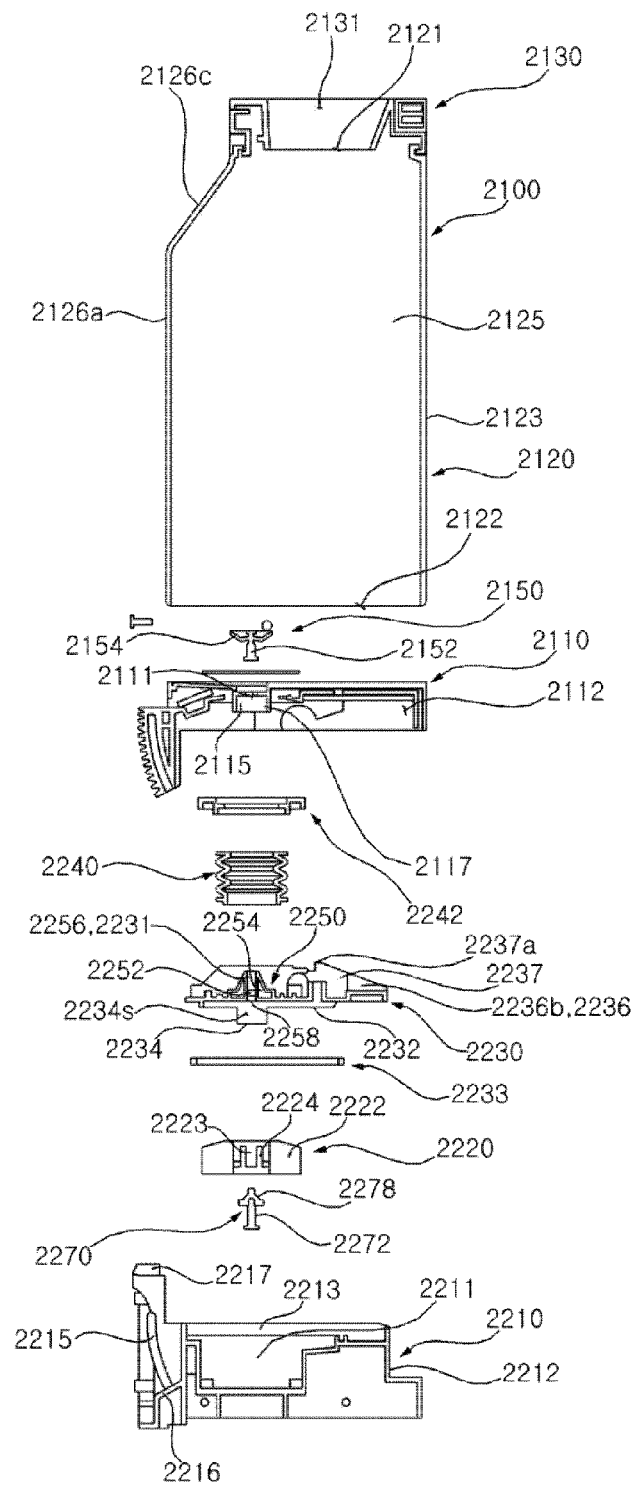

[FIG. 9]
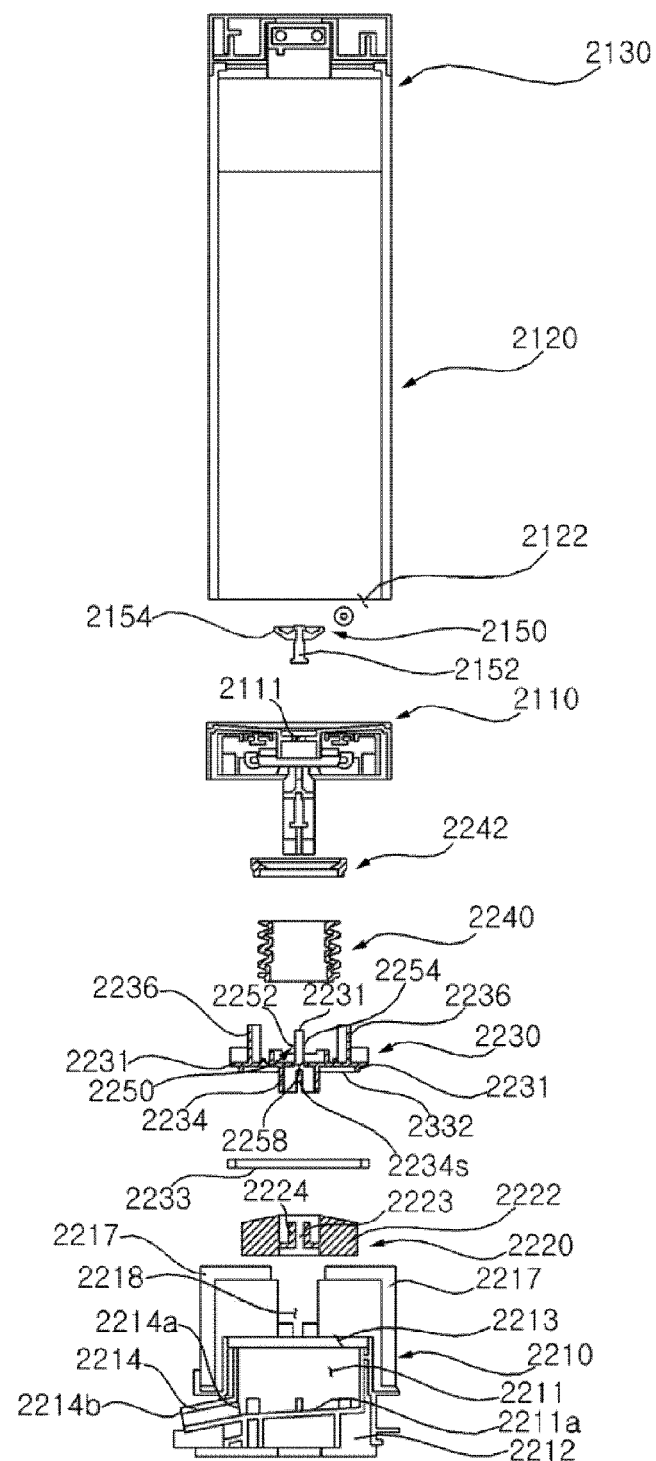

[FIG. 10]
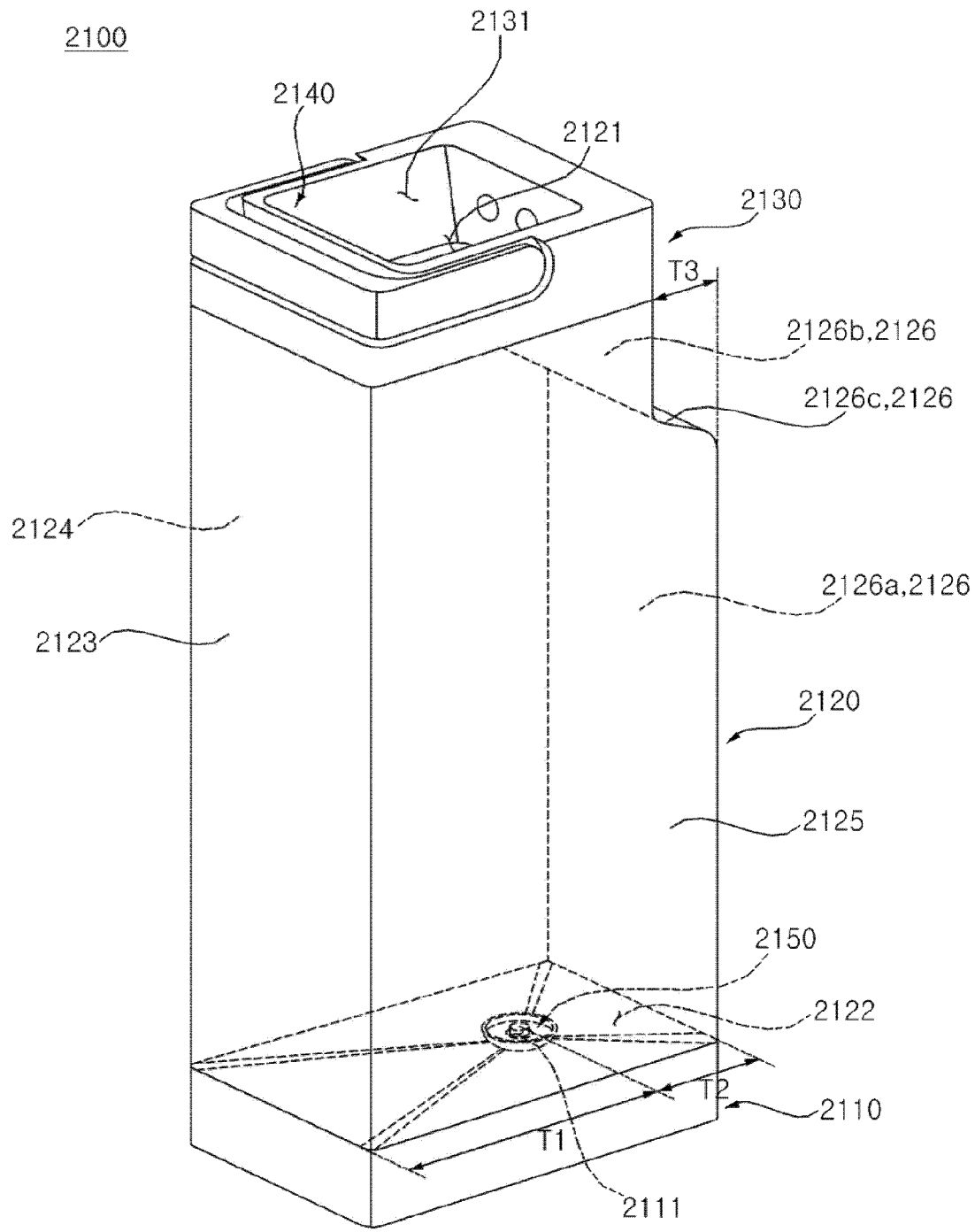

[FIG. 11]
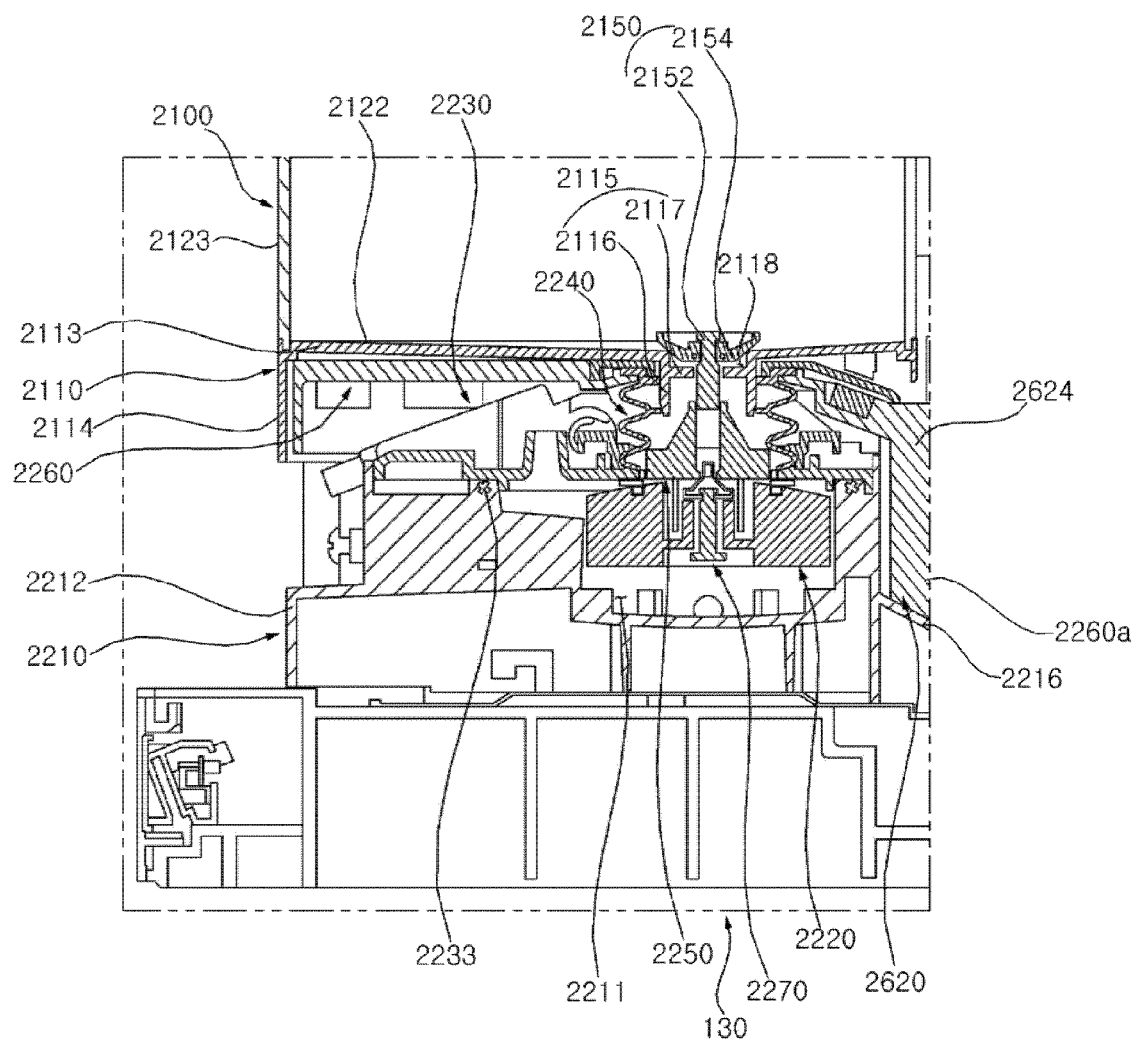

[FIG. 12]
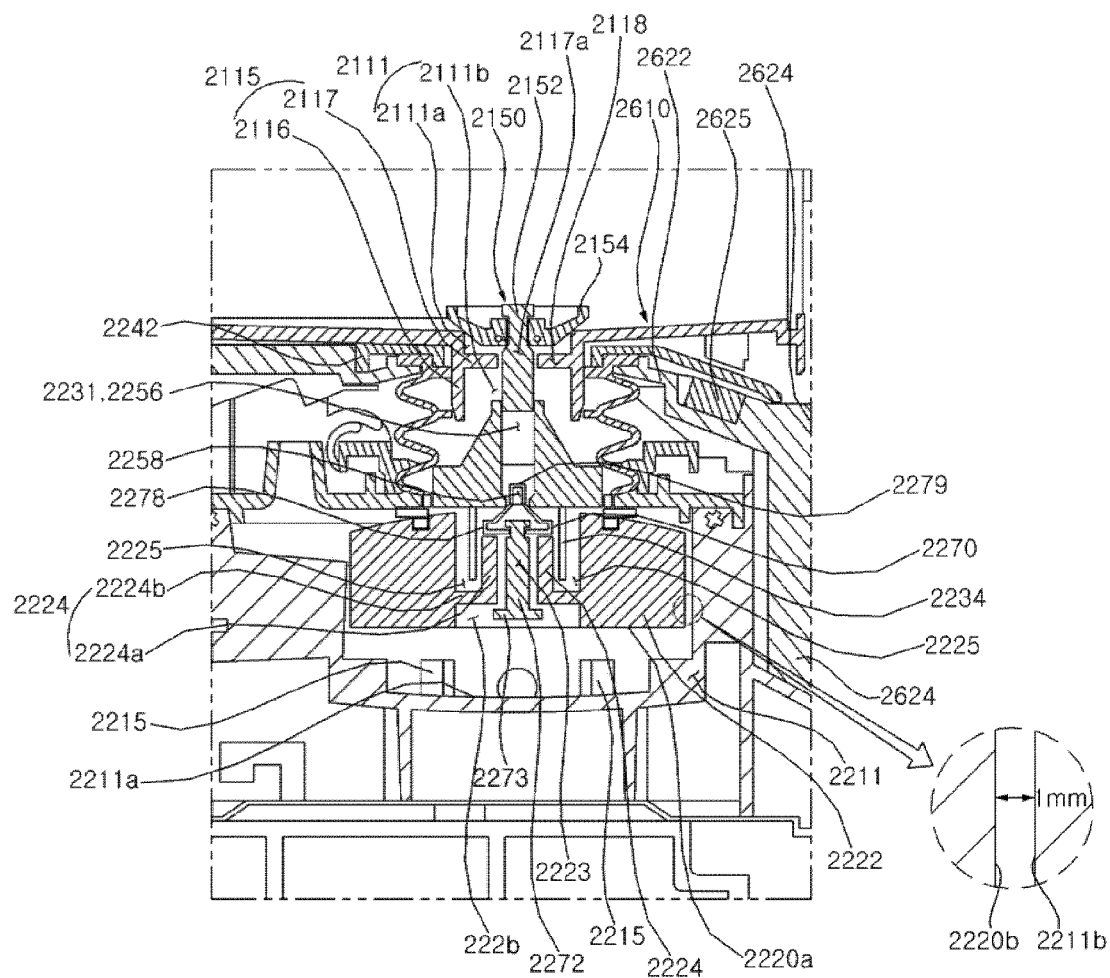

[FIG. 13]
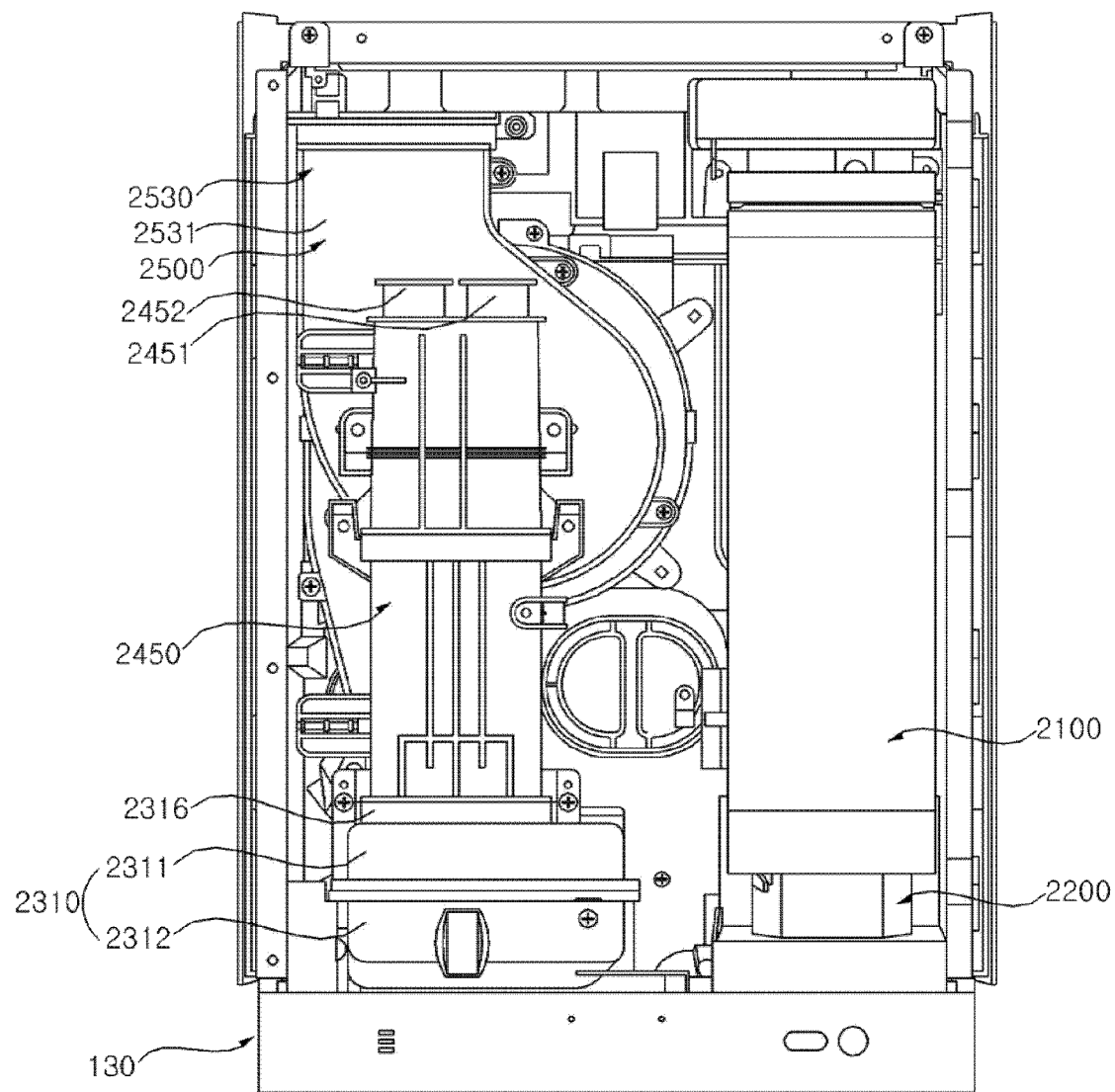

[FIG. 14]
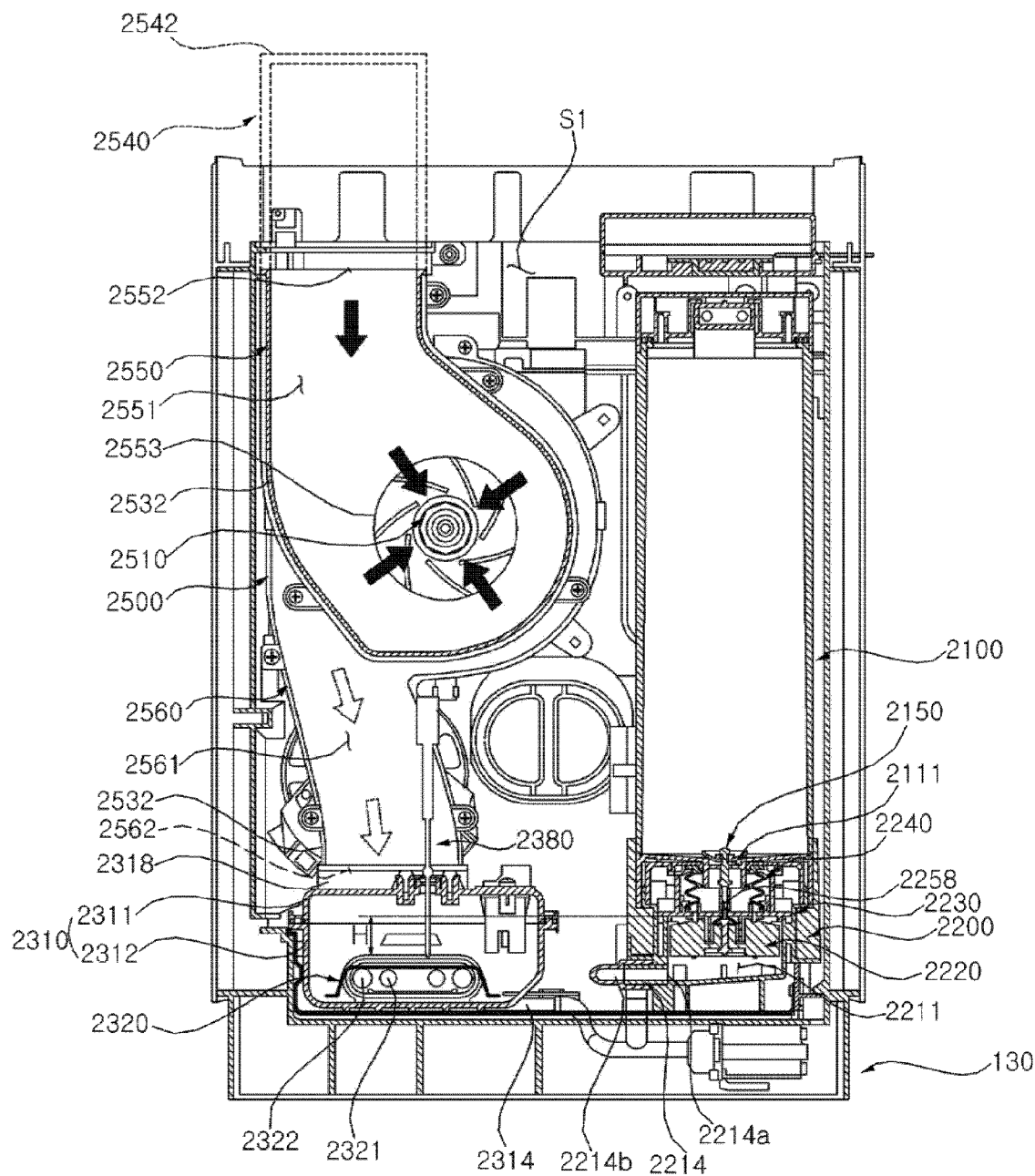

【FIG. 15】
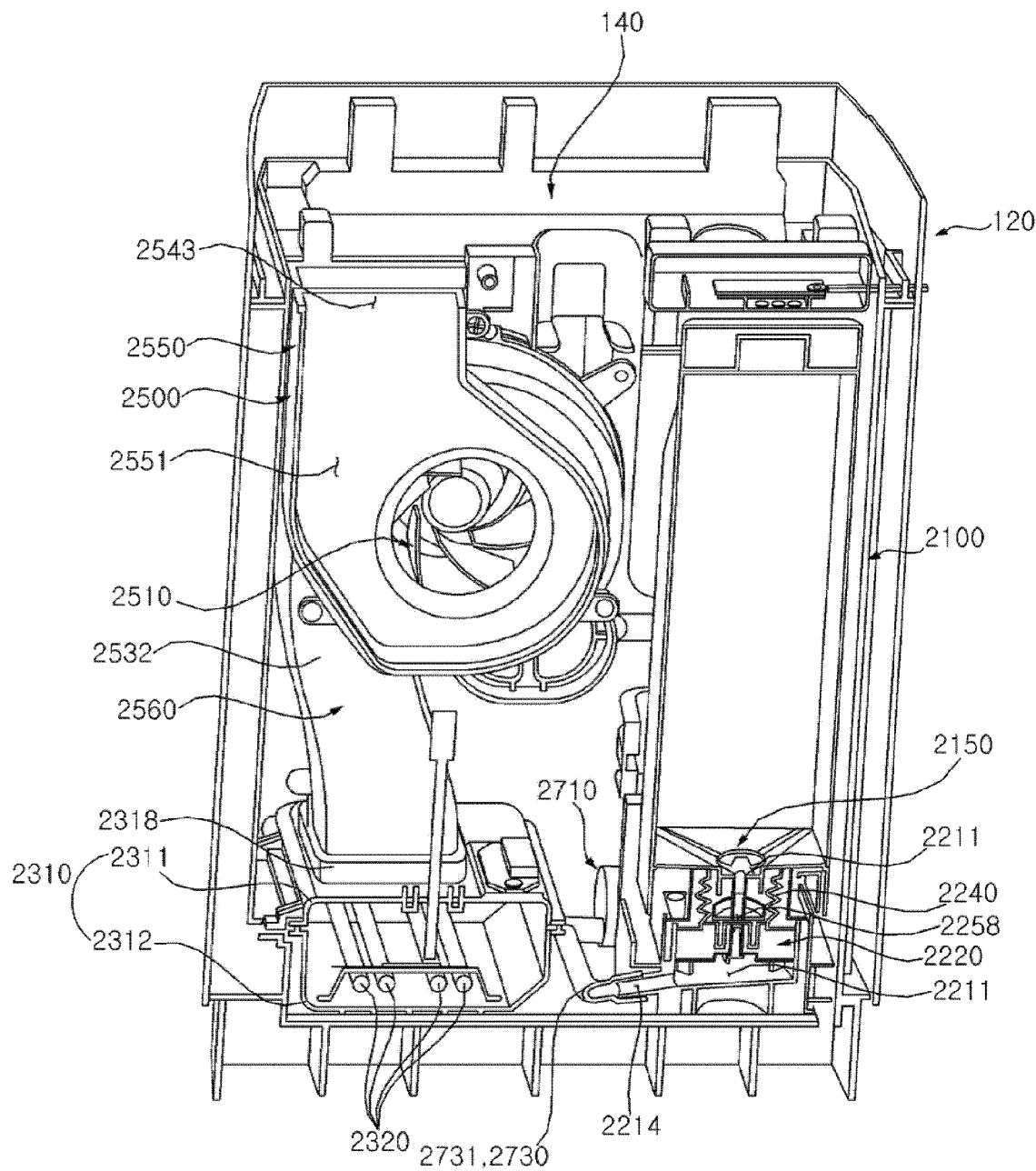

[FIG. 16]
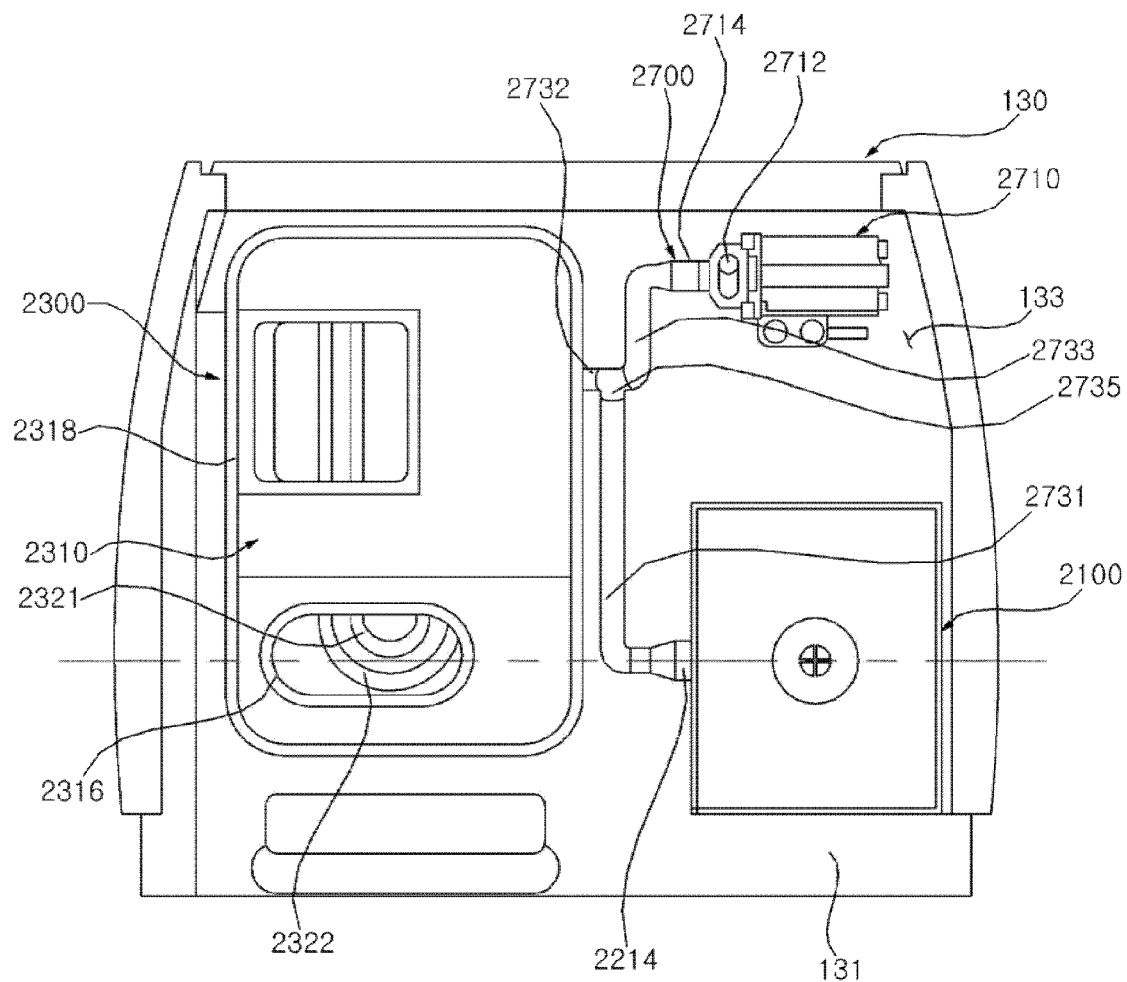

[FIG. 17]
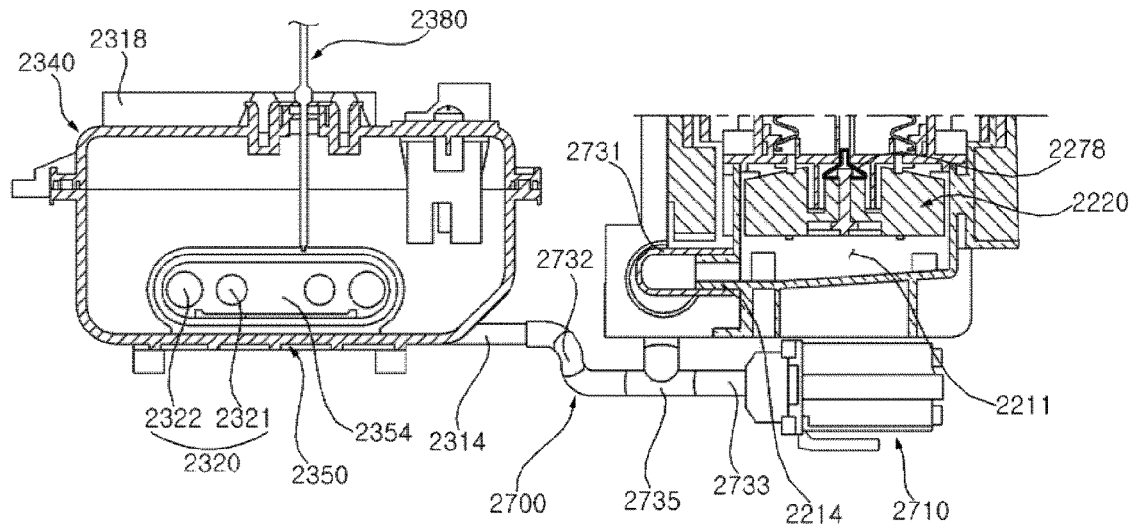
[FIG. 18]
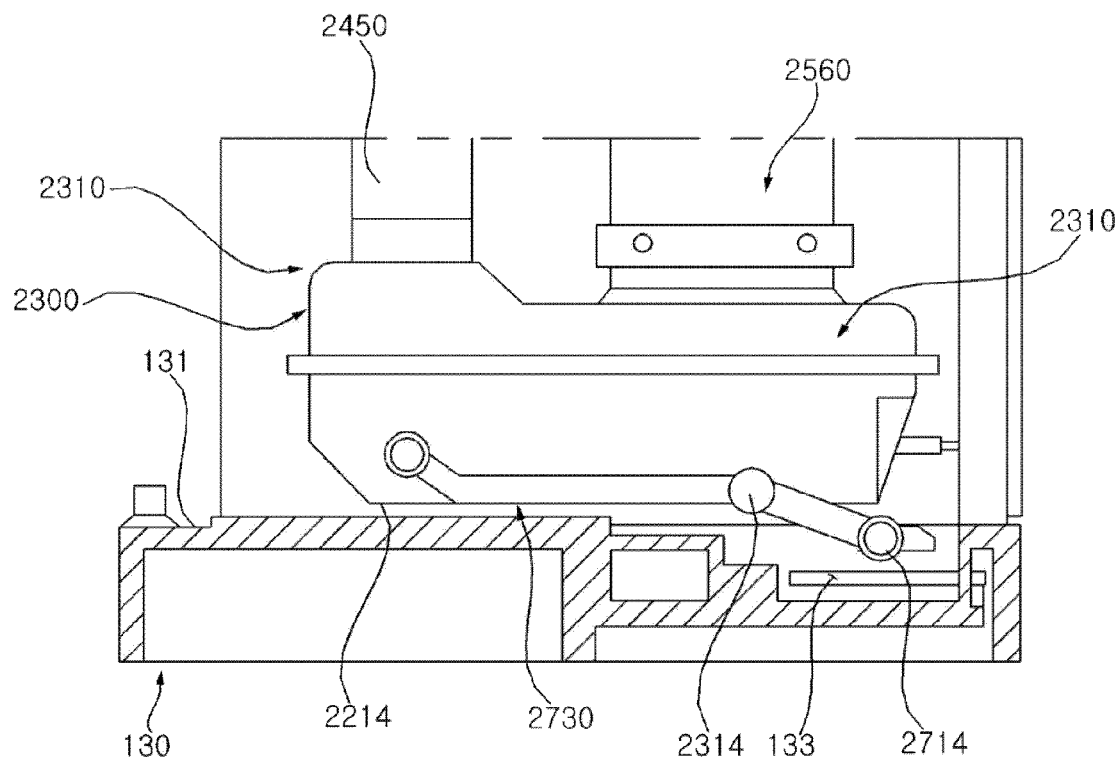

[FIG. 19]
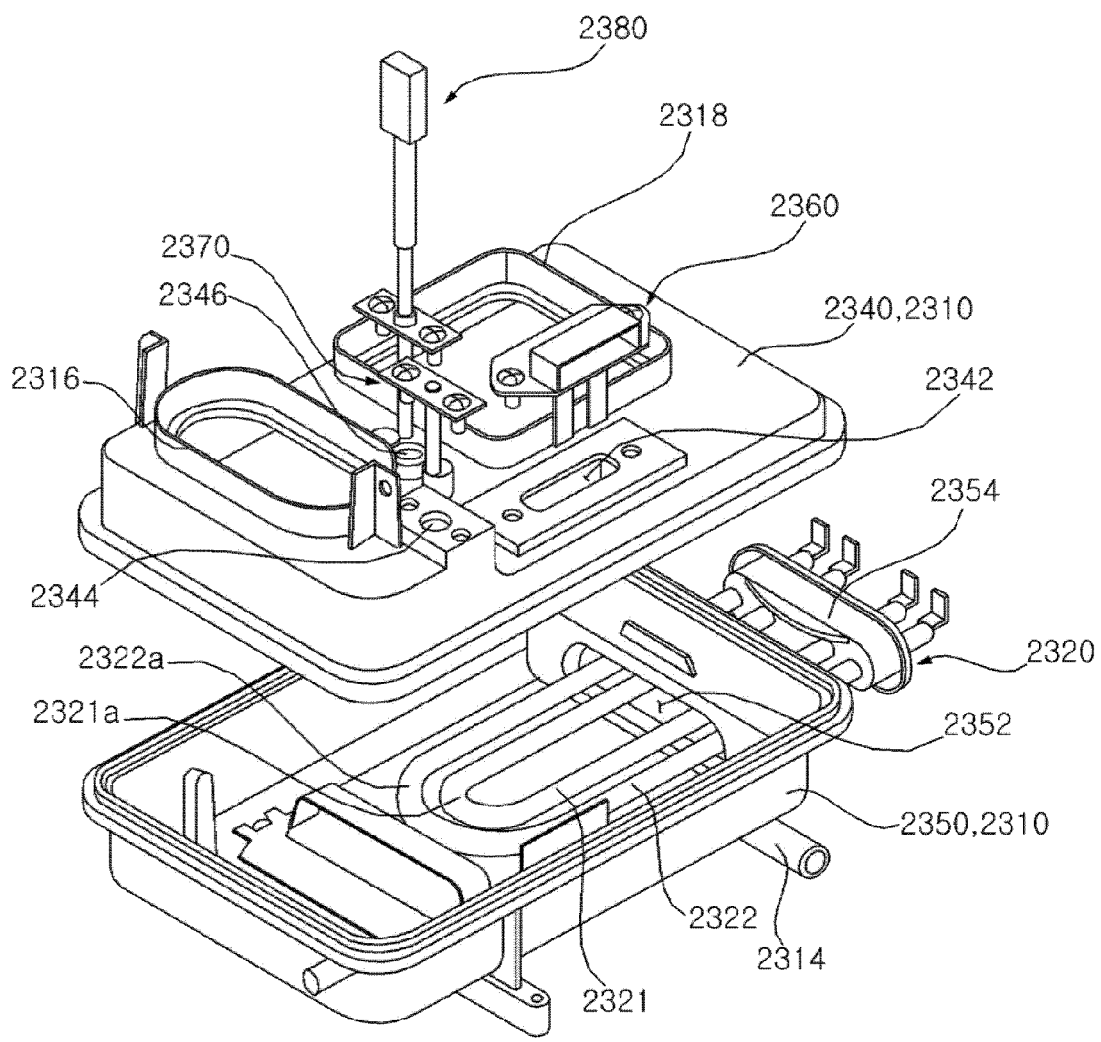

[FIG. 20]
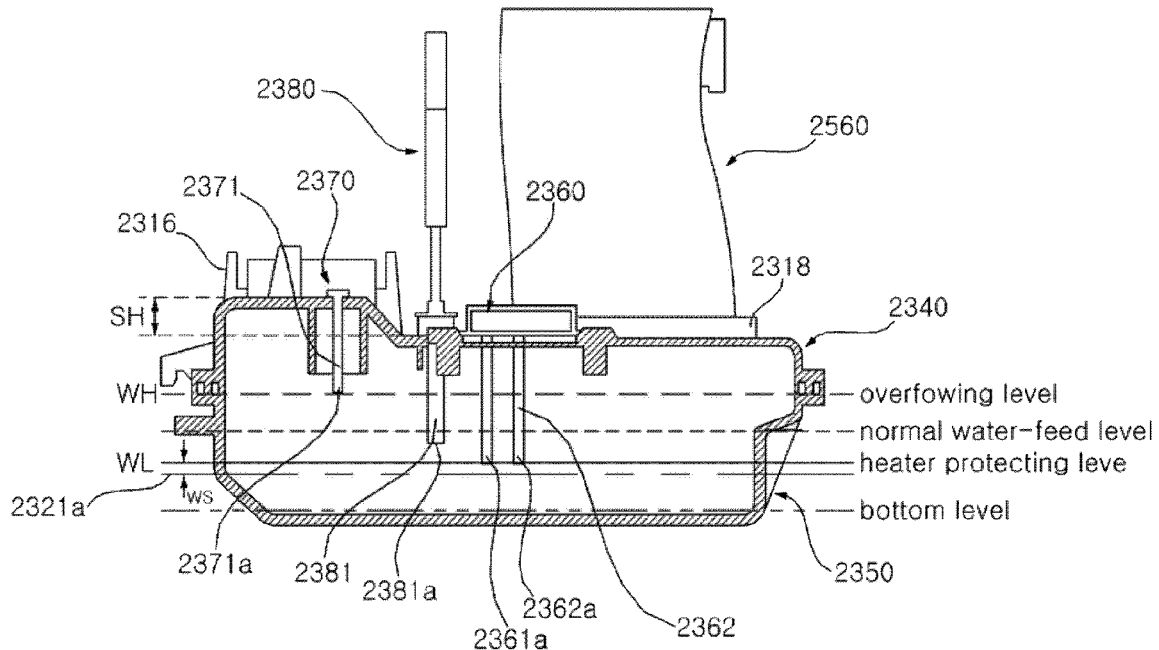
[FIG. 21]
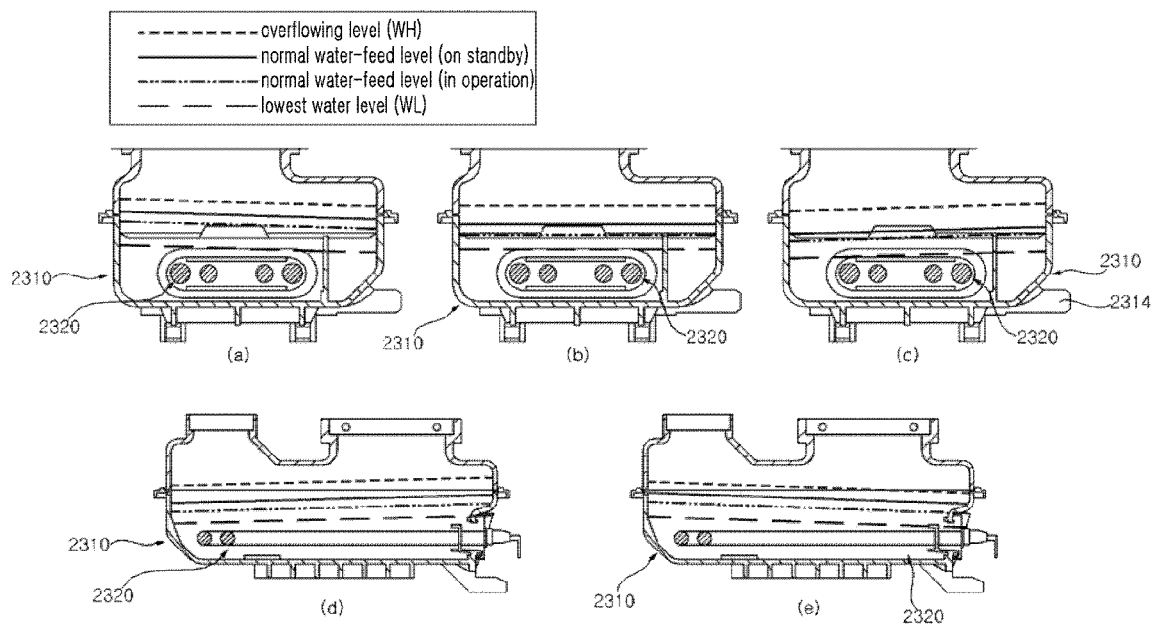

[FIG. 22]
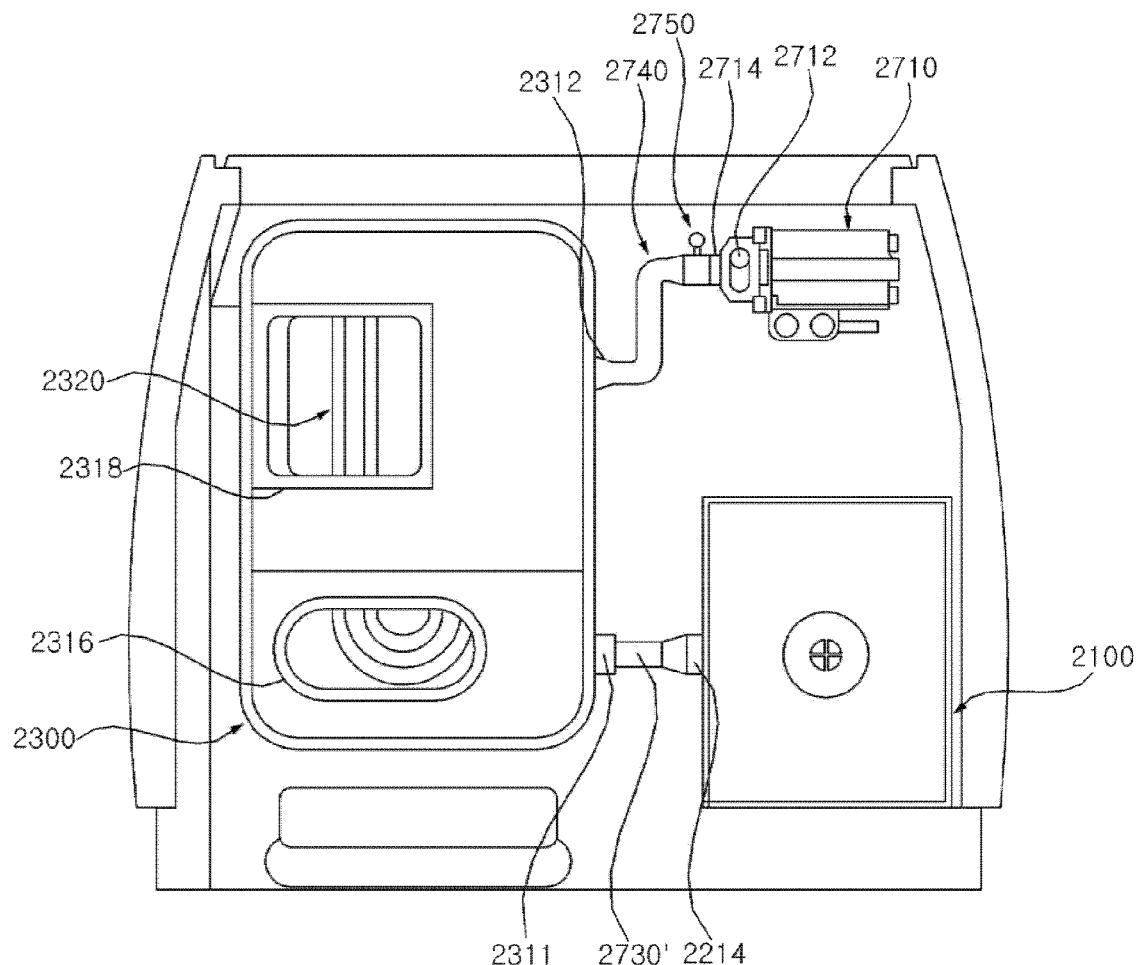
[FIG. 23]
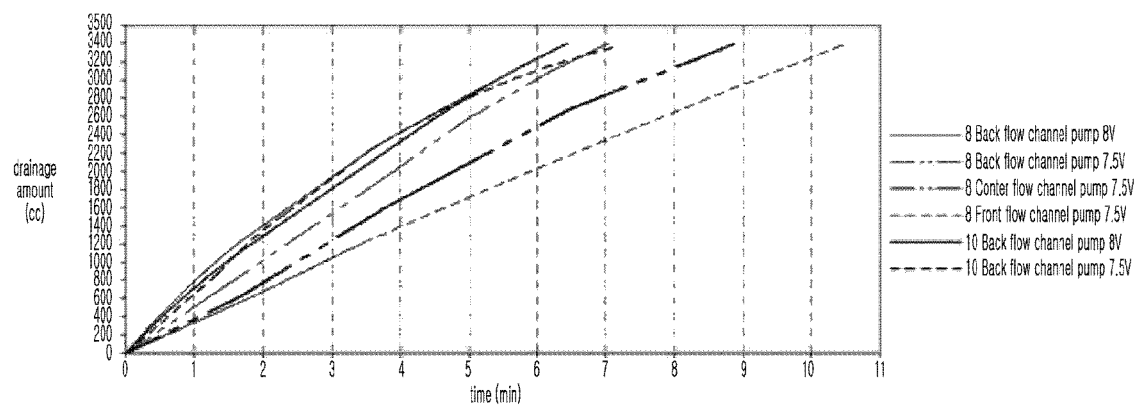

[FIG. 24]
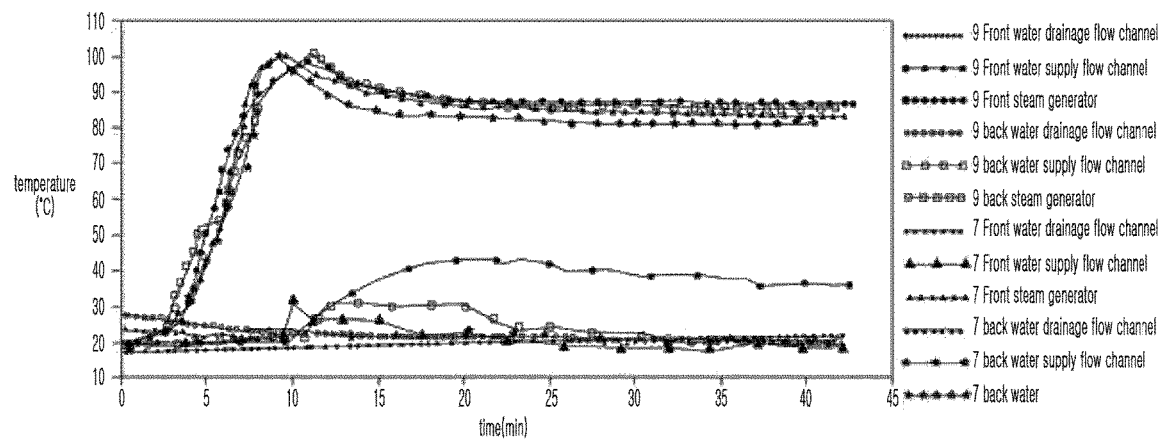
[FIG. 25]
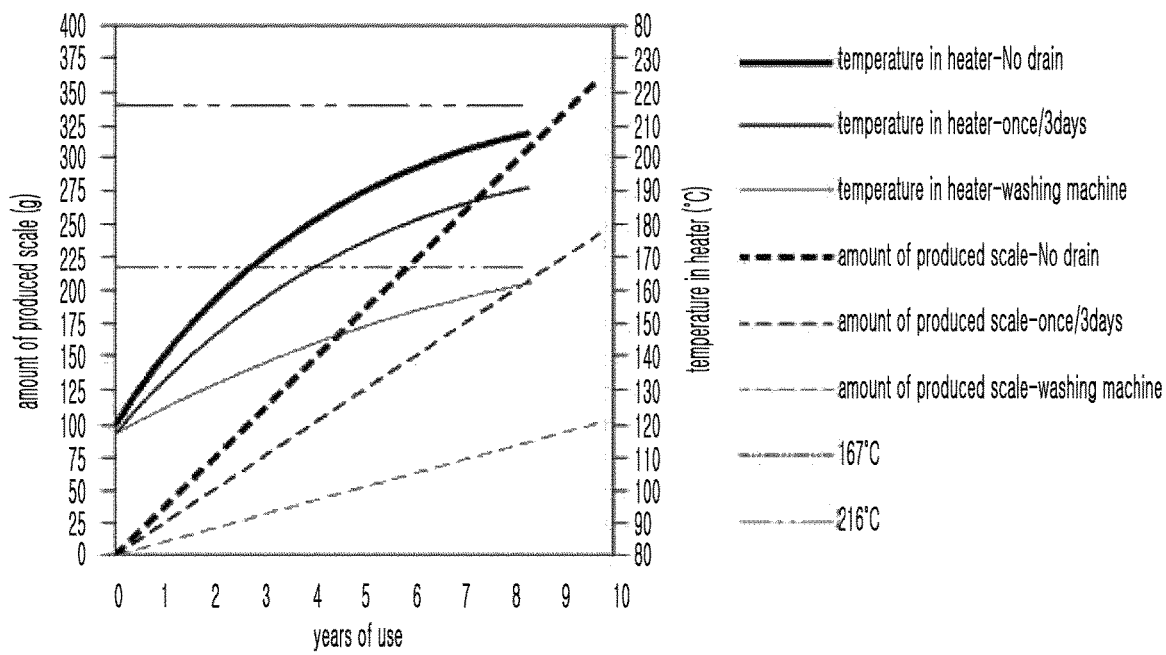

[FIG. 26]
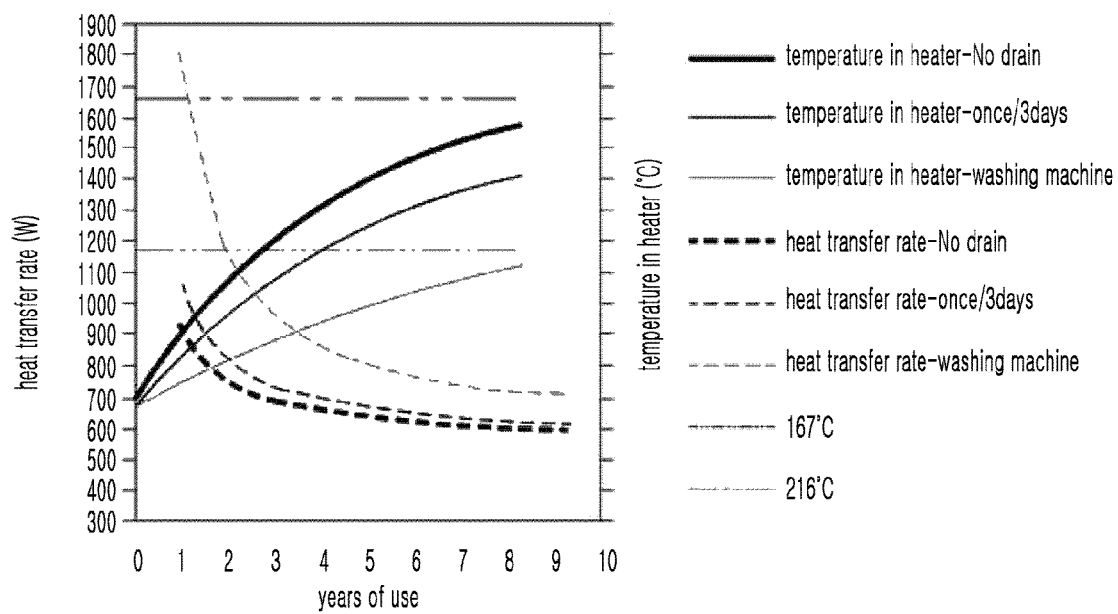

INDOOR UNIT FOR AN AIR CONDITIONER

CROSS-REFERENCE TO RELATED APPLICATION

This application is a National Stage Application of International Application No. PCT/KR2019/003028, filed on Mar. 15, 2019, which claims benefit of and priority to Korean Patent Application Nos.: KR10-2018-0030777, filed on Mar. 16, 2018, and KR10-2019-0024949, filed on Mar. 4, 2019, all of which are hereby incorporated by reference in their entirety for all purposes as if fully set forth herein.

TECHNICAL FIELD

The present disclosure relates to an indoor unit for an air conditioner, and more particularly, to an indoor unit for an air conditioner capable of generating steam through a steam generator and supplying humidified air to an indoor space using the generated steam.

BACKGROUND

For split air conditioners, an indoor unit is disposed in an indoor space, and an outdoor unit is disposed in an outdoor space. Air in the indoor space can be cooled, heated or dehumidified, using refrigerants circulating in the indoor unit and the outdoor unit.

The indoor unit of the split air conditioner can be classified as a standing indoor unit that stands on the floor, a wall-mounted indoor unit that is mounted on the wall in an indoor space, a ceiling-mounted indoor unit that is installed on the ceiling in an indoor space and the like, based on methods for installation.

A standing indoor unit of the related art can dehumidify air in an indoor space in a cooling mode, but cannot humidify air in an indoor space in a heating mode.

A standing air conditioner provided with a humidification apparatus capable of performing humidification functions is disclosed in Korean Patent Publication No. 10-2013-0109738.

The standing indoor unit according to Korean Patent Publication No. 10-2013-0109738 is provided with a humidification apparatus in a main body forming an exterior of the indoor unit. The humidification apparatus according to Korean Patent Publication No. 10-2013-0109738 has a structure in which water of a drain pan is stored in a water tank, the stored water is used to wet an absorption member, and the absorption member evaporates absorbed water naturally.

The humidification apparatus according to Korean Patent Publication No. 10-2013-0109738 uses condensate flowing from a heat exchanger, instead of clean water. Accordingly, water in the water tank can contain a large amount of foreign substances separated from a surface of the heat exchanger, and the foreign substances can be a breeding ground for fungi or germs.

Additionally, in the humidification apparatus according to Korean Patent Publication No. 10-2013-0109738, water is evaporated in the main body. Accordingly, the evaporated water can be attached to a component or a wall in the main body, and can help fungi or germs to spread.

In the humidification apparatus according to Korean Patent Publication No. 10-2013-0109738, water is evaporated in the main body, and even when a blowing fan operates, all the moisture evaporated by the blowing fan is not discharged to an indoor space, and when a temperature of an indoor heat exchanger is low, the moisture can be reattached to a surface of the indoor heat exchanger.

Further, when a temperature in an indoor space is low, humidity of air in the indoor space is also low. Accordingly, the indoor space, which needs to be humidified, is generally heated. As the humidification apparatus according to Korean Patent Publication No. 10-2013-0109738 provides a humidification function using condensate of the indoor heat exchanger, the humidification apparatus can perform the humidification function only in a cooling mode. In other words, the humidification apparatus cannot perform the humidification function because the condensate is not generated in a heating mode.

Additionally, a steam humidifier, which boils water to generate steam and discharges the generated steam to an indoor space to humidify air in the indoor space, is disclosed in Korean Utility Model No. 20-0446245.

The steam humidifier according to Korean Utility Model No. 20-0446245 has a structure in which a water tank, a water supply guide pipe, a heater pipe and a steam discharge pipe are provided, water is heated by the heater pipe, and steam is discharged to an indoor space through the steam discharge pipe. The steam humidifier according to Korean Utility Model No. 20-0446245 may supply water to the heater pipe using pressure of water stored in the water tank, but not drain the stored water.

In the humidification apparatuses according to Korean Patent Publication No. 10-2013-0109738 and Korean Utility Model No. 20-0446245, water is stored in the water tank. However, when the humidification apparatuses do not need to perform the humidification function, the water storage can be a breeding ground for fungi or germs because the humidification apparatuses are not provided with a structure for draining the water.

SUMMARY

The present disclosure is directed to an indoor unit for an air conditioner, which may drain water stored in a steam generator.

The present disclosure is directed to an indoor unit for an air conditioner, which may drain water stored in a water tank.

The present disclosure is directed to an indoor unit for an air conditioner, which may drain water in a water tank and water in a steam generator at the same time.

The present disclosure is directed to an indoor unit for an air conditioner, which may prevent a pipe, configured to supply water to a steam generator, from overheating when the steam generator operates.

The present disclosure is directed to an indoor unit for an air conditioner, which may lower a temperature of drained water when water heated by a steam generator is drained.

The present disclosure is directed to an indoor unit for an air conditioner, which may supply an optimal amount of water for generating steam without a valve operated according to an electric signal.

The present disclosure is directed to an indoor unit for an air conditioner, which may control water supply on the basis of a level of water stored in a steam generator.

The present disclosure is directed to an indoor unit for an air conditioner, which may control supply of water from a water tank through a supply floater that moves in an up-down direction on the basis of a level of water stored in a steam generator.

The present disclosure is directed to an indoor unit for an air conditioner, which may drain water in a water tank and water in a steam generator at the same time on the basis of kinetic energy of the water.

Objectives are not limited to the above-described ones, and other objectives that have not been mentioned can be clearly understood by one having ordinary skill in the art to which the present disclosure pertains from the following descriptions.

According to the present disclosure, a water level of a steam generator may be linked with a water level of a supply chamber that supplies water to the steam generator, and a supply floater, moving downwards or upwards based on the water level of the supply chamber, may open and close a supply flow channel that supplies water to the supply chamber, thereby enabling control over water supply based on a level of water stored in the steam generator.

According to the present disclosure, a water connection pipe may connect a water tank, a steam generator, and a drain pump at the same time, thereby enabling water stored in the water tank and water stored in the steam generator to be drained at the same time.

According to the present disclosure, the water connection pipe may connect a water tank, a steam generator, and a drain pump at the same time, and a pipe, configured to supply water to the steam generator on the basis of operation of the steam generator, may receive low-temperature water from the water tank, thereby making it possible to prevent the water connection pipe from overheating.

According to the present disclosure, when water heated by the steam generator is drained, water drained from the steam generator and water drained from the water tank may be mixed in a three-way pipe, thereby making it possible to lower a temperature of the drained water.

According to the present disclosure, a water level of the steam generator and a water level of the supply chamber that supplies water to the steam generator may be linked, thereby making it possible to supply an optimal amount of water required for generating steam, without a valve operating according to an electric signal.

According to the present disclosure, the water connection pipe may connect a water tank, a steam generator, and a drain pump at the same time, and the drain pump may be disposed lower than the water tank and the steam generator, thereby making it possible to drain water stored in the water tank and water stored in the steam generator at the same time on the basis of kinetic energy of the water.

According to the present disclosure, the indoor unit may include: a water tank configured to store water; a steam generator disposed at a cabinet assembly, supplied with water stored in the water tank and configured to convert water stored therein into steam and to generate humidified air; a supply chamber housing disposed at a lower side of the water tank; a supply chamber formed at the supply chamber housing and configured to temporarily store water supplied by the water tank; a supply flow channel disposed between the water tank and the supply chamber housing and allowing water in the water tank to flow to the supply chamber; a supply floater disposed in the supply chamber, made of a material having a lower density than water and configured to move in an up-down direction in the supply chamber depending on a level of water stored in the supply chamber; and a water connection pipe configured to connect the supply chamber housing and the steam generator and to allow an inside of the steam generator to communicate with the supply chamber. As the supply floater may move downwards or upwards depending on a water level of the supply chamber to open and close the supply flow channel, a normal water-feed level of the steam generator may be maintained based on kinetic energy of water, and an amount of water supplied to the steam generator may be automatically controlled.

The indoor unit may further include a rib disposed in the supply chamber and configured to space a bottom surface of the supply floater apart from a bottom surface of the supply chamber, thereby making it possible to solve the problem that the supply floater is attached to the supply chamber and cannot move due to surface tension of water.

The indoor unit may further include a chamber housing pipe disposed in the supply chamber housing, configured to communicate with an inside of the supply chamber, and coupled to the water connection pipe, wherein an outer end of the chamber housing pipe may be disposed lower than a bottom surface of the supply chamber, thereby making it possible to allow water in the supply chamber to flow to the chamber housing pipe based on a difference in kinetic energies of the water.

The bottom surface of the supply chamber may be formed to incline towards an inner end of the chamber housing pipe, thereby making it possible to allow water in the supply chamber to flow to the chamber housing pipe based on a difference in kinetic energies of the water.

The indoor unit may further include a water pipe configured to communicate with an inside of the steam generator and coupled to the water connection pipe, wherein the water pipe may be disposed lower than the chamber housing pipe, thereby making it possible to allow water in the chamber housing pipe to flow to the steam generator based on a difference in kinetic energies of the water.

The supply floater may be disposed higher than the chamber housing pipe, thereby making it possible to prevent the chamber housing pipe from clogging even when the supply floater moves downwards.

The indoor unit may further include: a chamber housing pipe disposed in the supply chamber housing, configured to communicate with the inside of the supply chamber and coupled to the water connection pipe; a water pipe configured to communicate with the inside of the steam generator and coupled to the water connection pipe; and a drain pump configured to drain water of the steam generator, wherein the water connection pipe may include: a first connection pipe connected to the chamber housing pipe; a second connection pipe connected to the water pipe; a third connection pipe connected to the drain pump; and a three-way pipe connected to the first connection pipe, the second connection pipe and the third connection pipe, thereby making it possible to drain water stored in the water tank and water stored in the steam generator at the same time through the drain pump.

The drain pump may further include a drain inlet connected to the third connection pipe, the water pipe is disposed lower than the chamber housing pipe and higher than the drain inlet, and when water stored in the water tank and water stored in the steam generator are drained at the same time through the drain pump, the water drained from the water tank and the water drained from the steam generator may be mixed, thereby making it possible to lower a temperature of the water drained from the steam generator.

The indoor unit may further include a steam heater disposed in the steam generator and configured to generate heat using supplied power, wherein the steam heater may be disposed further downwards than an upper end of the supply floater, thereby making it possible to keep a level of water supplied to the steam heater at a lowest level or above.

As a water level of the supply chamber is higher than an upper surface of the steam heater when the steam heater operates, a water level of the steam generator may be higher than the upper surface of the steam heater, thereby making it possible to prevent the steam heater from being exposed in the air.

When water stored in the steam generator is at a maximum level, the supply floater may move upwards on the basis of a water level of the supply chamber and may close the supply flow channel, thereby making it possible to block water in the supply chamber from being additionally supplied to the steam generator.

An inner end of the chamber housing pipe may communicate with the supply chamber, an outer end of the chamber housing pipe may be connected to the first connection pipe, the outer end of the chamber housing pipe may be disposed higher than the water pipe, and the inner end of the chamber housing pipe may be disposed lower than a lower end of the supply floater, thereby making it possible to prevent water from being collected in the supply chamber on the basis of a difference in kinetic energies of water.

The water tank may be disposed further forwards than the drain pump, the steam generator may be disposed in a lateral direction of the water tank, and the water pipe may be disposed between the chamber housing pipe and the drain inlet with respect to a front-rear direction, thereby making it possible to delay an increase in temperature of the water pipe when the steam generator operates.

The indoor unit may further include a water tank valve disposed at a lower portion of the water tank, wherein the water tank valve may be disposed further upwards than the supply flow channel, and the supply floater may be disposed further downwards than the supply flow channel, thereby making it possible to allow water discharged from the water tank to flow to the supply chamber on the basis of self-weight of the water.

The indoor unit may further include a supply support body at which the water tank is detachably held, which is disposed at an upper side of the supply chamber housing and which covers the upper side of the supply chamber; a valve supporter protruding upwards from the supply support body and configured to contact the water tank valve and to open the water tank valve when the water tank is held; and a water bellows disposed between the water tank and the supply support body, configured to surround the valve supporter, provided with the valve supporter therein and configured to block water discharged from the water tank valve from leaking.

The supply flow channel may include a middle hole formed to pass through the supply support body in an up-down direction and configured to guide water supplied by the water tank to the supply chamber, thereby making it possible to allow water discharged from the water tank to flow to the supply chamber through the middle hole on the basis of self-weight of the water.

The supply floater may further include: a floater body made of a material having a lower density than water; and a floater valve disposed at the floater body, protruding further upwards than an upper surface of the floater body and disposed at a lower side of the middle hole, wherein the floater valve may open and close the middle hole depending on a water level of the supply chamber.

The floater valve may further include: a floater valve core made of a material having a higher density than the floater body and water and disposed to pass through the floater body in the up-down direction; and a floater valve stopper coupled to an upper end of the floater valve core, wherein the floater valve stopper may be disposed at a lower side of the middle hole, may move in the up-down direction depending on a water level of the supply chamber and may open and close the middle hole.

The indoor unit may further include: a drain pump configured to drain water in the steam generator; a drainage connection pipe connecting the steam generator and the drain pump; and a drainage valve disposed at the drainage connection pipe and configured to control a flow of water passing through the drainage connection pipe.

Thus, when the steam generator operates, the drainage valve may prevent high-temperature water from flowing into the drain pump.

Advantageous Effects

An indoor unit for an air conditioner according to the present disclosure has one or more advantages that are described hereunder.

First, a water level of a steam generator may be linked with a water level of a supply chamber that supplies water to the steam generator, and a supply floater, moving downwards or upwards based on the water level of the supply chamber, may open and close a supply flow channel that supplies water to the supply chamber, thereby enabling control over water supply based on a level of water stored in the steam generator.

Second, the water connection pipe may connect a water tank, a steam generator, and a drain pump at the same time, thereby enabling water stored in the water tank and water stored in the steam generator to be drained at the same time.

Third, the water connection pipe may connect a water tank, a steam generator, and a drain pump at the same time, and a pipe, configured to supply water to the steam generator on the basis of operation of the steam generator, may receive low-temperature water from the water tank, thereby making it possible to prevent the water connection pipe from overheating.

Fourth, when water heated by the steam generator is drained, water drained from the steam generator and water drained from the water tank may be mixed in a three-way pipe, thereby making it possible to lower a temperature of the drained water.

Fifth, a water level of the steam generator and a water level of the supply chamber that supplies water to the steam generator may be linked, thereby making it possible to supply an optimal amount of water required for generating steam without a valve operating according to an electric signal.

Sixth, the water connection pipe may connect a water tank, a steam generator, and a drain pump at the same time, and the drain pump may be disposed lower than the water tank and the steam generator, thereby making it possible to drain water stored in the water tank and water stored in the steam generator at the same time on the basis of kinetic energy of the water.

Seventh, the supply floater may move downwards or upwards based on a water level of the supply chamber to open and close the supply flow channel, thereby making it possible to maintain a normal water-feed level of the steam generator and to automatically control an amount of water supplied to the steam generator on the basis of kinetic energy of water.

Eighth, a rib may be disposed in the supply chamber, and may space a bottom surface of the supply floater apart from a bottom surface of the supply chamber, thereby making it possible to solve the problem that the supply floater becomes attached to the supply chamber due to surface tension of water and does not move.

Ninth, an outer end of a chamber housing pipe may be disposed lower than the bottom surface of the supply chamber, thereby making it possible to allow water in the supply chamber to flow to the chamber housing pipe on the basis of a difference in kinetic energies of the water.

Tenth, the bottom surface of the supply chamber may be formed to incline towards an inner end of the chamber housing pipe, thereby making it possible to allow water in the supply chamber to flow to the chamber housing pipe on the basis of a difference in kinetic energies of the water.

Eleventh, a water pipe, which communicates with an inside of the steam generator and coupled to the water connection pipe, may be further provided, and the water pipe may be disposed lower than the chamber housing pipe, thereby making it possible to allow water in the chamber housing pipe to flow to the steam generator on the basis of a difference in kinetic energies of the water.

Twelfth, the supply floater may be disposed higher than the chamber housing pipe, thereby making it possible to prevent the chamber housing pipe from clogging even when the supply floater moves downwards.

Thirteenth, the water connection pipe may include: a first connection pipe connected to the chamber housing pipe; a second connection pipe connected to the water pipe; a third connection pipe connected to the drain pump; and a three-way pipe connected to the first connection pipe, the second connection pipe and the third connection pipe, thereby making it possible to drain water stored in the water tank and water stored in the steam generator at the same time through the drain pump.

Fourteenth, with the above-described structure of the water connection pipe, an increase in temperature of the steam generator may be suppressed, and drainage of an entire humidification assembly may be readily implemented.

Fifteenth, as the water pipe may be disposed lower than the chamber housing pipe and may be disposed higher than a drain inlet, water drained from the water tank and water drained from the steam generator may be mixed when water stored in the water tank and water stored in the steam generator are drained at the same time, thereby making it possible to lower a temperature of the water drained from the steam generator.

Sixteenth, a steam heater may be disposed further downwards than an upper end of the supply floater, thereby making it possible to keep a level of water supplied to the steam heater at a lowest water level or above.

Seventeenth, as a water level of the supply chamber is higher than an upper surface of the steam heater when the steam heater operates, a water level of the steam generator may be higher than the upper surface of the steam heater, thereby making it possible to prevent the steam heater from being exposed in the air.

Eighteenth, when water stored in the steam generator is at a maximum level, the supply floater may move upwards on the basis of a water level of the supply chamber and may close the supply flow channel, thereby making it possible to block water in the supply chamber from being additionally supplied to the steam generator.

Nineteenth, an inner end of the chamber housing pipe may communicate with the supply chamber, an outer end of the chamber housing pipe may be connected to the first connection pipe, the outer end of the chamber housing pipe may be disposed higher than the water pipe, and the inner end of the chamber housing pipe may be disposed lower than a lower end of the supply floater, thereby making it possible to prevent water from being collected in the supply chamber on the basis of a difference in kinetic energies of water.

Twentieth, the supply flow channel may be formed to pass through a supply support body in an up-down direction, and may include a middle hole configured to guide water, supplied by the water tank, to the supply chamber, thereby making it possible to allow water, discharged from the water tank based on self-weight of the water, to the supply chamber through the middle hole.

Twenty first, a floater valve may open and close the middle hole depending on a water level of the supply chamber.

Twenty second, a floater valve stopper may be disposed at a lower side of the middle hole, may move in the up-down direction depending on a water level of the supply chamber, and may open and close the middle hole.

Twenty third, according to the present disclosure, as a drain pump configured to drain water in the steam generator, a drainage connection pipe connecting the steam generator and the drain pump, and a drainage valve disposed at the drainage connection pipe and configured to control a flow of water passing through the drainage connection pipe may be further provided, the drainage valve may block high-temperature water from flowing into the drain pump when the steam generator operates.

BRIEF DESCRIPTION OF DRAWINGS

FIG. 1 is a perspective view illustrating an exemplary indoor unit for an air conditioner.

FIG. 2 is a partially exploded perspective view of FIG. 1.

FIG. 3 is a view illustrating an indoor unit where a door assembly is separated from FIG. 1.

FIG. 4 is a perspective view illustrating a humidification assembly and a water tank assembled to the lower cabinet in FIG. 1.

FIG. 5 is a perspective view illustrating a rear of an exemplary humidification assembly.

FIG. 6 is an exploded perspective view illustrating an exemplary water tank and an exemplary water supply assembly.

FIG. 7 is an exploded perspective view seen from a lower side of FIG. 6.

FIG. 8 is a left-side sectional view of FIG. 6.

FIG. 9 is a front sectional view of FIG. 6.

FIG. 10 is a perspective view illustrating the water tank in FIG. 6.

FIG. 11 is a cross-sectional view illustrating an exemplary water tank and an exemplary water supply assembly.

FIG. 12 is an enlarged view of FIG. 11.

FIG. 13 is a front view illustrating an inside of the lower cabinet in FIG. 3.

FIG. 14 is a cross-sectional view illustrating the water supply assembly and the steam generator in FIG. 13.

FIG. 15 is a perspective view of FIG. 14.

FIG. 16 is a plan view illustrating an exemplary drain assembly.

FIG. 17 is a front cross-sectional view of the drain assembly in FIG. 16.

FIG. 18 is a right-side view of the drain assembly in FIG. 16.

FIG. 19 is an exploded perspective view of the steam generator in FIG. 5.

FIG. 20 is a view of an example where water levels are marked at the steam generator in FIG. 19.

FIG. 21 is a view of an example where water levels are marked in a steam generator when an indoor unit tilts.

FIG. 22 is a plan view illustrating a second exemplary structure where a steam generator, a water tank, and a drain pump are connected for water supply and water drainage.

FIG. 23 is a graph of speeds of drainage of water based on a diameter of an exemplary water pipe, an arrangement thereof, and a voltage supplied to a drain pump.

FIG. 24 is a graph of a change in temperatures of a water supply flow channel and a water drainage flow channel in a steam generator based on a diameter of an exemplary water pipe and an arrangement thereof.

FIG. 25 is a graph of results of comparison between generation of scale and temperature of a steam heater on the basis of an operation cycle of a drain pump according to an exemplary embodiment, and generation of scale and temperature of a steam heater in a washer.

FIG. 26 is a graph of results of comparison between inner temperature and a heat transfer rate of a heater on the basis of an operation cycle of a drain pump according to an exemplary embodiment, and inner temperature and a heat transfer rate of a heater in a washer.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

As used herein, various singular forms "a," "an" and "the" are intended to include various plural forms as well, unless context clearly indicates otherwise. For example, a term "a" or "an" shall mean "one or more," even though a phrase "one or more" is also used herein. Use of the optional plural "(s)," "(es)," or "(ies)" means that one or more of the indicated feature is present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

FIG. 1 is a perspective view illustrating an exemplary indoor unit for an air conditioner. FIG. 2 is a partially exploded perspective view of FIG. 1. FIG. 3 is a view illustrating an indoor unit where a door assembly is separated from FIG. 1.

The exemplary air conditioner may include an indoor unit, and an outdoor unit (not illustrated) connected to the indoor unit through a refrigerant pipe and configured to allow refrigerants to circulate.

The outdoor unit may include a compressor (not illustrated) configured to compress refrigerants, an outdoor heat exchanger (not illustrated) configured to receive refrigerants from the compressor and to compress the refrigerants, an outdoor fan (not illustrated) configured to supply air to the outdoor heat exchanger, and an accumulator (not illustrated) configured to receive refrigerants discharged from the indoor unit and then to supply only gaseous refrigerants to the compressor.

The outdoor unit may further include four-way valve (not illustrated) to operate the indoor unit in a cooling mode or a in a heating mode. In the cooling mode, refrigerants are evaporated in the indoor unit to cool indoor air. In the heating mode, refrigerants are condensed in the indoor unit to heat indoor air.

<<<Configuration of Indoor Unit>>>

The indoor unit may include a cabinet assembly 100, a front surface of which is open and which may be provided with a suction port on a rear surface thereof, a door assembly 200 assembled to the cabinet assembly 100, the door assembly 200 configured to cover the front surface of the cabinet assembly 100 and configured to open and close the front surface of the cabinet assembly 100, a humidification assembly 2000 disposed at the cabinet assembly 100 and configured to supply moisture to an indoor space, and a filter assembly 600 disposed on a back surface of the cabinet assembly 100 and configured to filter air flowing to the suction port 101.

The indoor unit may include a suction port 101 disposed on a back surface with respect to the cabinet assembly 100, lateral discharge ports 301, 302 disposed on lateral surfaces with respect to the cabinet assembly 100, and a front discharge port 201 disposed on a front surface with respect to the cabinet assembly 100.

The suction port may be disposed on the back surface of the cabinet assembly 100.

The lateral discharge ports 301, 302 may be disposed respectively on the left and on the right with respect to the cabinet assembly 100. In one embodiment, when seen from the front surface of the cabinet assembly 100, the lateral discharge port on the left is referred to as a first lateral discharge port 301, and the lateral discharge port on the right is referred to as a second discharge port 302.

The front discharge port 201 may be disposed at the door assembly 200, and the door assembly 200 may further include a door cover assembly 1200 configured to automatically open and close the front discharge port 201.

The door cover assembly 1200 may open the front discharge port 201 and then may move downwards along the door assembly 200. The door cover assembly 1200 may move in an up-down direction with respect to the door assembly 200.

After the door cover assembly 1200 moves downwards, a long-distance fan assembly may pass through the door assembly 200 to move forwards.

A fan assembly may include a short-distance fan assembly and a long-distance fan assembly. A heat exchange assembly may be disposed at a rear of the short-distance fan assembly and the long-distance fan assembly.

The heat exchange assembly may be disposed inside the cabinet assembly 100 and may be disposed in the suction port. The heat exchange assembly may cover the suction port and may be disposed perpendicularly.

The short-distance fan assembly and the long-distance fan assembly may be disposed at a front of the heat exchange assembly. Air suctioned into the suction port may pass through the heat exchange assembly and then may flow to the short-distance fan assembly and the long-distance fan assembly.

The door assembly 200 may be disposed at a front of the cabinet assembly 100, and may be assembled to the cabinet assembly 100.

The door assembly 200 may slide in a left-right direction with respect to the cabinet assembly 100, and may expose a part of the front surface of the cabinet assembly 100 outwards.

The humidification assembly 2000 may supply humidified air to the lateral discharge ports. The humidification assembly 2000 may include a detachable water tank 2100.

In one embodiment, the humidification assembly 2000 may be disposed at a lower side in the cabinet assembly 100. A space in which the humidification assembly 2000 is disposed and a space in which a heat exchanger assembly 500 is disposed are divided.

The humidification assembly 2000 may perform humidification using air filtered and steam sterilized through the filter assembly 600, and by doing so, may prevent harmful substances such as germs or fungi from contacting the water tank.

<<Configuration of Indoor Unit>>

The indoor unit may include a cabinet assembly 100, a front surface of which is open and which may be provided with a suction port 101 on a rear surface thereof, a door assembly 200 assembled to the cabinet assembly 100, configured to cover the front surface of the cabinet assembly 100 and configured to open and close the front surface of the cabinet assembly 100, a fan assembly disposed in an inner space (S) of the cabinet assembly 100 and configured to discharge air in the inner space (S) to an indoor space, a heat exchange assembly disposed between the fan assembly and the cabinet assembly 100 and allowing heat exchange between suctioned indoor air and refrigerants, and a humidification assembly 2000 disposed at the cabinet assembly 100 and configured to supply moisture to the indoor space.

The indoor unit may include a suction port 101 disposed on a back surface with respect to the cabinet assembly 100, lateral discharge ports 301, 302 disposed on lateral surfaces with respect to the cabinet assembly 100, and a front discharge port 201 disposed on a front surface with respect to the cabinet assembly 100.

The suction port 101 may be disposed on the back surface of the cabinet assembly 100.

The lateral discharge ports 301, 302 may be disposed respectively on the left and on the right with respect to the cabinet assembly 100. In one embodiment, when seen from the front surface of the cabinet assembly 100, the lateral discharge port on the left is referred to as a first lateral discharge port 301, and the lateral discharge port on the right is referred to as a second discharge port 302.

The front discharge port 201 may be disposed at the door assembly 200, and the door assembly 200 may further include a door cover assembly 1200 configured to automatically open and close the front discharge port 201.

The door cover assembly 1200 may open the front discharge port 201 and then may move downwards along the door assembly 200. The door cover assembly 1200 may move in an up-down direction with respect to the door assembly 200.

After the door cover assembly 1200 moves downwards, a long-distance fan assembly 400 may pass through the door assembly 200 to move forwards.

The fan assembly may include a short-distance fan assembly 300 and a long-distance fan assembly 400. The heat exchanger assembly 500 may be disposed at a rear of the short-distance fan assembly 300 and the long-distance fan assembly 400.

The heat exchange assembly 500 may be disposed inside the cabinet assembly 100 and may be disposed in the suction port 101. The heat exchange assembly 500 may cover the suction port 101 and may be disposed perpendicularly.

The short-distance fan assembly 300 and the long-distance fan assembly 400 may be disposed at a front of the heat exchange assembly 500. Air suctioned into the suction port 101 may pass through the heat exchange assembly 500 and then may flow to the short-distance fan assembly 300 and the long-distance fan assembly 400.

The heat exchange assembly 500 may be manufactured to have a length corresponding to a height of the short-distance fan assembly 300 and the long-distance fan assembly 400.

The short-distance fan assembly 300 and the long-distance fan assembly 400 may be stacked in the up-down direction. In one embodiment, the long-distance fan assembly 400 may be disposed at an upper side of the short-distance fan assembly 300. When the long-distance fan assembly 400 is disposed at the upper side of the short-distance fan assembly 300, discharged air may be sent to a far corner of the indoor space (i.e., a greater distance).

The short-distance fan assembly 300 may discharge air in a lateral direction with respect to the cabinet assembly 100. The short-distance fan assembly 300 may supply indirect air movement to a user. The short-distance fan assembly 300 may discharge air in leftward and rightward directions of the cabinet assembly 100 at the same time.

The long-distance fan assembly 400 may be disposed at the upper side of the short-distance fan assembly 300, and may be disposed at an upper side in the cabinet assembly 100.

The long-distance fan assembly 400 may discharge air in a forward direction with respect to the cabinet assembly 100. The long-distance fan assembly may supply direct air movement directly to the user. Additionally, the long-distance fan assembly may discharge air to a far corner of the indoor space to improve air circulation of the indoor space.

In one embodiment, the long-distance fan assembly 400 may be exposed to the user only when operating. When the long-distance fan assembly 400 operates, the long-distance fan assembly 400 may be exposed to the user by passing through the door assembly 200. When the long-distance fan assembly 400 does not operate, the long-distance fan assembly 400 may be hidden in the cabinet assembly 100.

The long-distance fan assembly 400 may control a direction where air is discharged. The long-distance fan assembly 400 may discharge air upwards, downwards, leftwards, rightwards, or diagonally with respect to the front surface of the cabinet assembly 100.

The door assembly 200 may be disposed at a front of the cabinet assembly 100 and may be assembled to the cabinet assembly 100.

The door assembly 200 may slide in a left-right direction with respect to the cabinet assembly 200, and may expose a part of the front surface of the cabinet assembly 200 outwards.

The door assembly 200 may move in any one of the leftward or rightward direction to open the inner space (S). Additionally, the door assembly 200 may move in any one of the leftward or rightward direction to open only a part of the inner space (S).

The humidification assembly 2000 may supply moisture to the inner space (S) of the cabinet assembly 100, and the supplied moisture may be discharged to the indoor space through the short-distance fan assembly 300. The humidification assembly 2000 may include a detachable water tank 2100.

In one embodiment, the humidification assembly 2000 may be disposed at a lower side in the cabinet assembly 100. A space in which the humidification assembly 2000 is disposed, and a space in which the heat exchange assembly 500 is disposed may be divided.

The humidification assembly 2000 may perform humidification using air filtered and steam sterilized through a filter assembly 600, and by doing so, may prevent harmful substances such as germs or fungi from contacting the water tank.

<<Configuration of Cabinet Assembly>>

The cabinet assembly 100 may include a base 130 mounted onto the ground, a lower cabinet 120 disposed at an upper side of the base 130, having a front surface 121, an upper surface 125, and a lower surface 126 that are open, and having a left surface 123, a right surface 124, and a back surface 122 that are closed, and an upper cabinet 110 disposed at an upper side of the lower cabinet 120, having a back surface 112, provided with a suction port 101, a front surface 111, and a lower surface 116 that are open, and having a left surface 113, a right surface 114, and an upper surface 115 that are closed.

An inside of the upper cabinet 110 is referred to as a first inner space (S1), and an inside the lower cabinet 120 is referred to as a second inner space (S2). The first inner space (S1) and the second inner space (S2) may constitute an inner space (S) of the cabinet assembly 100.

A short-distance fan assembly 300, a long-distance fan assembly 400, and a heat exchange assembly 500 may be disposed inside the upper cabinet 110.

A humidification assembly 2000 may be disposed inside the lower cabinet 120.

A drain pan 140 configured to support the heat exchange assembly 500 may be disposed between the upper cabinet 110 and the lower cabinet 120. In one embodiment, the drain pan 140 may close a part of the lower surface 116 of the upper cabinet 110.

When the cabinet assembly 100 is assembled, the bottom surface 116 of the upper cabinet 110 may be shielded by the humidification assembly 2000 and the drain pan 140, and air in the upper cabinet 110 may be blocked from flowing to the lower cabinet 120.

The door assembly 200 may be disposed at a front of the cabinet assembly 100, and may slide in a left-right direction with respect to the cabinet assembly 100.

When the door assembly 200 moves, a part of the left or the right of the cabinet assembly 100 may be exposed outwards.

A discharge grille 150 may be disposed at an edge of a front of the upper cabinet 110. The discharge grille 340 may be disposed at a rear of the door assembly 200.

The discharge grille 150 and the upper cabinet 110 may be integrally formed. In one embodiment, the discharge grille 150 may be separately manufactured through an injection molding process and then may be assembled to the upper cabinet 110.

The discharge grille disposed at a front of the left surface 113 is referred to as a left discharge grille 151, and the discharge grille disposed at a front of the right surface 114 is referred to as a right discharge grille 152.

The left discharge grille 151 and the right discharge grille 152 may be respectively provided with lateral discharge ports 301, 302. The lateral discharge ports 301, 302 may be formed by penetrating the left discharge grille 151 and the right discharge grille 152 respectively.

In one embodiment, a cover 160 may be disposed at a front of the upper cabinet 110 and the lower cabinet 120, and may prevent air in the cabinet 100 from contacting the door assembly 200 directly.

When cold air directly contacts the door assembly 200, condensation may be formed, and may adversely affect an electric circuit within the door assembly 200.

Accordingly, the cover 160 may be disposed at the front of the upper cabinet 110 and at a front of the lower cabinet 120, and may allow air in the cabinet 100 to flow only to a front discharge port 201 or the lateral discharge ports 301, 302.

The cover 160 may include an upper cover 162 configured to cover the front surface of the upper cabinet 110, a lower cover 164 configured to cover the front surface of the lower cabinet 120, and a long-distance fan cover 166 configured to cover a front surface of the long-distance fan assembly 400.

The long-distance fan cover 166 and the upper cover 162 may be integrally formed. In one embodiment, the long-distance fan cover 166 and the upper cover 166 may be separately manufactured and then may be assembled to each other.

The long-distance fan cover 166 may be disposed at a front of the long-distance fan assembly 400, and may be disposed at an upper side of the upper cover 162. Front surfaces of the long-distance fan cover 166 and the upper cover 162 may form a continuous flat surface.

The long-distance fan cover 166 may be provided with a fan cover discharge port 161 that is open in a front-rear direction. The fan cover discharge port 161 may communicate with the front discharge port 201 and may be disposed at a rear of the front discharge port 201. A discharge grille 450 of the long-distance fan assembly 400 may pass through the fan cover discharge port 161 and the front discharge port 201 to move to a front of the door assembly 200.

The door assembly 200 may be disposed at the front of the fan cover discharge port 161, and the fan cover discharge port 161 may be disposed at a rear of a below-described panel discharge port 1101. When the long-distance fan assembly moves forwards, the discharge grille 450 may consecutively pass through the fan cover discharge port 161, the panel discharge port 1101, and the front discharge port 201.

That is, the panel discharge port 1101 may be disposed at the rear of the front discharge port 201, and the fan cover discharge port 161 may be disposed at the rear of panel discharge port 1101.

The long-distance fan cover 166 may be coupled to an upper side of the front of the upper cabinet 110, and the upper cover 162 may be coupled to a lower side of the front of the upper cabinet 110.

The lower cover 164 may be disposed at a lower side of the upper cover 162 and may be assembled to the lower cabinet 120 or the humidification assembly 2000. After the lower cover 164 is assembled, front surfaces of the lower cover 164 and the upper cover 162 may form a continuous surface.

The lower cover 164 may be provided with a water tank opening 167 that is open in the front-rear direction. A water tank 2100 may be separated or installed through the water tank opening 167.

The lower cover 164 may be disposed at a lower side of a front of the drain pan 140. Although a front surface of the lower cabinet 120 is not entirely covered, air in the upper cabinet 110 may not leak. Accordingly, the front surface of the lower cabinet 120 may not be entirely covered.

For repairs, services, and replacements of the humidification assembly 2000, a part of the front surface of the lower cabinet 120 may be opened. In one embodiment, a part of the front surface of the lower cabinet 120 may be provided with an open surface 169 that is not shielded by the lower cover 164.

When the door assembly 200 is opened to a first stage, the lower cover 164, where the water tank opening 167 is formed, is only exposed to a user, and when the door assembly 200 is opened to a second stage, the open surface 169 may also be exposed to the user.

The door assembly 200 may slide in the left-right direction as a door slide module 1300 operates. A state in which the water tank opening 167 is entirely exposed as the door assembly 200 slides is referred to as a first stage opening, and a state in which the open surface 169 is exposed is referred to as a second stage opening.

A front surface of the cabinet assembly 100, which is exposed at the time of the first stage opening, is referred to as a first open surface (OP1), and a front surface of the cabinet assembly, which is exposed at the time of the second stage opening, is referred to as a second open surface (OP2).

<<<Configuration of Short-Distance Fan Assembly>>

The short-distance fan assembly 300 is a component for discharging air laterally with respect to the cabinet assembly 100. The short-distance fan assembly 300 may supply indirect air movement to a user.

The short-distance fan assembly 300 may be disposed at a front of the heat exchange assembly 500.

<<<Configuration of Long-Distance Fan Assembly>>

The long-distance fan assembly 400 is a component for discharging air forwards with respect to the cabinet assembly 100. The long-distance fan assembly 400 may supply direct air movement to a user.

The long-distance fan assembly 400 may be disposed at a front of the heat exchange assembly 500. The long-distance fan assembly 400 may be stacked at an upper side of the short-distance fan assembly.

The long-distance fan assembly 400 may discharge air through a front discharge port 201 formed at the door assembly 200. A steering grille 450 of the long-distance fan assembly 400 may provide a structure that may rotate upwards, downwards, leftwards, rightwards, or diagonally. The long-distance fan assembly 400 may discharge air to a far corner of an indoor space to improve air circulation in the indoor space.

FIG. 4 is a perspective view illustrating a humidification assembly and a water tank assembled to the lower cabinet in FIG. 1. FIG. 5 is a perspective view illustrating a rear of an exemplary humidification assembly. FIG. 6 is an exploded perspective view illustrating an exemplary water tank and an exemplary water supply assembly. FIG. 7 is an exploded perspective view seen from a lower side of FIG. 6.

FIG. 8 is a cross-sectional view of a left side of FIG. 6. FIG. 9 is a cross-sectional view of a front side of FIG. 6. FIG. 10 is a perspective view illustrating the water tank in FIG. 6. FIG. 11 is a cross-sectional view illustrating an exemplary water tank and an exemplary water supply assembly. FIG. 12 is an enlarged view of FIG. 11.

<<<Configuration of Humidification Assembly>>>

The humidification assembly 2000 may supply moisture into a discharge flow channel of a fan assembly 400, and the supplied moisture may be discharged to an indoor space. The humidification assembly 2000 may optionally operate according to an operation signal of a controller.

In one embodiment, moisture supplied by the humidification assembly 2000 may be directly supplied to lateral discharge ports 301, 302. The moisture supplied by the humidification assembly 2000 may be mist or steam. In one embodiment, the humidification assembly 2000 may convert water of a water tank 2100 into steam to supply the steam to the discharge flow channel.

In one embodiment, the humidification assembly 2000 may be disposed at a lower side of cabinet assembly 100, and specifically, may be disposed in a lower cabinet 120.

The humidification assembly 2000 may be installed at a base 130 and may be surrounded by the lower cabinet 120. A drain pan 140 may be disposed at an upper side of the humidification assembly 2000, and steam generated in the humidification assembly 2000 may directly flow to the lateral discharge ports 301, 302 through a steam guide 2400. That is, a space, in which the humidification assembly 2000 is disposed, and a space in an upper cabinet 110 are divided.

The humidification assembly 2000 may include a water tank 2100 disposed at the cabinet assembly 100 and configured to store water, a steam generator 2300 disposed at the cabinet assembly 100, supplied with water stored in the water tank 2100, and configured to convert water stored therein into steam and to generate humidified air, a humidification fan 2500 disposed at the cabinet assembly 100, coupled to the steam generator 2300 and configured to supply air, passing through a filter assembly 600, to the steam generator 2300, a steam guide 2400 disposed at the cabinet assembly 100 and configured to guide humidified air, generated in the steam generator 2300, to the lateral discharge ports 301, 302 of the cabinet assembly 100 through an independent flow channel, a water supply assembly 2200 disposed at the cabinet assembly 100, detachably holding the water tank 2100 and configured to supply water of the water tank 2100 to the steam generator 2300, and a drain assembly 2700 connected to the water supply assembly 2200 and the steam generator 2300 and configured to drain water of the water supply assembly 2200 and the steam generator 2300 outwards.

A turbo fan may be used as the humidification fan 2500 according to one embodiment. Air allowed to flow by the humidification fan 2500 may be suctioned to an inner space of the steam generator 2300 through an air suction part 2318 of the steam generator 2300 and may be discharged outwards through a steam discharge part 2316 of the steam generator 2300.

A humidification flow channel formed in the steam guide 2400 has a small surface area relative to the inner space of the steam generator 2300. Accordingly, high pressure is needed to form a flow of air to the humidification flow channel at a predetermined flow velocity or higher. A turbo fan capable of maintaining static pressure in the steam guide may be used as the humidification fan 2500 according to an aspect of the embodiment.

<<<Configuration of Water Tank>>

The water tank 2100 may be exposed outwards at the time of a first stage opening of a door assembly 200, and when the door assembly 200 is not opened, the water tank 2100 is not exposed outwards.

The door assembly 200 may slide in a left-right direction as a door slide module 1300 operates. A state in which a water tank opening 167 is entirely exposed as the door assembly 200 slides is referred to as a first stage opening, and a state in which an open surface 169 is exposed is referred to as a second stage opening.

A front surface of a cabinet assembly 100, which is exposed at the time of the first stage opening, is referred to as a first open surface (OP1), and a front surface of the cabinet assembly, which is exposed at the time of the second stage opening, is referred to as a second open surface (OP2).

In one embodiment, at least part of a front surface of the water tank 2100 may be made of a material allowing the water in the water tank 2100 to be seen. The water tank 2100 may be disposed on the first open surface (OP1), and specifically, may be disposed at the water tank opening 167. The water tank 2100 may inserted into a lower cabinet 120 through the water tank opening 167.

The water tank 2100 may include a tank lower body 2110 held at a water supply assembly 2200, a tank middle body 2120, an upper side and a lower side of which are open, coupled to an upper side of the tank lower body 2110, a lower surface of which is closed by the tank lower body 2110, and configured to store water therein, a tank upper body 2130 an upper side and a lower side of which are open to form a water tank opening 2101 and coupled to the upper side of the tank middle body 2120, a water tank handle 2140 rotatably assemble to the tank upper body 2130, and a water tank valve 2150 assembled to the tank lower body 2110 and configured to optionally supply water therein to the water supply assembly 2200.

The tank lower body 2110 may provide a bottom of the water tank 2100. The tank lower body 2110 may be provided with a valve hole 2111 penetrated in an up-down direction, and the water tank valve 2150 may be assembled to the valve hole 2111. The valve hole 2111 may be disposed at a rear when seen from a lateral surface of the water tank 2100.

A distance from a center of the valve hole 2111 to a front surface (a below-described tank front wall in one embodiment) of the water tank is defined as T1, and a distance from the center of the valve hole 2111 to a back surface (a below-described first rear wall in one embodiment) of the water tank is defined as T2. Herein, T1 may be greater than T2. When the valve hole 2111 is disposed at a rear of the water tank 2100, leakage of water from the water tank valve 2150 may be minimized at the time of operation of a tilt assembly.

Only when the water tank 2100 is rapidly spaced apart from the water supply assembly 2200 at the time of operation of the tilt assembly, the water tank valve 2150 may be rapidly closed. As the water tank 2100 tilts forwards with respect to a lower end of a front thereof, the water tank valve 2150 may be preferably disposed at the rear.

In one embodiment, the tank lower body 2110 may have a rectangular shape from a top view perspective. The tank lower body 2110 may be entirely formed into a rectangular cuboid shape, and its lower side may be open.

The tank lower body 2110 may be provided with a lower body space 2112 therein, and the lower body space 2112 may be open downwards. Some components of the water supply assembly 2200 may be inserted into the lower body space 2112.

The tank lower body 2110 may be detachably held at the water supply assembly 2200. A front surface, a left surface, a right surface, and upper surface of the tank lower body 2110 may be closed.

The tank middle body 2120 may include a middle body upper opening 2121, an upper side of which is open, and a middle body lower opening 2122, a lower side of which is open.

For the tank middle body 2120, a front surface, a left surface, a right surface, and a back surface may be closed, and an upper surface and a lower surface may only be open. The tank middle body 2120 may include a tank front wall 2123, a tank left wall 2124, a tank right wall 2125, and a tank rear wall 2126.

The tank front wall 2123, the tank left wall 2124, and the tank right wall 2125 may be perpendicularly disposed in the up-down direction. The tank rear wall 2126 may be curved in a front-rear direction while being disposed perpendicularly.

The tank rear wall 2126 may include a first rear wall 2126a coupled to the tank lower body 2110 and forming a continuous surface along with a back surface of the tank lower body 2110, a second rear wall 2126b coupled to the tank upper body 2130, forming a continuous surface along with the tank upper body 2130 and disposed further forwards than the first rear wall 2126a, and a connection wall 2126c connecting the first rear wall 2126a and the second rear wall 2126b.

The connection wall 2126c may be formed to tilt in the up-down direction. For the connection wall 2126c, a front may be disposed high, and a rear may be disposed low.

The first rear wall 2126a may be disposed at a rear of the connection wall 2126c, and the second rear wall 2126b may be at a front of the connection wall 2126c. The first rear wall 2126a may be spaced apart from the second rear wall 2126b by a distance of T3 in a front-rear direction.

A planar cross section of the tank middle body 2120 including the first rear wall 2126a may be larger than that of the tank middle body 2120 including the second rear wall 2126b. With the structure, a center of gravity of the water tank 2100 may be formed further rearwards when water is stored in the water tank 2100.

Accordingly, the water tank 2100 may be prevented from tilting and falling forwards even when the water tank 2100 is tilted forwards by the tilt assembly.

The tank upper body 2130 may be coupled to an upper end of the tank middle body 2120. The tank upper body 2130 may have a rectangular shape from a top view perspective.

The tank upper body 2130 may be open in the up-down direction. The tank upper body 2130 may form an upper body opening 2131 that communicates with the middle body upper opening 2121. The middle body opening 2121 may be disposed at a lower side of the upper body opening 2131.

The water tank handle 2140 may be rotatably assembled to the tank upper body 2130.

The water tank handle 2140 may be disposed inside the tank upper body 2130, and when being stored in the lower cabinet 210, may be hidden from a user.

To this end, a handle installing groove 2132, where the water tank handle 2140 is installed, may be formed inside the tank upper body 2130.

The handle installing groove 2132 may be formed at a front of the tank upper body 2130.

From a top view perspective, the handle installing groove 2132 may be disposed within a thickness of the tank upper body 2130, and may be concave downwards from an upper surface of the tank upper body 2130.

In one embodiment, the handle installing groove 2132 may be formed outside the tank upper body 2130. In another embodiment, the handle installing groove 2132 may also be disposed inside the tank upper body 2130.

The water tank handle 2140 may include a handle body 2142 having a "E" shape, a handle shaft 2144 configured to rotatably couple the handle body 2142 and the tank upper body 2130, and a handle elastic member (not illustrated) disposed at any one of the handle body 2142 or the handle shaft 2144 and supported by the tank upper body 2130.

The handle elastic member may supply elastic force in a direction where an end of a front of the handle body 2142 is lifted. In one embodiment, a torsion spring may be used as the handle elastic member.

When the water tank 2100 tilts forwards, the water tank handle 2140 may be rotated out of the handle installing groove 2132 by the handle elastic member.

When the water tank 2100 is inserted into the water tank opening 167, the water tank handle 2140 may be stored in the handle installing groove 2132 due to interference between the water tank handle 2140 and a lower cover 164.

The tank lower body 2110 may include a lower body top wall 2113 brought in contact with the middle body lower opening 2122 and configured to seal the middle body lower opening 2122, a lower body side wall 2114 extending downwards from the lower body top wall 2113 and mounted onto the water supply assembly 2200, and a valve installation part 2115 protruding downwards from the lower body top wall 2113 and forming a valve hole 2111 passing through the lower body top wall 2113 in the up-down direction.

The lower body top wall 2113 may form an upper surface of the tank lower body 2110 and may shield the middle body lower opening 2122. In one embodiment, the lower body top wall 2113 and the middle body 2120 may be ultrasonically welded to prevent leakage of water, and may seal a bottom surface of the middle body 2120.

The valve installation part 2115 may form a valve hole 2111 passing through the lower body top wall 2113 in the up-down direction. The valve installation part 2115 may be formed into a cylindrical shape.

The water tank valve 2150 may be assembled to the valve installation part 2115. The water tank valve 2150 may be moved by a predetermined distance in the up-down direction in a state where the water tank valve 2150 is assembled to the valve installation part 2115. By doing so, the valve hole 2111 may be opened.

The water tank valve 2150 may serve as a check valve functionally, and may be optimized in accordance with the structure of the embodiment structurally.

The valve installation part 2115 may include a cylinder-shaped extended installation part 2116 which is long and extended downwards from the lower body top wall 2113, and an assembly installation part 2117 which is disposed in the extended installation part 2116 and to which the water tank valve 2150 is assembled.

The extended installation part 2116 may have a cylindrical shape, and its upper and lower sides may be open. The assembly installation part 2117 may be formed across an inside of the extended installation part 2116. In one embodiment, the assembly installation part 2117 may be formed horizontally.

The assembly installation part 2117 may divide the valve hole 2111 into an upper side and a lower side.

The upper side of the assembly installation part 2117 is referred to as an upper valve hole 2111*a*, and the lower side of the assembly installation part 2117 is referred to as a lower valve hole 2111*b*.

The tank lower body 2110 may further include an assembly hole 2117*a* which passes through the assembly installation part 2117 in the up-down direction and to which the water tank valve 2150 is assembled, and an installation part hole 2118 which passes through the assembly installation part 2117 in the up-down direction and which allows the upper valve hole 2111*a* to communicate with the lower valve hole 2111*b*.

The tank lower body 2110 may further include an assembly hole 2117*a* which passes through the assembly installation part 2117 in the up-down direction and to which the water tank valve 2150 is assembled, and an installation part hole 2118 which passes through the assembly installation part 2117 in the up-down direction and which allows the upper valve hole 2111*a* to communicate with the lower valve hole 2111*b*.

The assembly hole 2117*a* and the installation part hole 2118 may all be disposed in the valve installation part 2115.

The assembly hole 2117*a* may be disposed at a center of the valve installation part 2115, and the installation part hole 2118 may be disposed further outwards than the assembly hole 2117*a*. The installation part hole 2118 may be disposed between the extended installation part 2116 and the assembly hole 2117*a*.

As the water tank valve 2150 is assembled to the assembly hole 2117*a*, water in the water tank 2100 may not flow smoothly through the assembly hole 2117*a*. The water in the water tank 2100 may flow to the water supply assembly 2200 through the installation part hole 2118.

<Configuration of Water Tank Valve>

The water tank valve 2150 may include a valve core 2152 movably assembled to the valve installation part 2115 of the tank lower body 2110 in the up-down direction, and a diaphragm 2154 made of an elastic material, assembled to the valve core 2152 and configured to optionally open and close the valve hole 2111 at the time when the valve core 2152 moves in the up-down direction.

From a top view perspective, the diaphragm 2154 may have a cylindrical shape, and may have a diameter larger than that of the valve hole 2111. An upper end of the diaphragm 2154 may be disposed at an upper side of the valve hole 2111, and a lower end of the diaphragm 2154 may be disposed in the valve hole 2111.

In one embodiment, the diaphragm 2154 may have a bowl shape that is concave downwards. The valve core 2152 may pass through the center of the diaphragm 2154 in the up-down direction.

The diaphragm 2154 may supply elastic force that helps restoration from a center to the outside.

When the water tank valve 2150 installed at the water tank 2100 is held at the water supply assembly 2200, a lower end of the valve core 2152 may contact a below-described valve supporter 2250.

When the valve core 2152 contacts the valve supporter 2250 and is supported by the valve supporter 2250, the water tank valve 2150 including the diaphragm 2154 may be disposed at the valve supporter 2250, and the remaining components of the water tank 2100 may move downwards except the water tank valve 2150.

When the water tank valve 2150 is supported by the valve supporter 2250, the diaphragm 2154 may open the valve hole 2111. When the water tank 2100 is separated from the water supply assembly 2200, the diaphragm 2154 may close the valve hole 2111 using pressure of water.

<<Configuration of Water Supply Assembly>>

The water supply assembly 2200 may supply water in a water tank 2100 to a steam generator 2300. Only when the water tank 2100 is held at the water supply assembly 2200, the water supply assembly 2200 may open a water tank valve 2150 of the water tank 2100 and may supply water to the steam generator 2300.

The water supply assembly 2200 may support the water tank 2100, and may provide a flow channel allowing water to flow from the water tank 2100 to the steam generator 2300. Additionally, the water supply assembly 2200 may open and close the water tank valve 2150 depending on a level of water stored in the steam generator 2300. In one embodiment, the opening and closing processes of the water tank valve 2150 may be implemented through a mechanical disposition instead of an electric signal. When the opening and closing processes of the water tank valve 2150 is implemented in an electromotive manner, electric wires may be exposed to moisture or water. Such circumstances may result in operational errors and/or safety concerns/issues.

In one embodiment, as the opening and closing processes of the water tank valve 2150 is implemented on the basis of a mechanical connection relationship, electricity may be used in a portion in contact with water at a minimum level. Accordingly, operational errors and safety accidents may be prevented.

The water supply assembly 2200 may include a supply chamber housing 2210 which may be disposed at a cabinet assembly 100 (a base in one embodiment), which temporarily stores water supplied by the water tank 2100 in a supply chamber 2211 and which supplies the water stored in the supply chamber 2211 to a steam generator 2300, a supply floater 2220 which may be disposed in the supply chamber 2211 of the supply chamber housing 2210 and which moves in an up-down direction depending on a level of the water stored in the supply chamber 2211, a supply support body 2230 which may be disposed at an upper side of the supply chamber housing 2210, which covers an upper side of the supply chamber 2211, where a part of a supply flow channel 2231, configured to guide water supplied by the water tank 2100 to the supply chamber 2211, is formed, and which supports the water tank 2100 when the water tank 2100 tilts and forms a tilt angle, a valve supporter 2250 which may be disposed at the supply support body 2230, which contacts a water tank valve 2150 of the water tank 2100 to open the water tank valve 2150 when the water tank 2100 is held and which provides a part of the supply flow channel 2231 configured to guide water discharged from the water tank valve 2150 to the supply chamber 2111, a supply tilt cover 2260 to which the water tank 2100 is detachably held, which may be disposed between the water tank 2100 and the supply support body 2230, which rotates relative to the supply support body 2230 when the water tank tilts and where a water supply valve of the water tank is disposed to penetrate such that water in the water tank is supplied to the supply chamber 2111, and a water bellows 2240 which may be disposed between the supply tilt cover 2260 and the supply support body 2230, which connects the supply tilt cover 2260 and the supply support body 2230, which is provided with the valve supporter 2250 therein and which guides water supplied by the supply tilt cover 2260 to the supply chamber 2211 through the supply flow channel 2231 of the supply support body 2230.

The water tank valve 2150 may be disposed at a lower side of the water tank 2100, the valve supporter 2250 and the supply support body 2230 may be disposed at a lower side of the water tank valve 2150, the supply floater 2220 may be disposed at a lower side of the valve supporter 2250, and the supply floater 2220 may move in the up-down direction within a height of the supply chamber 2211.

The water in the water tank 2100 may flow to the supply chamber 2211 through the water tank valve 2150, the water bellows 2240, and the supply flow channel 2231. The supply chamber 2211 may store the supplied water temporarily, and the water may flow to the steam generator 2300 on the basis of kinetic energy caused by its self-weight.

<Configuration of Supply Chamber Housing>

The supply chamber housing 2210 may be installed on an upper surface of a base 130 of a cabinet assembly 100. The supply chamber housing 2210 may temporarily store water supplied by a water tank, and may supply the stored water to a steam generator 2300. The supply chamber housing 2210 may provide a space for installing a supply floater 2220, and the supply floater 2220 may move in an up-down direction in the supply chamber housing 2210.

The supply chamber housing 2210 may include a chamber housing body 2212 installed at an upper side of the base 130 of the cabinet assembly 100, a supply chamber 2211 disposed inside the chamber housing body 2212, open upwards, concave downwards and configured to store water temporarily, a rib 2215 disposed at least one of the chamber housing body 2212 or the supply floater 2220, and configured to space a bottom surface 2220a of the supply floater 2220 from a bottom surface 2211a of the supply chamber 2211, and a chamber housing pipe 2214 disposed at the chamber housing body 2212, communicating with the supply chamber 2211, and configured to supply water stored in the chamber housing 2212 to the steam generator 2300.

The supply chamber 2211 may be open upwards. The open upper surface of the supply chamber 2211 is referred to as a chamber open surface 2213. The supply floater 2220 may be disposed in the supply chamber 2211. In one embodiment, the supply chamber 2211 may have a cylindrical shape. The supply floater 2220 may have a circle-shaped planar cross section to correspond to the shape of the supply chamber 2211.

When the shape of a planar cross section of the supply chamber 2211 corresponds to that of the supply floater 2220, the supply floater 2220 may move smoothly. A planar cross section of the supply chamber 2211 may have various shapes. However, when the planar cross section of the supply chamber 2211 has angular shapes, the supply floater 2220 may be caught when moving in the up-down direction, and installation volume may increase.

The bottom surface 2211a of the supply chamber 2211 may be formed to incline. The bottom surface 2211a may be formed to incline towards the chamber housing pipe 2214.

In one embodiment, the rib 2215 may be formed at the chamber housing body 2212. The rib 2215 may protrude upwards from the bottom surface 2211a of the supply chamber 2211. The rib 2215 may space the bottom surface 2220a of the supply floater 2220 apart from the bottom surface 2211a of the supply chamber 2211.

Even when the supply chamber 2211 is filled with water in the absence of the rib 2215, the bottom surface 2220a of the supply floater 2220 and the bottom surface 2211a of the supply chamber 2211 may come into close contact because of water surface tension. Due to their close contact, the supply floater 2220 may not move in the up-down direction depending on a water level.

The rib 2215 may prevent incorrect operation of the supply floater 2200, caused by the close contact.

Additionally, to prevent a lateral surface 2220b of the supply floater 2220 from being fixed onto an inner wall 2211b of the supply chamber 2211, a distance between the lateral surface 2220b of the supply floater 2220 and the inner wall 2211b of the supply chamber 2211 has to be 1 mm or greater.

The chamber housing pipe 2214 may communicate with an inside of the supply chamber 2211. An inner end 2214a of the chamber housing pipe 2214 may communicate with the supply chamber 2211, and an outer end 2214*b* of the chamber housing pipe 2214 may protrude out of the supply chamber 2211.

The bottom surface 2211*a* of the supply chamber 2211 may be formed at a height the same as or higher than the inner end 2214*a* of the chamber housing pipe 2214. Accordingly, water in the supply chamber 2211 may be prevented from being left.

The outer end 2214*b* of the chamber housing pipe 2214 may be disposed further downwards than the bottom surface 2211*a* of the supply chamber 2211, and water stored in the supply chamber 2211 may flow to the chamber housing pipe 2214 on the basis of its self-weight.

The outer end 2214*b* of the chamber housing pipe 2214 may be disposed lower than the bottom surface 2211*a* of the supply chamber 2211.

In one embodiment, the bottom surface 2211*a* of the supply chamber 2211 may be disposed within a height of the inner end 2214*a* of the chamber housing pipe 2214.

When the inner end 2214*a* of the chamber housing pipe 2214 is higher than the bottom surface of the supply chamber 2211, water may be left in the supply chamber 2211, causing germs or fungi to breed. The inner end 2214*a* of the chamber housing pipe 2214 may be preferably formed at a height the same as or lower than the bottom surface of the supply chamber 2211.

When the humidification assembly 2000 is not used (e.g., in summer when humidity is high or a longer period of time during which water is stored in the water tank), water in the humidification assembly 2000 including the water tank 2100 may not be left therein but is drained outwards.

To this end, provided is a structure, where water supplied by the water tank 2100 may not be left while flowing and may move using its self-weight.

The outer end 2214*b* of the chamber housing pipe 2214 may connect to the steam generator 2300 and may supply water to the steam generator 2300. In one embodiment, water in the water tank 2100 may flow to the steam generator 2300 using kinetic energy.

<Configuration of Valve Supporter>

The valve supporter 2250 may be disposed at a lower side of a water tank valve 2150. The valve supporter 2250 may interfere with the water tank valve 2150 when a water tank 2100 is held at a water supply assembly 2200, and may open the water tank valve 2150.

The valve supporter 2250 may have a pointy upper side and may support a valve core 2152 of the water tank valve 2150.

When the water tank 2100 is held at the water supply assembly 2200, the valve supporter 2250 may interfere with the valve core 2152 to push up the water tank valve 2150. Accordingly, a valve hole 2111 may be opened.

When the valve hole 2111 is opened, water in the water tank 2100 may flow to a supply support body 2230.

The valve supporter 2250 may be separately manufactured. However, in one embodiment, the valve supporter 2250 and the supply support body 2230 may be integrally manufactured through an injection molding process. To contact the water tank valve 2150, the valve supporter 2250 has to be exposed upwards from the supply support body 2230.

The valve supporter 2250 may be formed in different shapes. In one embodiment, the valve supporter 2250 may include a first valve supporter 2252 and a second valve supporter 2254. The first valve supporter 2252 and the second valve supporter 2254 may be spaced apart from each other to form a valve supporter gap 2256. Water may flow through the valve supporter gap 2256.

The first valve supporter 2252 and the second valve supporter 2254 may be disposed perpendicularly, and the valve supporter gap 2256 may also be disposed perpendicularly. The valve core 2152 may be disposed at an upper side of the valve supporter gap 2256.

As the first valve supporter 2252 and the second valve supporter 2254 are spaced apart from each other, water discharged from the water tank 2100 may flow into the valve supporter gap 2256 although the first valve supporter 2252 and the second valve supporter 2254 support a lower end of the valve core 2152.

A lower end of the valve supporter gap 2256 may be open. An upper side of the valve supporter gap 2256 may be open towards an upper side of the supply support body 2230, and a lower side of the valve supporter gap 2256 may be open towards a lower side of the supply support body 2230.

In one embodiment, as the valve supporter 2250 and the supply support body 2230 are integrally manufactured, a middle hole 2258 communicating with a supply chamber 2211 may be formed at the lower side of the valve supporter gap 2256. The middle hole 2258 may form a part of a supply flow channel 2231.

In one embodiment, the middle hole 2258 may be formed at the lower side of the valve supporter gap 2256. However, the middle hole 2258 may also be formed at the supply support body 2230. The middle hole 2258 may be formed to pass through the supply support body 2230 in an up-down direction.

The middle hole 2258 may allow an inner space of a water bellows 2240 to communicate with the supply chamber 2211.

The valve supporter 2250 may be disposed in the water bellows 2240.

Accordingly, water discharged from the valve hole 2111 may be stored in the water bellows 2240, and may flow to the supply chamber 2111 through the middle hole 2258.

Preferably, the middle hole 2258 may be disposed inside the water bellows 2240. When the middle hole 2258 is disposed outside the water bellows 2240, an additional component for guiding water, discharged from the water tank 2100, to the middle hole 2258 or a component for preventing the discharged water from flowing to another component has to be disposed at the supply support body 2230.

A contact portion (a lower end of the valve core and an upper end of the valve supporter) of the water tank valve 2150 and the valve supporter 2250 may be preferably disposed in the water bellows 2240.

The water bellows 2240 may provide a space for temporarily storing water discharged from the water tank 2100 like the supply chamber 2211. A configuration of the space is described during description of a configuration of the water bellows 2240.

<Configuration of Supply Support Body>

The supply support body 2230 may be disposed at an upper side of a supply chamber housing 2210 and may cover an upper side of a supply chamber 2211. The supply support body 2230 may seal an upper surface of the supply chamber 2211 and may prevent water in the supply chamber 2211 from leaking out of the supply chamber housing 2210.

Additionally, a part of a supply flow channel 2231, configured to guide water supplied by a water tank 2100, to the supply chamber 2211, may be formed at the supply support body 2230. In one embodiment, a middle hole 2258 of a valve supporter 2250 may be substituted for the supply flow channel 2231.

The supply support body 2230 may support the water tank 2100, and when the water tank 2100 tilts, may support a rotated water tank 2100.

The supply support body 2230 may include a supply body plate 2232 disposed at an upper side of the supply chamber housing 2210 and may be configured to cover an upper side of the supply chamber 2211, a middle hole 2258 configured to pass through the supply body place 2232 in an up-down direction and forming a part of a supply flow channel 2231 connecting the supply chamber 2211 and the water tank 2100, a floater guide 2234 which protrudes from a lower side of the supply body plate 2232, which communicates with the middle hole 2258, into which a part of an upper side of the supply floater 2220 is inserted, and which guides a direction of movement of the supply floater 2220, and a tilt supporter 2236, which protrudes from an upper side of the supply body plate 2232, which forms a predetermined tilt angle along with a bottom surface of the water tank 2100, and which supports the water tank 2100 when the water tank 2100 tilts.

The supply body plate 2232 may be disposed at an upper side of the supply chamber housing 2210, may cover a chamber open surface 2213 forming an upper surface of the supply chamber 2211, and may seal the chamber open surface 2213 of the supply chamber 2211.

In order for the supply body plate 2232 to effectively seal the supply chamber 2211, a sealing rib 2231 protruding downwards from the supply body plate 2232 may be further formed.

The sealing rib 2231 may be formed into a shape corresponding to that of the chamber open surface 2213 of the supply chamber 2211. A supply chamber gasket 2233 for sealing may be further disposed between the sealing rib 2231 and the supply chamber housing 2210.

From a top view perspective, the supply chamber gasket 2233 may have a shape corresponding to a shape of an edge of the chamber open surface 2213. The supply chamber gasket 2233 may be made of an elastic material and may be disposed between the supply chamber housing 2210 and the supply support body 2230.

The middle hole 2258 may pass through the supply body plate 2232 in an up-down direction, and may connect the supply chamber 2211 and the water tank 2100. The middle hole 2258 may form a part of the supply flow channel 2231 and may allow water, discharged from the water tank 2100, to flow to a lower side of the supply support body 2230.

In one embodiment, the middle hole 2258 may be disposed at the valve supporter 2250. In another embodiment, additional middle holes passing through the supply body plate 2232 may be disposed. In this case, the middle hole 2258 may be disposed in the water bellows 2240. That is, in other embodiments, the middle hole 2258 of the valve supporter 250 and additional middle holes may be disposed in the water bellows 2240.

The floater guide 2234 may protrude downwards from a bottom surface of the supply body plate 2232. The floater guide 2234 may communicate with the middle hole 2258. In one embodiment, the floater guide 2234 may be disposed at a lower side of the middle hole 2258 and the water passing through the middle hole 2258 may be guided into the floater guide 2234.

The floater guide 2234 may have a lower side that is open, and a part of the upper side of the supply floater 2220 may be inserted through the open lower surface. The floater guide 2234 may guide a direction of movement of the supply floater 2220.

The floater guide 2234 may be provided with a floater guide inner space 2234S into which the supply floater 2220 is inserted. The middle hole 2258 may be disposed at an upper side of the floater guide inner space 2234S, and a valve supporter gap 2256 may be disposed at an upper side of the middle hole 2258.

The valve supporter gap 2256, the middle hole 2258 and the floater guide inner space 2234S may be disposed in line to form a shortest distance moved by water. The middle hole 2258 may be closed when the below-described supply floater 2220 moves up, and may be opened when the supply floater 2220 moves down. The opening and closing processes of the middle hole 2258 through the supply floater 2220, and the opening and closing processes of a water tank valve 2150 may be performed separately.

The tilt supporter 2236 is a structure that protrudes upwards from the supply body plate 2232. In one embodiment, the tilt supporter 2236 and the supply support body 2230 may be integrally formed through an injection molding process. In another embodiment, the tilt supporter 2236 may be separately manufactured and then may be assembled to the supply support body 2230.

As the tilt supporter 2236 is a structure for supporting the water tank 2100, the tilt supporter 2236 may be disposed at a lower portion of the water tank 2100.

The tilt supporter 2236 may include a first supporter part 2336*a*, which supports the water tank 2100 perpendicularly before the water tank 2100 tilts, and a second supporter part 2236*b* which supports the water tank 2100 such that the water tank 2100 inclines after the water tank 2100 tilts.

The first supporter part 2236*a* may protrude upwards from the supply body plate 2232, and may be long and extended in a front-rear direction. An upper end of the first supporter part 2236*a* may be disposed horizontally. In one embodiment, the first supporter part 2236*a* may be disposed higher than an upper end of the valve supporter 2250.

The second supporter part 2236*b* may protrude upwards from the supply body plate 2232 and may be disposed in the front-rear direction. An upper end of the second supporter part 2236*b* may be disposed to incline. The second supporter part 2236*b* may be disposed to incline in a direction of a tilt of the water tank 2100.

As the water tank 2100 tilts forwards in one embodiment, the second supporter part 2236*b* may provide a tilted surface 2237, a rear of which is high and a front of which is low. The tilted surface 2237 may be formed on an upper surface of the second supporter part 2236*b*. The tilted surface 2237 may be formed to incline from the rear to a lower side of the front.

The tilted surface 2237 and a bottom surface of the water tank 2100 may form a predetermined tilt angle. The tilted surface 2237 may be formed at an angle between 10 degrees and 45 degrees. When the water tank 2100 is supported by the tilted surface 2237, the water tank should not be reversed. Additionally, when the water tank 2100 is supported by the tilted surface 2237, a water tank handle 2140 has to be exposed to a user, to be rotated upwards and to be unfolded.

<Configuration of Supply Tilt Cover>

The supply tilt cover 2260 may be disposed at a lower side of a water tank 2100, and the water tank 2100 may be detachably held at the supply tile cover 2260. In one embodiment, the supply tilt cover 2260 may be disposed between the water tank 2100 and a supply support body 2230.

When the water tank tilts, the supply tilt cover 2260 may rotate relative to the supply support body 2230 in a state where the supply tilt cover 2260 is supported by the supply support body 2230.

The supply tilt cover 2260 may be disposed to allow a water supply valve of the water tank to penetrate, and a water tank valve 2150 may pass through the supply tilt cover 2260 to contact a valve supporter 2250.

In one embodiment, the supply tilt cover 2260 may be detachably inserted into a tank lower body 2110 constituting a lower portion of the water tank 2100.

The supply tilt cover 2260 may have an open lower side and closed upper and lateral surfaces.

The supply tilt cover 2260 may include a tilt cover body 2262 at which a lower portion of the water tank 2100 is detachably held, which is held at the supply support body 2230 to be able to tilt, and which tilts on the basis of operation of a tilt assembly, a valve insertion hole 2261 which pass through the tilt cover body 2262 in an up-down direction and which communicates with a valve hole 2111 of the water tank 2100, and a tilt cover side wall 2264 which extends downwards from the tilt cover body 2262.

The tilt cover body 2262 may be mostly disposed in a horizontal direction. The valve insertion hole 2261 may be formed at the tilt cover body 2262. The valve insertion hole 2261 may pass through the tilt cover body 2262 in the up-down direction, and may be supplied with water of the valve hole 2111. The valve insertion hole 2261 may be disposed at a lower side of the valve hole 2111.

An upper end 2237a of the tilted surface 2237 may be supported by a lower surface of the tilt cover body 2262. The supply tilt cover 2260 may tilt forwards in a state where the supply tilt cover 2260 is supported by the upper end 2237a of the tilted surface 2237.

When the water tank 2100 is held at a water supply assembly 2200, a valve installation part 2115 of the water tank 2100 may pass through the valve insertion hole 2261 and may pass through the tilt cover body 2262 to protrude downwards. The water tank valve 2150 and the valve supporter 2250 may interfere with each other at the valve installation part 2115.

Additionally, a component for fixing the water bellows 2240 to the tilt cover body 2262 may be disposed around the valve insertion hole 2261.

<Configuration of Water Bellows>

The water bellows 2240 may be made of an elastic material. The water bellows 2240 may be fixed to a supply tilt cover 2260 and a supply support body 2230, and may supply water discharged from a water tank to the supply support body 2230.

The water bellows 2240 may prevent water discharged from the water tank 2100 from leaking. When the water tank 2100 tilts, the water bellows 2240 may be elastically deformed and stretched. The water bellows 2240 may connect between the supply tilt cover 2260 and the supply support body 2230 even when the water tank tilts.

In one embodiment, the water bellows 2240 may be formed into a corrugate tube.

An upper end of the water bellows 2240 may be fixed to the supply tilt cover 2260, and a lower end may be fixed to the supply support body 2230.

In one embodiment, a bellows cap 2242 for fixing the upper end of the water bellows 2240 to the supply tilt cover 2260 may be further provided.

The upper end of the water bellows 2240 may protrude from an upper side of the supply tilt cover 2260 through the valve insertion hole 2261.

The bellows cap 2242 may be disposed at the upper side of the supply tilt cover 2260, and may press the upper end of the water bellows 2240 against an upper surface of the supply tilt cover 2260. The bellows cap 2242 may be fixed to the supply tilt cover 2260 through a coupling or a press fit.

In one embodiment, the bellows cap 2242 may be fixed to the supply tilt cover 2260 through a coupling. Accordingly, the water bellows 2240 may be easily replaced when the water bellows 2240 is damaged or broken.

<Configuration of Supply Floater>

The supply floater 2220 may be disposed in a supply chamber 2211 and may move in an up-down direction depending on a water level of the supply chamber 2211.

The supply floater 2220 may prevent all the water in a water tank from moving to a steam generator 2300. The supply floater 2220 may control an amount of water flowing to the steam generator 2300 while moving in the up-down direction depending on the water level.

For example, buoyancy of the supply floater 2220 may be up to three times greater than pressure applied by the water tank 2100.

When a water level of the supply chamber 2211 increases to a reference level or above, the supply floater 2220 may close a valve hole 2258. When the valve hole 2258 is closed, water is not supplied to the supply chamber 2211, and water in the supply chamber 2211 may move to the steam generator 2300 through a chamber housing pipe 2214.

A water level in the supply chamber 2211 may decrease by an amount of water moving to the steam generator 2300, and a height of the supply floater 2220 may be lowered such that the valve hole 2258 is opened.

The supply floater 2220 may include a floater body 2222 made of a material having a lower density than water, a guide insertion groove 2225 which may be formed at the floater body 2222, which is concave from an upper side to a lower side, and into which a floater guide 2234 of a supply support body 2230 is inserted, a support body insertion part 2224 formed at the floater body 2222 and forming the guide insertion groove 2225, and a floater valve 2270 disposed at the floater body 2222 and configured to open and close the valve hole 2258 forming a part of a supply flow channel 2231.

The support body insertion part 2224 may be concave from an upper side to a lower side, and the floater guide 2234 may be inserted into the support body insertion part 2224. When the supply floater 2220 moves up or moves down depending on a water level of the supply chamber 2211, the support body insertion part 2224 may move up or move down along the floater guide 2234.

The support body insertion part 2224 and the floater guide 2234 may have shapes corresponding to each other. In one embodiment, as the floater guide 2234 has a cylindrical shape, the support body insertion part 2224 may also have a cylindrical shape.

The support body insertion part 2224 and the floater guide 2234 may be formed in the up-down direction and may stop each other in a lateral direction. Even when the supply floater 2220 moves to a lowest side, the support body insertion part 2224 and the floater guide 2234 may stop each other with respect to the lateral direction.

At least part of the support body insertion part 2224 and the floater guide 2234 may be disposed within the same height. The support body insertion part 2224 and the floater guide 2234 may at least partially overlap in a horizontal direction.

In one embodiment, a diameter of the support body insertion part 2224 may be smaller than a diameter of the floater guide 2234. Accordingly, the support body insertion part 2224 may be disposed in the floater guide 2234 for an installation structure of the floater valve 2270.

The floater valve 2270 may include a floater valve core 2272 disposed at the floater body 2222, and a floater valve stopper 2278 coupled to an upper side of the floater valve core 2272 and configured to open and close a middle hole 2258.

The floater valve core 2272 may be assembled to the floater body 2222. In one embodiment, the floater valve core 2272 may be disposed to pass through the floater body 2222 in the up-down direction, and the floater body 2222 may be provided with a core hole 2223 through which the floater valve core 2272 passes.

The core hole 2223 may be disposed inside the support body insertion part 2224.

The core hole 2223 may be formed inside the support body insertion part 2224, and the guide insertion groove 2225 may be formed outside the support body insertion part 2224. The core hole 2223 and the guide insertion groove 2225 may all be formed to extend in the up-down direction.

The support body insertion part 2224 may include a support body inner wall 2224a disposed in the floater body 2222, spaced apart from the floater body 2222, forming the core hole 2223 inside thereof and forming the guide insertion groove 2225 outside thereof, and a support body bottom wall 2224b connecting the support body inner wall 2224a and the floater body 2222 and forming the guide insertion groove 2225 at an upper side thereof.

The support body inner wall 2224a may be formed into a cylindrical shape that is long in the up-down direction. The support body bottom wall 2224b may be formed into a ring shape from a top view perspective.

An inner end of the support body bottom wall 2224b may connect to the floater body 2222, and an outer end of the support body bottom wall 2224b may connect to the support body inner wall 2224a.

In one embodiment, the floater body 2222 and the support body insertion part 2224 may be integrally formed through an injection molding process. In another embodiment, the support body insertion part 2224 may be separately manufactured and then may be assembled into the floater body 2222.

The floater valve core 2272 may be disposed to pass through the core hole 2223 in the up-down direction. An upper end of the floater valve core 2272 may protrude further upwards than an upper end of the support body inner wall 2224a, and a lower end of the floater valve core 2272 may protrude further downwards than a lower end of the support body inner wall 2224a.

A core support base 2273, protruding outwards in a radial direction and supported by a lower end of the support body bottom wall 2224b, may be formed at a lower end of the floater valve core 2272. The core support base 2273 may be disposed lower than the support body bottom wall 2224b.

A floater body groove 2226, which is concave from a bottom surface of the floater body 2222 upwards, may be formed. The floater body groove 2226 may communicate with the core hole 2223 and may be formed at a lower side of the core hole 2223. The floater body groove 2226 may be disposed lower than the support body bottom wall 2224b.

The core support base 2273 may be inserted into the floater body groove 2226, and may be hidden in the floater body groove 2226 without protruding downwards from the bottom surface of the floater body 2222.

The floater valve stopper 2278 may be assembled to the upper end of the floater valve core 2272. The floater valve stopper 2278 may be supported by the upper end of the support body inner wall 2224a in a state where the floater valve stopper 2278 is assembled to the floater valve core 2272.

The floater valve stopper 2278 may have a triangular pyramid with a pointy upper side, and the pointy end 2279 may be inserted into the valve hole 2258. The pointy end 2279 may protrude further upwards than an upper end of the floater body 2222.

In one embodiment, water flowing from the water tank 2100 to the supply chamber 2111 may be regulated twice.

A water tank valve 2150 may open and close the valve hole 2111 to control a flow of water. Then the floater valve 2270 may open and close the middle hole 2258 to control a flow of water.

As water discharged from the water tank 2100 experiences the opening and closing process twice and flows to the supply chamber 2111, water may be prevented from being excessively supplied. The supply floater 2220 may additionally control supply of water. Accordingly, an excessive amount of water may be prevented from being supplied to the steam generator 2300.

In another embodiment, a water level sensor for sensing a level of water may be disposed in the supply chamber 2211, and a shut-off valve may be disposed at the chamber housing pipe 2214 to adjust an amount of water supplied to the steam generator 2300. This structure requires a water level sensor and a shut-off valve, thereby causing an increase in manufacturing costs, and is controlled according to electric signals, thereby requiring an additional wire feeding structure of a cable.

In one embodiment, as an amount of water supplied to the steam generator 2300 may be controlled through the supply floater 2220 that moves up or moves down depending on a water level of the supply chamber 2211, control over a level of water in the steam generator 2300 and an amount of water supplied to the steam generator 2300 may be implemented mechanically.

FIG. 13 is a front view illustrating an inside of the lower cabinet in FIG. 3. FIG. 14 is a cross-sectional view illustrating the water supply assembly and the steam generator in FIG. 13. FIG. 15 is a perspective view of FIG. 14. FIG. 16 is a plan view illustrating an exemplary drain assembly. FIG. 17 is a front sectional view of the drain assembly in FIG. 16. FIG. 18 is a right-side view of the drain assembly in FIG. 16. FIG. 19 is an exploded perspective view of the steam generator in FIG. 5. FIG. 20 is a view of an example where water levels are marked at the steam generator in FIG. 19. FIG. 21 is a view of an example where water levels are marked in a steam generator when an indoor unit tilts. FIG. 23 is a graph of speeds of drainage of water based on a diameter an exemplary water pipe, an arrangement thereof and a voltage supplied to a drain pump. FIG. 24 is a graph of a change in temperatures of a water supply flow channel and a water drainage flow channel in a steam generator based on a diameter an exemplary water pipe and an arrangement thereof. FIG. 25 is a graph of results of comparison between generation of scale and temperature of a steam heater on the basis of an operation cycle of a drain pump, in case of according to an exemplary embodiment, and generation of scale and temperature of a steam heater in a washer. FIG. 26 is a graph of results of comparison between inner temperature and a heat transfer rate of a heater on the basis of an operation cycle of a drain pump, in case of according to an exemplary embodiment, and inner temperature and a heat transfer rate of a heater in a washer.

<<Configuration of Steam Generator>>

The steam generator 2300 may be supplied with water from a water supply assembly 2200 to generate steam. As the steam generator 2300 heats water to generate steam, sterilized steam may be provided.

The steam generator 2300 may include a steam housing 2310, a steam heater 2320 disposed in the steam housing 2310 and configured to generate heat using supplied power, a water pipe 2314 which may be disposed in the steam housing 2310, which communicates with an inside of the steam housing 2310 and where water is suctioned or discharged, a steam discharge part 2316 disposed in the steam housing 2310, connected to a steam guide 2400 and configured to supply steam generated therein to the steam guide 2400, and an air suction part 2318 disposed in the steam housing 2310, connected to a humidification fan 2500 and supplied with filtered air in a cabinet assembly 100 from the humidification fan 2500.

The steam generator 2300 may further include a first water level sensor 2360 configured to sense a lowest water level (WL) in the steam housing 2310, a second water level sensor 2370 configured to sense a highest water level (WH) in the steam housing 2310, and a thermistor 2380 configured to prevent overheating in the steam housing 2310.

The steam housing 2310 may be a structure sealed from the outside. The water pipe 2314, the steam discharge part 2316, and the air suction part 2318 may communicate with the outside. The steam housing 2310 may be installed at a base 130.

As the steam housing 2310 may store water heated by the steam heater 2320, the steam housing 2310 may be made of a heat resistant material. In one embodiment, the steam housing 2310 may be made of SPS. The steam housing 2310 may include an upper steam housing 2340 and a lower steam housing 2350.

The upper steam housing 2340 may have an open lower side and may be concave from the lower side to an upper side. The lower steam housing 2350 may have an open upper side and may be concave to the lower side.

In one embodiment, the water pipe 2314 may be disposed in the lower steam housing 2350, and the steam discharge part 2316 and the air suction part 2318 may be disposed in the upper steam housing 2340.

The water pipe 2314 may be disposed lower than a chamber housing pipe 2214 of the water supply assembly 2200. Water in the chamber housing pipe 2214 may flow to the water pipe 2314 using its self-weight because of a difference between heights at which the water pipe 2314 and the chamber housing pipe 2214 are disposed.

TABLE 1

| Drain pipe diameter | Water pipe position | Input voltage of drain pump | Time (drainage of 3400 cc) | Drainage amount per hour |
|---|---|---|---|---|
| mm | — | V | min:sec | cc/min |
| 8 | Back | 8 | 06:25 | 529 |
| 8 | Back | 7.5 | 06:59 | 486 |
| 8 | Center | 7.5 | 08:50 | 384 |
| 8 | Front | 7.5 | 10:27 | 325 |
| 10 | Back | 8 | 06:26 | 528 |
| 10 | Back | 7.5 | 07:11 | 473 |

FIG. 23 shows a graph of speeds of drainage based on a position where the water pipe 2314 is disposed at one side of the steam housing 2310, a voltage input to a drain pump 2710 and different diameters of the water pipe 2314. The water pipe 2314 may be disposed with respect to a rear (back) where the air suction part 2318 is disposed, a front where the steam discharge part 2316 is disposed, and a center between the front and the rear, in a front-rear direction of the steam housing 2310. However, the water pipe 2314—a portion from which water in the steam housing is drained—may be disposed at a lower end portion of a peripheral surface of the steam housing 2310.

Table 1 above shows data derived from the graph in FIG. 23.

Referring to FIG. 23 and Table 1, when the water pipe 2314 is disposed at a rear of the steam housing 2310, water in the steam housing 2310 may be drained at high speed. This is due to a structure where the water in the steam housing 2310 applies pressure downwards as the air suction part 2318 is formed at the rear of the steam housing 2310, and a structure where the drain pump is disposed at the rear of the steam housing 2310.

Referring to FIG. 23 and Table 1, in the water pipe 2314, as a voltage input to the drain pump 2710 becomes higher, water in the steam housing 2310 may be drained at higher speeds. However, a diameter of the water pipe 2314 may not greatly affect a drainage speed.

In one embodiment, the first water level sensor 2360, the second water level sensor 2370 and a thermistor 2380 may be disposed in the upper steam housing 2340. To this end, a first water level sensor installation part 2342 where the first water level sensor 2360 is installed, a second water level sensor installation part 2344 where the second water level sensor 2370 is installed, and a thermistor installation part 2346 where the thermistor 2380 is installed may be formed, in the upper steam housing 2340.

The air suction part 2318 and the steam discharge part 2316 formed in the upper steam housing 2340 may have different heights. There is a difference (SH) between the heights of the steam discharge part 2316 and the air suction part 2318. The steam discharge part 2316 may be disposed higher than the air suction part 2318 by the difference (SH) in their heights.

Accordingly, steam in the upper steam housing 2340 may be readily collected to the steam discharge part 2316. When the steam discharge part 2316 is disposed higher than the air suction part 2318, steam having low density may be collected to a lower side of the steam discharge part 2316.

In one embodiment, as the first water level sensor 2360 senses a low water level of the steam generator 2300, the first water level sensor 2360 may be disposed around the air suction part 2318. As the second water level sensor 2370 senses a high water level of the steam generator 2300, the second water level sensor 2370 may be disposed around the steam discharge part 2316.

The difference in heights of the first water level sensor 2360 and the second water level sensor 2370 may result in a minimum length of an electrode of the first water level sensor 2360 and the second water level sensor 2370.

The first water level sensor 2360 may include a 1-1 water level sensing part 2361 and a 1-2 water level sensing part 2362. Lower ends of the 1-1 water level sensing part 2361 and the 1-2 water level sensing part 2362 may be disposed at the same height. In one embodiment, the 1-1 water level sensing part 2361 and the 1-2 water level sensing part 2362 are electrodes. When the 1-1 water level sensing part 2361 and the 1-2 water level sensing part 2362 touches water, a controller may sense that the 1-1 water level sensing part 2361 and the 1-2 water level sensing part 2362 touches the water.

In one embodiment, the lower ends of the 1-1 water level sensing part 2361 and the 1-2 water level sensing part 2362 may denote a lowest water level (WL) for operating the steam generator 2300. When a water level is below the lower ends 2361a, 2362a of the 1-1 water level sensing part 2361 and the 1-2 water level sensing part 2362, damage may be done to a steam heater 2320. Accordingly, when a water level is below the lower ends 2361a, 2362a of the 1-1 water level sensing part 2361 and the 1-2 water level sensing part 2362, power supplied to the steam heater 2320 may be cut off.

In one embodiment, an electrode may be used to sense that the second water level sensor 2370 touches water. The lower end 2370a of the second water level sensor 2370 may sense a highest water level (WH) of the steam generator 2300. When a water level of the steam generator 2300 is above the lower end 2370a of the second water level sensor 2370, water may boil and run off due to operation of the steam heater 2320. When the water level reaches the lower end 2370a of the second water level sensor 2370, the steam heater 2320 may stop operating.

The highest water level (WH) is determined considering a tilt of an indoor unit. That is, when the indoor unit tilts to one side, a water level of any one side of the steam housing 2310 may be high. In one embodiment, when the indoor unit tilts to any one side at an angle of 3 degrees and the steam generator 2300 operates at a maximum level, a height at which water does not run off the steam housing 2310 may be set to the highest water level (WH).

When the water level reaches the highest one (WH), the steam heater 2320 may stop operating and a drain assembly 2700 may operate, to drain water in the steam housing 2310.

In one embodiment, a normal water-feed level of the steam generator 2300 has to be lower than the lower end 2370a of the second water level sensor 2370, and has to be higher than the lower ends 2361a, 2362a of the 1-1 water level sensing part 2361 and the 1-2 water level sensing part 2362.

A lower end 2380a of the thermistor 2380 may be disposed within the normal water-feed level. The thermistor 2380 may sense that a temperature in the steam generator 2300 rises to a set value or above, and may stop operation of the steam heater 2320.

A larger surface area of the air suction part 2318 may be advantageous. In one embodiment, the air suction part 2318 may be wider than the steam discharge part 2316.

The water pipe 2314 may communicate with an inside of the steam housing 2310. Water in the water supply assembly 2200 may be supplied through the water pipe 2314. Additionally, water discharged from the steam housing 2310 through the water pipe 2314 may flow to the drain assembly 2700.

The steam generator 2300 according to one embodiment is characterized in that a single water pipe 2314 is used for supply and drainage of water. In general, a device for generating steam is provided with a pipe for receiving water along with a pipe for draining water.

The water pipe 2314 may be disposed horizontally. The water pipe 2314 may allow an inside of the lower steam housing 2350 to communicate with an outside of the lower steam housing 2350. The water pipe 2314 may protrude from the lower steam housing 2350 towards the water supply assembly 2300. An outer end of the water pipe 2314 may protrude further laterally than a lateral surface of the lower steam housing 2350.

The water pipe 2314 may connect with the chamber housing pipe 2214 and may be disposed in a left-right direction. In one embodiment, the water pipe 2314 may have a pipe shape an inside of which is hollow.

FIG. 24 shows a change in temperatures of water in a water supply flow channel formed at a first connection pipe 2731 and in a water drainage flow channel formed at a third connection pipe 2733 depending on different diameters of the water pipe 2314 and depending on different positions of the water pipe 2314, when water in the steam generator 230 is heated using a steam heater 2320. The water pipe 2314 may be disposed with respect to a rear (a back) where the air suction part 2318 is disposed and a front where the steam discharge part 2316 is disposed, in a front-rear direction of the steam housing 2310.

Referring to FIG. 24, when water stored in the steam generator is heated using the steam heater 2320, a change in temperatures of the water drainage flow channel formed at the third connection pipe 2733 may be greater than in the water supply flow channel formed at the first connection pipe 2731. The first connection pipe 2731 may be formed to incline upwards, and may form a flow channel extending upwards. Accordingly, the water heated in the steam generator 2300 may partially flow upwards, thereby causing a change in the temperatures of the water supply flow channel.

When the water stored in the steam generator is heated using the steam heater 2320, temperature of the water supply flow channel or the water drainage flow channel may be changed because the heated water in the steam generator flow backwards to the water supply flow channel or the water drainage flow channel. Accordingly, the position or the diameter of the water pipe 2314 may be adjusted, and an adjusted diameter or an adjusted position of the water pipe may be applied, such that the water heated in the steam generator 2300 does not flow backwards through the water supply flow channel or the water drainage flow channel.

As a diameter of the water pipe 2314 becomes smaller, there is little change in the temperatures of the water supply flow channel and the water drainage flow channel Referring to FIG. 24, in a water pipe 2314 having a diameter of Φ7, the temperatures of the water supply flow channel and the water drainage flow channel change less than in a water pipe 2314 having a diameter of Φ9. As a pipe diameter becomes smaller, resistance in a flow channel may become higher. Accordingly, a small amount of water may flow from the steam generator 2300 to the water pipe 2314, thereby causing little change in the temperatures of the water supply flow channel or the water drainage channel.

When the water pipe 2314 is disposed at the rear of the steam housing 2310, there is little change in temperatures of the water supply flow channel and the water drainage flow channel Referring to FIG. 24, there is little change in temperatures of the water supply flow channel and water drainage flow channel in the water pipe 2314 disposed at the rear of the steam housing 2310 than in the water pipe 2314 disposed at the front of the steam housing 2310. Water flowing backwards in the steam generator 2300 may flow to the water supply flow channel extending upwards. When the water pipe is disposed at the rear of the steam housing 2310, the water pipe is far from the water supply assembly 2200. Accordingly, the first connection pipe 2731 forming the water supply flow channel may be lengthened. As the water supply flow channel becomes longer, flow resistance in the water supply flow cannel may become higher. Thus, a small amount of water may flow from the steam generator 2300 to the water pipe 2314, and there may be little change in temperatures of the water supply flow channel or the water drainage flow channel.

As the water pipe 2314 according to the present disclosure may connect to the first connection pipe 2731 and the third connection pipe 2733 at the same time through a three-way pipe 2735, water flowing backwards through the water pipe 2314 may flow to the first connection pipe 2731 where the water supply flow channel is formed. Accordingly, water flowing backwards to the third connection pipe 2733 connected to a drain pump 2710 may be prevented from moving. That is, as the first connection pipe 2731, the third connection pipe 2733, and the water pipe 2314 may be connected through the three-way pipe 2735, a backward flow to the third connection pipe 2733, where the water drainage flow channel is formed, may be minimized to reduce a change in temperatures of the water drainage flow channel. Further, the water pipe 2314 may be disposed at the rear of the steam housing 2310, a backward flow to the first connection pipe 2731 where the water supply flow channel is formed may be minimized, thereby reducing a change in temperatures of the water supply flow channel.

The water pipe 2314 may be disposed at the rear in the front-rear direction of the steam housing 2310. For example, the water pipe 2314 may be disposed near the drain assembly. The water pipe 2314 may effectively prevent an increase in temperatures of the drain assembly 2700.

The steam heater 2320 may be disposed at the lower steam housing 2350. A steam heater installation part 2352, where the steam heater 2320 is installed, may be disposed at a back surface of the lower steam housing 2350. In one embodiment, the steam heater installation part 2352 may include an open surface passing through the lower steam housing 2350. The steam heater 2320 may pass through the steam heater installation part 2352, and a heater part may be disposed in the lower steam housing 2350.

The steam heater 2320 may include a first heater part 2321 and a second heater part 2322 that are disposed in parallel, a heater mount 2354 to which the first heater part 2321 and the second heater part 2322 are coupled, which is coupled to the steam heater installation part 2352 and which supplies power respectively to the first heater part 2321 and the second heater part 2322, and a fuse (not illustrated) which cuts off power supplied to the first heater part 2321 and the second heater part 2322.

In one embodiment, a sheath heater may be used as the first heater part 2321 and the second heater part 2322.

The first heater part 2321 and the second heater part 2322 may operate independently. For example, power may be supplied only to the first heater part 2321 to generate heat, or power may be supplied only to the second heater part 2322 to generate heat, or power may be supply to both the first heater part 2321 and the second heater part 2322 to generate heat.

The first heater part 2321 and the second heater part 2322 may all have a "U" shape.

A curved portion of each of the first heater part 2321 and the second heater part 2322 may be disposed at the steam discharge part side 2316. The first heater part 2321 and the second heater part 2322 may be disposed on the same flat surface. Upper ends 2321*a*, 2322*a* of the first heater part 2321 and the second heater part 2322 may be disposed at a height the same as or lower than a lowest water level (WL).

In one embodiment, considering an inclination of an indoor unit, the upper ends 2321*a*, 2322*a* of the first heater part 2321 and the second heater part 2322 may be disposed lower than the lowest water level (WL).

The base 130 of the indoor unit has to be installed in parallel with the ground. However, due to an installation error, the base 130 may tilt in at least one of the front, rear, leftward, and rightward directions. Even when the indoor unit tilts to any one side, the upper ends 2321*a*, 2322*a* of the first heater part 2321 and the second heater part 2322 may not be exposed to the water surface, for example.

To this end, a safe water level (WS) may be formed between the upper surface 2321*a* of the first heater part 2321 and the lowest water level (WL). The safe water level (WS) may be formed between the upper surface 2322*a* of the second heater part 2322 and the lowest water level (WL).

Accordingly, the upper surface 2321*a* of the first heater part 2321 and the upper surface 2322*a* of the second heater part 2322 may be disposed at a position lower than the lowest water level (WL) by the safe water level (WS). In one embodiment, the safe water level (WS) may be set to 6 mm.

Heat generation capacity of the first heater part 2321 and the second heater part 2322 may differ. The first heater part 2321 may have a shorter length than the second heater part 2322. The first heater part 2321 may be disposed inside the second heater part 2322.

In one embodiment, capacity of the first heater part 2321 may be 440 W, and capacity of the second heater part 2322 may be 560 W. When the first heater part 2321 and the second heater pat 2322 operate together, the first heater part 2321 and the second heater part 2322 may provide a maximum output of 1 kW.

The first heater part 2321 may operate at the time of humidification operation. When a humidification assembly 2000 is steam-sterilized, the first heater part 2321 and the second heater part 2322 may operate at the same time.

When the steam generator 2300 operates normally, a temperature in the steam housing 2310 may be limited to 105° C. or so. When the steam generator 2300 is heated, stored water boils and produces bubbles. The second water level sensor 2370 may sense the bubbles and may prevent the steam generator 2300 from overheating. When the steam generator 2300 overheats, the second water level sensor 2370 may operate at 140° C. or so.

When the second water level sensor 2370 does not sense the overheating, the thermistor 2380 may sense that the steam generator 2300 overheats. The thermistor 2380 may sense a range of temperatures between 150 and 180° C. or so. In one embodiment, the thermistor 2380 may sense a temperature of 167° C. or higher.

When the temperature (in one embodiment, 250° C.) in the steam housing 2310 rises even after power is controlled by the thermistor 2380, the fuse may cut off the power of the steam heater 2320.

The heater mount 2354 may pass through the steam heater installation part 2352 and may be coupled to the lower steam housing 2350. The heater mount 2354 may seal the steam heater installation part 2352. An airtight gasket (not illustrated) may be disposed between the heater mount 2354 and the steam heater installation part 2352. The water pipe 2314 may be disposed near the heater mount 2354.

Water in a supply chamber 2211 may be suctioned to the water pipe 2314 using its self-weight. To this end, the water pipe 2314 may be disposed lower than the chamber housing pipe 2214. The water pipe 2314 may be disposed at a height the same as or lower than an outer end 2214*b* of the chamber housing pipe 2214.

The water pipe 2314 may be connected to a lowermost side of the lower steam housing 2350. Accordingly, water may be prevented from being collected in the steam housing 2310 when the water stored in the steam housing 2310 is drained. A groove or a slope for allowing water to flow to the water pipe 2314 may be formed on a bottom surface in the lower steam housing 2350.

In one embodiment, an additional valve is not disposed at the water pipe 2314.

As the water pipe 2314 communicates with the chamber housing pipe 2214, a water level of the supply chamber 2211 and a water level of the steam housing 2310 may be configured to be the same.

For example, when a sufficient amount of water is supplied into the steam housing 2310, the water level of the supply chamber 2211 and the water level of the steam housing 2310 may be the same, and a supply floater 2220 of the water supply assembly 2200 may rise depending on a rising water level and may close a middle hole 2258 to which water is supplied.

In one embodiment, the chamber housing pipe 2214 may be disposed within a height of the steam heater 2320. The outer end 2214b of the chamber housing pipe 2214 may be disposed lower than the highest water level (WH) of the steam generator 2300.

The highest water level (WH) of the steam generator 2300 may be disposed lower than a valve hole 2111. The middle hole 2258 may be disposed at a height the same as or higher than the highest water level (WH) of the steam generator 2300. In one embodiment, the middle hole 2258 may be spaced a distance (H) apart from the upper end 2321a, 2322a of the steam heater 2320.

In one embodiment, as a floater valve stopper 2278 disposed at the supply floater 2220 protrudes further upwards than a floater body 2222, a height, at which the floater body 2222 rises to a maximum level, may be the same as or lower than the highest water level (WH).

When the supply floater 2220 rises to the maximum height, the middle hole 2258 may be closed, and water supplied to the steam generator 2300 may be cut off.

The steam discharge part 2316 may communicate with an inside of the upper steam housing 2340. The steam discharge part 2316 may pass through the upper steam housing 2340 in an up-down direction. The steam discharge part 2316 may protrude upwards from an upper surface of the upper steam housing 2340 for a connection with the steam guide 2400.

The air suction part 2318 may be disposed in the steam housing 2310, and specifically, may be disposed in the upper steam housing 2340. The air suction part 2318 may communicate with an inside of the upper steam housing 2340, and air supplied by the humidification fan 2500 may be suctioned into the air suction part 2318.

The air suction part 2318 may protrude upwards from the upper surface of the upper steam housing 2340 for a connection with the humidification fan 2500.

In one embodiment, the air suction part 2318 may be disposed at a rear of the steam discharge part 2316. The air suction part 2318 may be disposed closer to the humidification fan 2500 than the steam discharge part 2316.

The air suction part 2318 may connect with the humidification fan 2500 and may receive filtered air from the humidification fan 2500. The air suction part 2318 may receive air that passes through a filter assembly 600 and that is filtered. The filtered air supplied to the air suction part 2318 may be suctioned to the steam housing 2310 and may be discharged through the steam discharge part 2316 along with steam in the steam housing 2310.

When ordinary air, instead of filtered air, is suctioned into the steam housing 2310, fungi and the like are highly likely to breed in the steam housing 2310.

In one embodiment, air supplied into the steam housing 2310 is limited to filtered air. Accordingly, when the steam generator 2300 does not operate, contamination in the steam housing 2310, caused by germs or fungi and the like, may be minimized.

For the steam generator 2300 according to one embodiment, an air flow of the humidification fan 2500 may be supplied into the steam generator 2300 to push steam out of the steam housing 2310, thereby maximizing flow pressure of the steam.

In another embodiment, a structure, where the humidification fan suctions steam out of the steam housing, may not help steam in the steam housing to be discharged smoothly.

When steam generated in the steam generator 2300 does not flow to lateral discharge ports 301, 302 rapidly, dew may be formed while steam moves.

According to one embodiment, as the humidification fan 2500 supplies air at an air suction side of the steam generator 2300, formation of dew while the steam moves may be minimized Additionally, in one embodiment, as air of the humidification fan 2500 pushes steam in the steam housing 2310 out of the steam housing 2310, a sufficient flow velocity of air may be ensured.

According to one embodiment, even when dew is formed while steam moves, a sufficient flow velocity of air allowing steam to flow may be ensured. Accordingly, condensate may be naturally evaporated by the flow velocity of air.

<Configuration of Drain Assembly>

The drain assembly 2700 may be disposed at a base 130, and may include a drain pump 2710 configured to drain water in a water supply assembly 2200 and a steam generator 2300, a drain hose 2720 connected to the drain pump 2710 and configured to guide water pumped by the drain pump 2710 out of an indoor unit, and a water connection pipe 2730 configured to connect a chamber housing pipe 2214 of the water supply assembly 2200, a water pipe 2314 of the steam generator 2300, and the drain pump 2710 to allow water to flow.

A configuration of the drain pump 2710 is known to one having ordinary skill in the art as an ordinary device. Accordingly, description of operation of the device is omitted. The drain pump 2710 may include a drain inlet 2714 connected to the water connection pipe 2730, and a drain outlet 2712 connected to the drain hose 2720.

The drain inlet 2714 may be disposed horizontally, and in one embodiment, may protrude towards the steam generator 2300. The drain outlet 2712 may protrude upwards.

In one embodiment, as water in the water supply assembly 2200, the steam generator 2300, and the drain pump 2710 may be moved by its self-weight, the drain pump 2710 may be disposed to satisfy the requirement. Accordingly, the drain pump 2710 may be disposed lower than the chamber housing pipe 2214 and the water pipe 2314, for example.

As water in the water supply assembly 2200 and the steam generator 2300 may also be moved using its self-weight, the water pipe 2314 may be disposed lower than the chamber housing pipe 2214, for example.

On the basis of the above arrangement, the chamber housing pipe 2214 may be disposed at a highest position, and the drain pump 2710 may be disposed at a lowest position, and the water pipe 2314 may be disposed at a height between the chamber housing pipe 2214 and the drain pump 2710.

The water supply assembly 2200, the steam generator 2300, and the drain pump 2710 may all be disposed at the base 130 of a cabinet assembly 100. To make a difference in heights, as described above, the base 130 may form a difference in heights.

In one embodiment, a drain pump installation part 133, which is concave downwards, may be formed at the base 130.

The base 130 may include a base top wall 131 which is flatly formed, and a drain pump installation part 133 which is concave downwards from the base top wall 131.

The base top wall 131 may be disposed higher than the drain pump installation part 133.

The drain pump 2710 may be installed at the drain pump installation part 133, and water in a water tank 2100 and the steam generator 2300 may be collected at the drain pump 2710. Accordingly, an amount of water left in the humidification fan 2000 may be minimized.

The water connection pipe 2730 may include a first connection pipe 2731 connected to the chamber housing pipe 2214, a second connection pipe 2732 connected to the water pipe 2314, a third connection pipe 2733 connected to the drain inlet 2714, and a three-way pipe 2735 connected to the first connection pipe 2731, the second connection pipe 2732 and the third connection pipe 2733.

The three-way pipe 2735 may be a T-shaped pipe or a Y-shaped pipe, and in one embodiment, the T-shaped pipe may be used to minimize an installation space.

One end of the first connection pipe 2731 may be coupled to the chamber housing pipe 2214, and the other end may be coupled to the three-way pipe 2735. In another embodiment, the first connection pipe 2731 may be provided with a valve, and the installed valve may regulate a flow of the first connection pipe 2731.

One end of the second connection pipe 2732 may be coupled to the water pipe 2314, and the other end may be coupled to the three-way pipe 2735. A mesh filer (not illustrated) may be installed in the second connection pipe 2732. The mesh filter may filter scale that is produced due to operation of the steam generator, and may block the scale from flowing into the drain pump 2710.

One end of the third connection pipe 2733 may be coupled to the drain inlet 2714 of the drain pump 2710, and the other end may be coupled to the three-way pipe 2735.

A material of the first connection pipe 2731, the second connection pipe 2732, and the third connection pipe 2733 may not be limited, but in one embodiment, may include a synthetic resin to ensure ease of assembly.

As high-temperature water may flow into the second connection pipe 2732, a heat resistant material (in one embodiment, EDPM) may be used for the second connection pipe 2732 to cover a range of temperatures of the steam generator 2300. The second connection pipe 2732, for example, may be made of a material that is not deformed at a temperature (250° C.) prior to operation of a heater fuse.

For example, the entire water connection pipe 2730 may be made of a material that is not deformed at the temperature (250° C.) prior to operation of the heater fuse.

When the steam generator 2300 operates, a temperature of water in the steam generator 2300 may rise to 100° C. or higher even in a normal state. When a pipe for water supply and a pipe for water drainage are respectively provided, a temperature of the pipe for water supply, connected to the water tank, may rise slowly. However, as a small amount of water is stored in the pipe connected to the drain pump 2710, a temperature of the pipe may rise to a temperature similar to that in the steam generator 2300.

When a temperature of water in the pipe connected to the drain pump rises, the drain pump may be damaged.

In one embodiment, to prevent this from happening, water in the steam generator 2300 and water in the water supply assembly 2200 may be mixed in the three-way pipe 2735. The mixed water may help to suppress an increase in the temperature of the third connection pipe 2733.

Although a temperature of water in the second connection pipe 2732 rises to 100° C. or higher, water in the first connection pipe 2731 has a room temperature. Accordingly, high-temperature water and room-temperature water may be mixed in the three-way pipe 2735, thereby suppressing an increase in temperature of the water.

As the water in the first connection pipe 2731 may be supplied by the water supply assembly 2200, an increase in temperature may be suppressed by convection current.

For example, even when the drain pump 2710 operates in a state where water is collected in the steam housing 2310 after the steam generator 2300 operates, the high-temperature water drained from the second connection pipe 2732 and the room-temperature water drained from the first connection pipe 2731 may be mixed in the three-way pipe 2735, and a temperature of the mixed water may drop to at least 70° C. or lower.

In one embodiment, when water is drained through the water connection pipe 2730, a temperature of water flowing to the drain pump 2710 may be between 30° C. to 50° C.

In one embodiment, when the drain pump 2710 operates, water stored in the water tank 2100 and the water supply assembly 2200 as well as water stored in the steam housing 2310 may all be drained.

Water in a humidification assembly 2000 may be used for humidifying air in an indoor space. Accordingly, as time passes, germs may breed. When the humidification assembly 2000 is not used for a predetermined period of time (24 hours), water in the steam housing 2310 as well as water in the water tank 2100 and the water supply assembly 2200 may all be drained, and the humidification assembly 2000 may be dried out entirely.

As the water in the humidification assembly 2000 is heated in the steam generator 2300 to be used, scale may be formed on a surface of a steam heater 2320 configured to boil water. The scale piled on the surface of the steam heater 2320 may prevent heat generated by the steam heater 2320 from being delivered to water stored in the steam housing 2310. Accordingly, the drain assembly 2700 needs to operate on a regular basis such that formation of the scale on the surface of the steam heater 2320 or in the steam housing 2310 is minimized That is, when the humidification assembly 2000 is not used for the predetermined period of time (one day), as described above, water in the steam housing 2310 as well as water in the water tank 2100 and the water supply assembly 2200 need to be all drained.

Referring to FIG. 25, a temperature of the steam heater 2320 for heating water in the steam housing 2310 may vary depending on whether the drain assembly 2700 according to one embodiment operates and depending on an operation cycle of the drain assembly 2700. That is, the drain assembly 2700, which operates once in three days, may produce much less scale than when the drain assembly 2700 does not operate. Accordingly, the temperature of the steam heater 2320 for heating water in the steam housing 2310 may drop.

When the air conditioner according to one embodiment has been used for 10 years, a temperature in the steam heater 2320 following formation of scale may be 207.6° C. when the drain assembly does not operate, and may be 192.4° C. when the drain assembly 2700 operates once in three days. Though not illustrated in the drawing, a temperature in the steam heater 2320 may be 185.9° C. when the drain assembly 2700 operates once a day in the same way. As a result, the drain assembly 2700 may operate in short cycles such that formation of scale on the surface of the steam heater 2320 or in the steam housing 2310 is minimized.

A temperature, at which a heater fuse according to one embodiment separates, may be set to 216° C. Accordingly, although the drain assembly 2700 does not operate on a regular basis and the air conditioner has been used for 10 years, the heater fuse does not separate, thereby ensuring durability of the steam heater 2320.

Referring to FIG. 26, formation of scale depends on whether the drain assembly 2700 according to one embodiment operates and depends on an operation cycle of the drain assembly 2700. That is, the drain assembly 2700, which operates once in three days, produces much less scale than when the drain assembly 2700 does not operate. As a result, a heat transfer rate of the steam heater 2320 may increase and an inside of the steam heater 2320 may be kept at a low temperature.

When the air conditioner according to one embodiment has been used for 10 years, a predicted value of a heat transfer rate following formation of scale, may be 601 W when the drain assembly does not operate, and may be 624 W when the drain assembly 2700 operates once in three days. Though not illustrated in the drawing, a predicted value of a heat transfer rate may be 631 W when the drain assembly 2700 operates once a day in the same way. As a result, the drain assembly 2700 may operate in short cycles such that formation of scale on the surface of the steam heater 2320 or in the steam housing 2310 is minimized.

When the drain pump 2710 operates, water in the third connection pipe 2733 may be drained. As one end of the third connection pipe 2733 coupled to the drain inlet 2714 may be disposed at a lowest height, water in the water tank 2100 and the water supply assembly 2200 may flow to the third connection pipe 2733 through the first connection pipe 2713 and the three-way pipe 2735, on the basis of kinetic energy of the water.

Likewise, water in the steam housing 2310 may flow to the third connection pipe 2733 through the second connection pipe 2732 and the three-way pipe 2735, on the basis of kinetic energy of the water.

With the above-described structure, the water connection pipe 2730 may suppress an increase in temperature of the steam generator 2300 and may readily implement drainage of the entire humidification assembly 2000.

<<Configuration of Steam Guide>>

The steam guide 2400 may supply steam of a steam generator 2300 to a discharge flow channel. The discharge flow channel may include a flow channel of air allowed to flow by a long-distance fan assembly 400, and a flow channel of air allowed to flow by a short-distance fan assembly.

In one embodiment, the discharge flow channel may be defined as being disposed at a cabinet assembly 100, and a period during which air passing through a filter assembly 600 is discharged out of the cabinet assembly 100.

In one embodiment, the steam guide 2400 may guide steam, generated in the steam generator 2300, to a lateral discharge port 301, 302. The steam guide 2400 may provide an additional flow channel separate from air in the cabinet assembly 100. The steam guide 2400 may have a pipe shape or a duct shape.

The steam guide 2400 may include a main steam guide 2450 coupled to a steam generator 2300 and supplied with humidified air of the steam generator 2300, a first branch guide 2410 coupled to the main steam guide 2450 and configured to guide some of the humidified air, supplied through the main steam guide 2450, to a first lateral discharge port 301, a second branch guide 2420 coupled to the main steam guide 2450 and configured to guide the remaining humidified air, supplied through the main steam guide 2450, to a second lateral discharge port 302, a first diffuser 2430 assembled to the first branch guide 2410, disposed at the first lateral discharge port 301 and configured to discharge the humidified air, supplied through the first branch guide 2410, to the first lateral discharge port 301, and a second diffuser 2440 assembled to the second branch guide 2420, disposed at the second lateral discharge port 302 and configured to discharge the humidified air, supplied through the second branch guide 2420, to the second lateral discharge port 302.

In another embodiment, the first branch guide 2410 and the second branch guide 2420 may be directly coupled to the steam generator 2300. In this case, a steam discharge part, to which the first branch guide 2410 and the second branch guide 2420 are respectively coupled, may be disposed at the steam generator 2300.

In yet another embodiment, a single branch guide may be provided and may be coupled to a single diffuser. In this case, the single diffuser may be disposed at any one of the first lateral discharge port or the second lateral discharge port.

In one embodiment, the diffuser may be disposed at the lateral discharge port but may also be installed at the front discharge port. That is, the position of the diffuser may not be limited to the lateral discharge port.

In one embodiment, the main steam guide 2450 may have a duct shape. The main steam guide 2450 may guide air from a lower side to an upper side. The main steam guide 2450 may supply air (air where steam and filtered air are mixed), supplied by the steam generator 2300, to the first branch guide 2410 and the second branch guide 2420.

The air (air where steam and filtered air are mixed) supplied by the steam generator 2300 may branch from the main steam guide 2450 into the first branch guide 2410 and the second branch guide 2420.

A lower end of the main steam guide 2450 may be coupled to a steam discharge part 2316 of the steam housing 2310. An upper end of the main steam guide 2450 may be coupled to the first branch guide 2410 and the second branch guide 2420.

The main steam guide 2450 may have an open lower side. The main steam guide 2450 may be provided with a first guide coupling part 2451 to which the first branch guide 2410 is assembled, and a second guide coupling part 2452 to which the second branch guide 2420 is assembled, at an upper side thereof.

The first guide coupling part 2451 and the second guide coupling part 2452 may penetrate in an up-down direction. In one embodiment, the first guide coupling part 2451 and the second guide coupling part 2452 may have a pipe shape.

The first branch guide 2410 may be formed into a pipe shape corresponding to a flat cross section of the first guide coupling part 2451. The second branch guide 2420 may be formed into a pipe shape corresponding to a flat cross section of the second guide coupling part 2451.

In one embodiment, when seen from a front of the cabinet assembly 100, the main steam guide 2450 tilts to one side (the left). Accordingly, the first branch guide 2410 and the second branch guide 2420 may have different lengths.

Preferably, air may be supplied equivalently to the first branch guide 2410 and the second branch guide 2420. In one embodiment, the first branch guide 2410 and the second branch guide 2420 may have different pipe diameters such that a flow rate of the first branch guide 2410 is equivalent to a flow rate of the second branch guide 2420.

For example, a short-length steam guide may have a small pipe diameter, and a long-length steam guide may have a large pipe diameter, to ensure an equivalent flow rate.

The first diffuser 2430 and the second diffuser 2440 may be symmetrical in a left-right direction.

The first diffuser 2430 may be assembled to the first branch guide 2410, and may be disposed at the first lateral discharge port 301. The first diffuser 2430 may discharge air, supplied along with steam through the first branch guide 2410, to the first lateral discharge port 301.

The first diffuser 2430 may discharge filtered air including steam, carried by air discharged from the first lateral discharge port 301. Flow velocity of air discharged from the first diffuser 2430 and flow velocity of air discharged through the first lateral discharge port 301 may be similar. A flow rate of air discharged from the first lateral discharge port 301 may be higher than a flow rate of the humidified air, but their flow velocity may be similar, for example. This is because the flow velocity of any one may act as resistance against the flow velocity of the other in case any one has a higher flow velocity than the other.

The air discharged from the first lateral discharge port 301 may diffuse steam discharged from the first diffuser 2430 farther away. The second diffuser 2440 may operate like the first diffuser.

The second diffuser 2440 may be assembled to the second branch guide 2420 and may be disposed at the second lateral discharge port 302. The second diffuser 2440 may discharge air, supplied along with steam through the second branch guide 2420, to the second lateral discharge port 302.

The first diffuser 2430 and the second diffuser 2440 may have the same structure. The first diffuser 2430 is described hereunder as an example.

The first diffuser 2430 may discharge air, supplied along with steam from a lower side, to the lateral discharge port.

The diffuser (in one embodiment, the first diffuser and the second diffuser) may include a diffuser housing 2460, which has a space therein and one side (in one embodiment, a lower side) of which is open, a diffuse outlet 2431, 2441 formed to pass through the diffuser housing 2460, and a diffuser inlet 2433, 2443 disposed outside the diffuser housing 2460, disposed in the diffuser housing 2460 and assembled to the steam guide 2420, 2430.

When diffuser outlets of the first diffuser 2430 and the second diffuser 2440 need to be distinguished for convenience of description, the diffuser outlets may be referred to as a first diffuser outlet 2431 and a second diffuser outlet 2441. Likewise, when diffuser inlets of the first diffuser 2430 and the second diffuser 2440 need to be distinguished, the diffuser inlets may be referred to as a first diffuser inlet 2433 and a second diffuser inlet 2443.

The diffuser outlet 2431 may have a slit shape. The diffuser outlet 2431 may be long and extended in the up-down direction. A plurality of diffuser outlets 2431 may be disposed in a lengthwise direction of the diffuser housing 2460. The diffuser outlet 2431 may be disposed to face the left or the right.

The diffuser outlet 2431 may be disposed near the lateral discharge port 301, 302 of the cabinet assembly 100.

The first diffuser outlet 2431 may be disposed to face the left of the cabinet assembly 100, and the second diffuser outlet 2441 may be disposed to face the right of the cabinet assembly 100.

In one embodiment, the diffuser outlet 2431 may be disposed further forwards than the lateral discharge port 301, 302 and may allow the humidified air to flow farther away by a flow of air discharged from the lateral discharge port 301, 302.

The diffuser housing 2460 may be provided with a diffuser space therein. The diffuser space may communicate with the diffuser inlet 2433 and the diffuser outlet 2431. The diffuser space may be long and extended in the up-down direction. From a flat cross section perspective, an inside of the diffuser space may be wide while an outside of the diffuser space is narrow.

In one embodiment, the diffuser inlet 2433 may have a pipe shape.

The diffuser inlet 2433 may be inserted into the steam guide 2420. When the diffuser inlet 2433 is inserted into the steam guide 2420, condensate generated in the diffuser housing 2460 may be prevented from leaning outwards.

Condensate formed in the diffuser housing 2460 may flow downwards using its self-weight, may move to the steam guide 2420 through the diffuser inlet 2433 and then may pass through the main steam guide 2450 to return to the steam generator 2300.

When a humidification fan 2500 operates, the condensate in the diffuser housing 2460 may be naturally evaporated by flowing air. When the humidification fan 2500 does not operate, the condensate formed in the diffuser housing 2460 may return to the steam generator 2300 and may be discharged outwards though a drain assembly 2700.

When the humidification assembly 2000 according to one embodiment provides a humidification function, a distance reached by moisture does not rely only on an output of the humidification fan 2500. When making moisture to flow farther away relies on the output of the humidification fan 2500, capacity of the humidification fan 2500 has to increase or the humidification fan 2500 has to operate at high speeds.

In one embodiment, when the humidification assembly 2000 operates, moisture carried by air of a short-distance fan assembly may flow farther away. In this case, although a humidification fan 2500 having low output capacity is used, humidified air may be provided to a far corner in an indoor space.

The diffuser outlet 2431 may be disposed at a front of the lateral discharge port 301, 302 rather than a rear of the lateral discharge port 301, 302 such that humidified air flows farther away.

<<Configuration of Humidification Fan>>

The humidification fan 2500 may suction filtered air passing through a filter assembly 600 and may supply the filtered air to a steam generator 2300, and may allow the filtered air along with steam generated in the steam generator 2300 to flow to the steam guide 2400.

The humidification fan 2500 may generate an air flow that discharges steam and filtered air (in one embodiment, humidified air) from a diffuser 2430, 2440.

The humidification fan 2500 may include a humidification fan housing 2530 configured to suction filtered air passing through a filter assembly 600 and to guide the filtered air suctioned to a steam generator 2300, a clean suction duct 2540, a lower side of which is connected to the humidification fan housing 2530 and an upper side of which is disposed at a front of the filter assembly 600 to supply the filtered air passing through the filter assembly 600 to the humidification fan housing 2530, a humidification impeller 2510 disposed in the humidification fan housing 2530 and allowing the filtered air of the humidification fan housing 2530 to flow to the steam generator 2300, and a humidification motor 2520 disposed at the humidification fan housing 2530 and configured to rotate the humidification impeller 2510.

The clean suction duct 2540 may supply filtered air passing through the filter assembly 600 to the humidification fan housing 2530.

The filter assembly 600 may be disposed at an upper cabinet 110, and the humidification fan 2500 may be disposed at a lower cabinet 120. Accordingly, there is a difference between the heights at which the filter assembly 600 and the humidification fan 2500 are disposed. That is, the filter assembly 600 may be disposed at an upper portion of the humidification fan 2500.

The filtered air passing through the filter assembly 600 may flow to a short-distance fan assembly 300, and may not flow to the lower cabinet 120 or hardly flow to the lower cabinet 120. The lower cabinet 120 has no portion from which air is discharged. Accordingly, as long as air is not supplied to the lower cabinet 120 artificially, the filtered air may not flow or circulate into the lower cabinet 120.

Additionally, as a drain pan 140, which supports a heat exchange assembly and collects condensate, is disposed at a lower side of the upper cabinet 110, the filtered air in the upper cabinet 110 may hardly flow to the lower cabinet 120.

An upper end of the clean suction duct 2540 may be disposed in the upper cabinet 110, and a lower end may be disposed in the lower cabinet 120. That is, the clean suction duct 2540 may provide a flow channel for allowing the filtered air in the upper cabinet 110 to flow into the lower cabinet 120.

The clean suction duct 2540 may be provided with a first clean duct open surface 2541 that is open towards the heat exchange assembly or the filter assembly 600.

The humidification fan housing 2530 may include a first humidification fan housing 2550 which is coupled to the clean suction duct 2540, where filtered air is suctioned and which is provided with a first suction space 2551 therein, a second humidification fan housing 2560 coupled to the first humidification fan housing 2550 to receive filtered air from the first humidification fan housing 2550, provided with a second suction space 2561 therein, provided with the humidification impeller 2510 therein and configured to guide the filtered air to the steam generator 2300 by operation of the humidification impeller 2510, a first suction open surface 2552 formed in the first humidification fan housing 2550, communicating with the first suction space 2551 and being open towards one side (in one embodiment, an upper side), a second suction open surface 2562 formed in the second humidification fan housing 2560, communicating with the second suction space 2561 and being open towards the other side (in one embodiment, a lower side), a first suction space discharge part 2553 passing through the first humidification fan housing 2550 and the second humidification fan housing 2560 and communicating the first suction space 2551 with the second suction space 2561, and a motor installation part 2565 which is disposed in the second humidification fan housing 2560 and where the humidification motor 2520 is installed.

The first humidification fan housing 2550 may be provided with the first suction open surface 2552 towards the upper side. The clean suction duct 2540 may connect to the suction open surface 2552. The second humidification fan housing 2560 may be provided with the second suction open surface 2562 towards the lower side.

In one embodiment, a direction in which the first suction open surface 2552 is open may be opposite to a direction in which the second suction open surface 2562 is open.

A motor shaft (not illustrated) of the humidification motor 2520 may pass through the second humidification fan housing 2560 and may be assembled to the humidification impeller 2510.

The motor installation part 2565 may protrude from the second humidification fan housing 2560 rearwards, and the humidification motor 2520 may be inserted into and installed in the motor installation part 2565.

The first humidification fan housing 2550 where the first suction space 2551 is formed, and the second humidification fan housing 2560 where the second suction space 2561 is formed may be separately manufactured and then may be assembled.

In one embodiment, three parts may be assembled to manufacture the humidification fan housing 2530 as part of an effort to simplify an assembly structure and reduce manufacturing costs.

The humidification fan housing 2530 may include a first humidification fan housing part 2531 configured to surround a front of the first suction space 2551 and constituting a part of the first humidification fan housing 2550, a second humidification fan housing part 2532 configured to surround a rear of the first suction space 2551, configured to surround a front of the second suction space 2561, provided with the first suction space discharge part 2553 and constituting the rest of the first humidification fan housing 2550 and a part of the second humidification fan housing 2560, and a third housing part 2533 configured to surround a rear of the second suction space 2561, provided with the motor installation part 2565 and constituting the rest of the second humidification fan housing 2560.

As the second humidification fan housing part 2532 is shared by the first humidification fan housing 2550 and the second humidification fan housing 2560, the number of components may be reduced, thereby ensuring a decrease in manufacturing costs.

The second humidification fan housing part 2532 may be provided with the first suction space discharge part 2553. The first suction space discharge part 2553 may be formed to pass through the second humidification fan housing part 2532 in a front-rear direction. The first suction space discharge part 2553 may protrude towards the humidification impeller 2510 and may have a circular shape.

The second humidification fan housing part 2532 may form the first suction space discharge part 2553 and may be provided with an orifice part 2534 protruding towards the humidification impeller 2510.

The second humidification fan housing part 2532 may be provided with the first suction space 2551 at a front thereof and provided with the second suction space 2561 at a rear thereof.

The humidification impeller 2510 may be a centrifugal fan that suctions air from its center and discharges air circumferentially. Air discharged from the humidification impeller 2510 may flow to the steam generator 2300 through the second humidification fan housing 2560.

A flow of filtered air based on operation of the humidification motor 2520 is described as follows.

When the humidification motor 2520 operates, the humidification impeller 2510 coupled to the humidification motor 2520 may rotate. As the humidification impeller 2510 rotates, an air flow may be generated in the humidification fan housing 2530, and filtered air may be suctioned through the clean suction duct 2540.

The filtered air suctioned through the clean suction duct 2540 may pass through the first suction space 2551 and the first suction space discharge part 2553 of the first humidification fan housing 2550, and may flow to the second humidification fan housing 2560. The air flowing to the second humidification fan housing 2560 may be pressurized by the humidification impeller 2510, may move downwards along the second humidification fan housing 2560, and then may flow into the steam generator 2300 through the second suction open surface 2562.

The filtered air, flowing into a steam housing 2310 through an air suction part 2318 of the steam generator 2300, may be discharged through a steam discharge part 2316 along with steam generated in the steam generator 2300.

Humidified air discharged from the steam discharge part 2316 may branch from a main steam guide 2450 into a first branch guide 2410 and a second branch guide 2420.

The humidified air flowing to the first branch guide 2410 may be discharged to a first lateral discharge port 301 through a first diffuser 2440, and the humidified air flowing to the second branch guide 2420 may be discharged to a second lateral discharge port 302 through a second diffuser 2450.

The humidified air discharged from the first lateral discharge port 301 may be diffused towards a left side of a cabinet assembly 100 along with air movement generated through the short-distance fan assembly 300, and the humidified air discharged from the second lateral discharge port 302 may be diffused towards a right side of the cabinet assembly 100 along with air movement generated through the short-distance fan assembly 300.

FIG. 22 is a plan view illustrating a second exemplary structure where a steam generator, a water tank, and a drain pump are connected for water supply and water drainage.

An indoor unit, according to one embodiment, may include a water connection pipe 2730' configured to connect a supply chamber housing 2210 and a steam generator 2300 and to allow an inside of the steam generator 2300 to communicate with a supply chamber 2211, a drainage connection pipe 2740 configured to connect the steam generator 2300 and a drain pump 2710 and to connect the inside of the steam generator 2300 and a drain inlet 2714, and a drainage valve 2750 connected to the drainage connection pipe 2740 and configured to control a flow of water passing through the drainage connection pipe 2740.

The water connection pipe 2730' may be further provided with a water supply valve (not illustrated), and may control a flow of water from a water tank 2100 to the steam generator 2300. The water supply valve may be a check valve that allows water to flow from the water tank 2100 only to the steam generator 2300. The water supply valve may be a shut-off valve that is opened and closed according to a control signal.

The steam generator 2300 may include a first water pipe 2311 and a second water pipe 2312.

The first water pipe 2311 may be disposed at a lateral portion of a chamber housing pipe 2214. The second water pipe 2312 may be disposed at a lateral portion of the drain inlet 2714. The first water pipe 2311 may be disposed further forwards than the second water pipe 2312.

The first water pipe 2311 and the second water pipe 2312 may be disposed at the same height. The second water pipe 2312 may be disposed lower than the first water pipe 2311 for water drainage.

The first water pipe 2311 and the second water pipe 2312 may be disposed lower than the chamber housing pipe 2214 and may be disposed higher than the drain inlet 2714.

In one embodiment, the drain pump 2710 may be further provided with the drainage valve 2750 at its suction side. The drainage valve 2750 may control water of the drainage connection pipe 2740.

In the absence of the drainage valve 2750, high-temperature water, which is heated when the steam generator 2300 operates, may flow into the drain pump 2710, causing damage to the drain pump 2710.

The drainage valve 2750 may block high-temperature water from flowing into the drain pump 2710.

The drainage valve 2750 may be disposed at the drainage connection pipe 2740 or may be disposed between the drain inlet 2714 and the drainage connection pipe 2740.

In one embodiment, when water stored in the steam generator 2300 is drained, the drain pump 2710 may operate after a temperature of the water of the steam generator 2300 or a temperature in the steam generator 2300 is checked. When the temperature of the water is not checked, the drain pump 2710 has to operate considering a period of time when water is cooled after operation of the steam generator 2300.

Although the embodiments have been described with reference to a number of illustrative embodiments thereof, it should be understood that numerous other modifications and embodiments can be devised by those skilled in the art. In addition to variations and modifications in the component parts and/or arrangements, alternative uses will also be apparent to those skilled in the art. Thus, the embodiments are provided only as examples and are not limited.

The invention claimed is:

1. A humidification assembly included in an air conditioner, comprising:
   a water tank;
   a water supply assembly holding the water tank such that water in the water tank flows inwards, and which drains the water flowing inwards through a chamber housing pipe;
   a steam generator to evaporate water therein and to produce humidified air;
   a drain assembly including a drain pump to drain water suctioned through a drain inlet; and
   a water connection pipe to allow the chamber housing pipe, the steam generator, and the drain inlet to communicate with each other,
   wherein the water connection pipe comprises:
      a first connection pipe connected with the chamber housing pipe, through which water drained from the water supply assembly flows;
      a second connection pipe connected with the steam generator, through which water suctioned into the steam generator and water drained from the steam generator flow;
      a third connection pipe connected with the drain inlet, through which water suctioned into the drain assembly flows; and
      a three-way pipe connected with the first connection pipe, the second connection pipe, and the third connection pipe,
   wherein, when the drain pump operates, the water is drained from the water supply assembly through the first connection pipe and the water is drained from the steam generator through the second connection pipe and are mixed at the three-way pipe, and the mixed water is suctioned through the third connection pipe toward the drain pump,
   wherein the steam generator comprises a humidification housing forming a water storage space where water is stored and where stored water is evaporated, and a water pipe connected between the humidification housing and the second connection pipe, wherein the chamber housing pipe comprises a first end communicated with the water supply assembly and the second end connected to the first connection pipe, wherein the second end of the chamber housing pipe is higher than the water pipe, and the first end of the chamber housing pipe is higher than the second end of the chamber housing pipe, wherein the water supply assembly comprises a supply chamber configured to temporarily store water supplied by the water tank, and a supply floater disposed in the supply chamber and configured to move in an up-down direction depending on a level of the water stored in the supply chamber, wherein a water level of the supply chamber and a water level of the humidification housing are substantially same, and wherein the supply floater is configured to close a middle hole which forms a part of a supply flow channel which is configured to guide water supplied by the water tank to the supply chamber based on the water level of the humidification housing reaches a highest water level.

2. The humidification assembly of claim 1, wherein the first connection pipe is longer than the third connection pipe.

3. The humidification assembly of claim 1, wherein the drain inlet is disposed lower than the chamber housing pipe.

4. The humidification assembly of claim 1, wherein the steam generator further comprises:
a steam heater, disposed in the humidification housing, to heat water in the water storage space.

5. The humidification assembly of claim 1, wherein the humidification housing provided with an air suction port, through which air is suctioned into the water storage space, in a first area on an upper surface thereof, and provided with a humidified air discharge port, through which the humidified air is discharged, is formed in a second area spaced apart from the first area on the upper surface, wherein the water pipe is disposed closer to the air suction port than to the humidified air discharge port.

6. The humidification assembly of claim 1, wherein the water pipe is disposed higher than the drain inlet.

7. The humidification assembly of claim 1, wherein the water tank is disposed further forwards than the drain assembly, and the steam generator is disposed in a lateral direction of the water tank, and
wherein the water pipe is disposed closer to the drain inlet than to the chamber housing pipe while being disposed between the chamber housing pipe and the drain inlet with respect to a front-rear direction.

8. An air conditioner comprising:
a cabinet; and
a humidification assembly disposed in the cabinet,
wherein the humidification assembly comprises:
a water tank;
a water supply assembly holding the water tank such that water in the water tank flows inwards, and which drains the water flowing inwards through a chamber housing pipe;
a steam generator to evaporate water therein and to produce humidified air;
a drain assembly including a drain pump to drain water suctioned through a drain inlet; and
a water connection pipe to allow the chamber housing pipe, the steam generator, and the drain inlet to communicate with each other,
wherein the water connection pipe comprises:
a first connection pipe connected with the chamber housing pipe, through which water drained from the water supply assembly flows;
a second connection pipe connected with the steam generator, through which water suctioned into the steam generator and water drained from the steam generator flow;
a third connection pipe connected with the drain inlet, through which water suctioned into the drain assembly flows; and
a three-way pipe connected with the first connection pipe, the second connection pipe, and the third connection pipe,
wherein, when the drain pump operates, the water is drained from the water supply assembly through the first connection pipe and the water is drained from the steam generator through the second connection pipe and are mixed at the three-way pipe, and the mixed water is suctioned through the third connection pipe toward the drain pump.

* * * * *